United States Patent
Slatter et al.

(10) Patent No.: US 12,435,362 B2
(45) Date of Patent: Oct. 7, 2025

(54) COMPOSITIONS AND METHODS FOR IMPROVING LIBRARY ENRICHMENT

(71) Applicants: Illumina, Inc., San Diego, CA (US); Illumina Cambridge Limited, Cambridge (GB)

(72) Inventors: Andrew F. Slatter, Cambridge (GB); Junhua Zhao, San Diego, CA (US); Grace DeSantis, San Diego, CA (US); Stephen M. Gross, San Diego, CA (US); Hayley Marianne Hogan, San Diego, CA (US); Jian-Sen Li, San Diego, CA (US); Oliver Jon Miller, Cambridge (GB)

(73) Assignees: Illumina, Inc., San Diego, CA (US); Illumina Cambridge Limited, Cambridge (GB)

( * ) Notice: Subject to any disclaimer, the term of this patent is extended or adjusted under 35 U.S.C. 154(b) by 1257 days.

(21) Appl. No.: 17/267,107

(22) PCT Filed: Aug. 13, 2019

(86) PCT No.: PCT/US2019/046396
§ 371 (c)(1),
(2) Date: Feb. 9, 2021

(87) PCT Pub. No.: WO2020/036991
PCT Pub. Date: Feb. 20, 2020

(65) Prior Publication Data
US 2021/0164027 A1    Jun. 3, 2021

Related U.S. Application Data

(60) Provisional application No. 62/764,753, filed on Aug. 15, 2018.

(51) Int. Cl.
*C12Q 1/6832* (2018.01)
*C12Q 1/6869* (2018.01)

(52) U.S. Cl.
CPC ......... *C12Q 1/6832* (2013.01); *C12Q 1/6869* (2013.01)

(58) Field of Classification Search
None
See application file for complete search history.

(56) References Cited

U.S. PATENT DOCUMENTS

| | | | |
|---|---|---|---|
| 4,683,195 A | 7/1987 | Mullis et al. | |
| 4,683,202 A | 7/1987 | Mullis | |
| 7,057,026 B2 | 6/2006 | Barnes et al. | |
| 7,211,414 B2 | 5/2007 | Hardin et al. | |
| 7,315,019 B2 | 1/2008 | Turner et al. | |
| 7,329,492 B2 | 2/2008 | Hardin et al. | |
| 7,399,845 B2 | 7/2008 | Seth et al. | |
| 7,405,281 B2 | 7/2008 | Xu et al. | |
| 7,427,672 B2 | 9/2008 | Imanishi et al. | |
| 7,547,684 B2 | 6/2009 | Seth et al. | |
| 7,696,345 B2 | 4/2010 | Allerson et al. | |
| 7,741,457 B2 | 6/2010 | Seth et al. | |
| 8,022,193 B2 | 9/2011 | Seth et al. | |
| 8,053,192 B2 | 11/2011 | Bignell et al. | |
| 8,268,980 B2 | 9/2012 | Seth et al. | |
| 8,278,425 B2 | 10/2012 | Prakash et al. | |
| 8,278,426 B2 | 10/2012 | Seth et al. | |
| 8,846,637 B2 | 9/2014 | Seth et al. | |
| 8,846,639 B2 | 9/2014 | Swayze et al. | |
| 9,221,864 B2 | 12/2015 | Seth et al. | |
| 9,546,368 B2 | 1/2017 | Bennett et al. | |
| 9,574,226 B2 | 2/2017 | Gormley et al. | |
| 2002/0102554 A1 | 8/2002 | Utermohlen et al. | |
| 2002/0106789 A1 | 8/2002 | Antoniou et al. | |
| 2003/0061627 A1 | 3/2003 | Antoniou et al. | |
| 2005/0037393 A1* | 2/2005 | Gunderson et al. | C12Q 1/6848 435/91.2 |
| 2008/0108082 A1 | 5/2008 | Rank et al. | |
| 2013/0274117 A1 | 10/2013 | Church et al. | |
| 2014/0031240 A1 | 1/2014 | Behlke et al. | |
| 2014/0243232 A1* | 8/2014 | Meredith et al. | C12Q 1/6874 536/25.41 |
| 2017/0044525 A1 | 2/2017 | Kaper et al. | |
| 2017/0114404 A1 | 4/2017 | Behlke et al. | |
| 2017/0159040 A1 | 6/2017 | Lock et al. | |

(Continued)

FOREIGN PATENT DOCUMENTS

| | | |
|---|---|---|
| CN | 1793381 A | 6/2006 |
| CN | 105349619 A | 2/2016 |
| WO | 9106678 A1 | 5/1991 |

(Continued)

OTHER PUBLICATIONS

Office Action (English translation), issued in corresponding Chinese Application No. 201980067629.9, dated May 6, 2023.

(Continued)

*Primary Examiner* — Kaijiang Zhang
(74) *Attorney, Agent, or Firm* — Fletcher Yoder, P.C.

(57) ABSTRACT

This disclosure describes a hybridization buffer including a crowding agent, a method that includes using the hybridization buffer, and a kit including the hybridization buffer. This disclosure also describes blockers for use in hybrid capture methods, methods of using those blockers, and a kit including those blockers. Additionally, this disclosure describes a method of hybrid capture that does not include amplifying the library members using PCR prior to sequencing the library members.

16 Claims, 20 Drawing Sheets

Specification includes a Sequence Listing.

(56) References Cited

U.S. PATENT DOCUMENTS

| | | | |
|---|---|---|---|
| 2018/0073063 A1* | 3/2018 | Turner | ................ C12Q 1/6827 |
| 2019/0091682 A1 | 3/2019 | Drews et al. | |

FOREIGN PATENT DOCUMENTS

| | | | |
|---|---|---|---|
| WO | 1998024933 | A1 | 6/1998 |
| WO | 1998044151 | A1 | 10/1998 |
| WO | 2000005393 | A2 | 2/2000 |
| WO | 2000014281 | A2 | 3/2000 |
| WO | 2000018957 | A1 | 4/2000 |
| WO | 2002061139 | A2 | 8/2002 |
| WO | 2004018497 | A2 | 3/2004 |
| WO | 2005065814 | A1 | 7/2005 |
| WO | 2005068656 | A1 | 7/2005 |
| WO | 2006064199 | A1 | 6/2006 |
| WO | 2007010251 | A3 | 8/2007 |
| WO | 2007123744 | A3 | 11/2008 |
| WO | 2014008447 | A1 | 1/2014 |
| WO | 2015106941 | A1 | 7/2015 |
| WO | 2016023430 | A1 | 2/2016 |
| WO | 2016055956 | A1 | 4/2016 |
| WO | 2017119930 | A1 | 7/2017 |

OTHER PUBLICATIONS

Office Action (English translation), issued in corresponding Japanese Application No. 2021-507464, dated Jun. 30, 2023.
Bentley et al., Nature 456:53-59 (2008).
Mamanova et al., Nat. Methods 7:111-118 (2010).
Brookman-Amissah et al., Genetic Engineering & Biotechnology News 34(6):24 (2014).
International Search Report and Written Opinion, International Application No. PCT/US2019/046396, Oct. 21, 2019, 15 pages.
Written Opinion and Search Report, issued in corresponding Singapore Application No. 11202100765U, dated Oct. 27, 2022, 9 pages.
English translation of Office Action and Search Report issued in Russian Application No. 2021104912, mailed May 24, 2022, 6 pages.
McConaughy, B.L., et al.; "Nucleic acid reassociation in formamide," Biochemistry, vol. 8, No. 8, 1969, pp. 3289-3295.
Ulyasheva, M.M., et al.; "Optimization of hybridization analysis on DNA microarrays with colorimetric detection on basis of horseradish peroxidase," Bulletin of Moscow University, Series 2, Chemistry, vol. 49, No. 2, 2008, pp. 96-101.
Relógio et al., "Optimization of Oligonucleotide-Based DNA Microarrays," 2002, Nucleic Acids Research, 30(11): e51, 2-10.

* cited by examiner

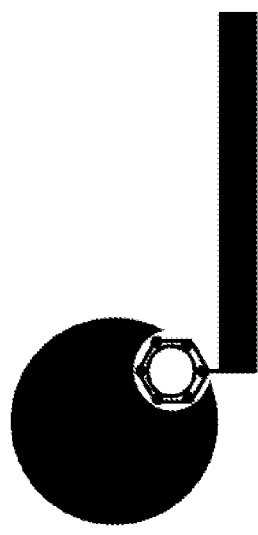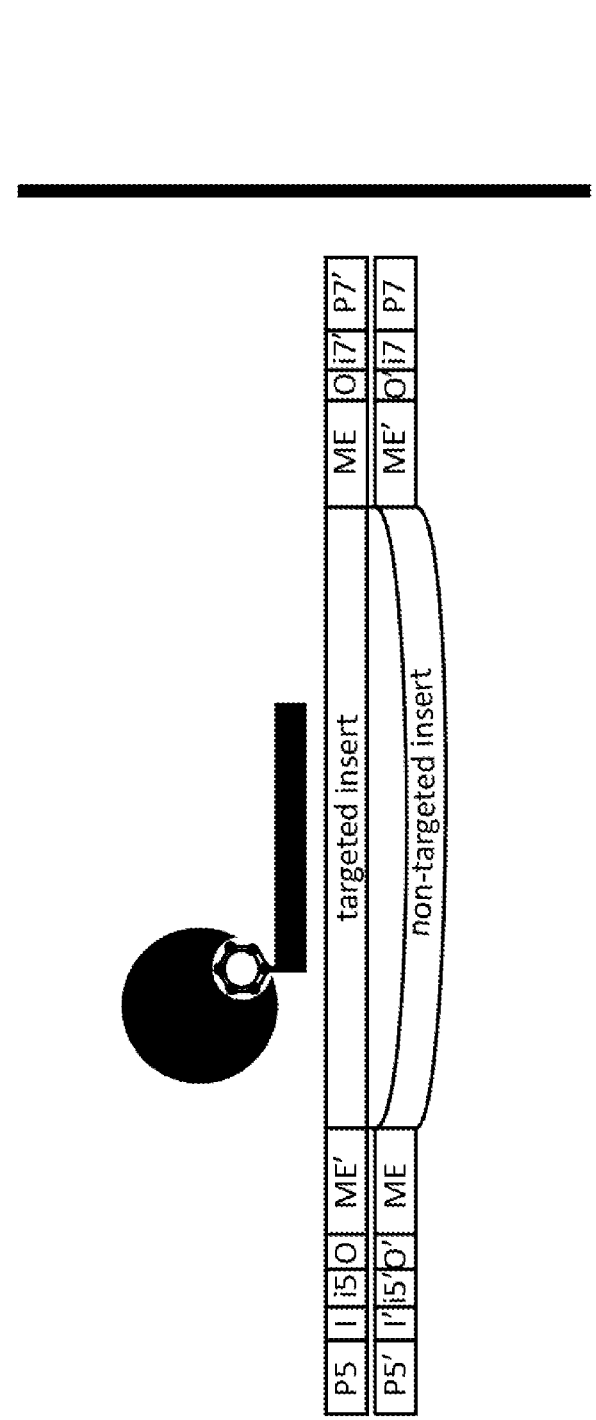
FIG. 1A
FIG. 1B

SEQUENCE LISTING

<160> NUMBER OF SEQ ID NOS: 123

<210> SEQ ID NO 1
<211> LENGTH: 70
<212> TYPE: DNA
<213> ORGANISM: Artificial Sequence
<220> FEATURE:
<223> OTHER INFORMATION: Synthetic: TN001, Nextera 8nt adaptor - i5
<220> FEATURE:
<221> NAME/KEY: misc_feature
<222> LOCATION: (30)..(37)
<223> OTHER INFORMATION: n is a, c, g, or t

<400> SEQUENCE: 1
aatgatacgg cgaccaccga gatctacacn nnnnnnntcg tcggcagcgt cagatgtgta    60
taagagacag                                                          70

<210> SEQ ID NO 2
<211> LENGTH: 66
<212> TYPE: DNA
<213> ORGANISM: Artificial Sequence
<220> FEATURE:
<223> OTHER INFORMATION: Synthetic: TN002, Nextera 8nt adaptor - i7
<220> FEATURE:
<221> NAME/KEY: misc_feature
<222> LOCATION: (25)..(32)
<223> OTHER INFORMATION: n is a, c, g, or t

<400> SEQUENCE: 2
caagcagaag acggcatacg agatnnnnnn nngtctcgtg ggctcggaga tgtgtataag    60
agacag                                                              66

<210> SEQ ID NO 3
<211> LENGTH: 72
<212> TYPE: DNA
<213> ORGANISM: Artificial Sequence
<220> FEATURE:
<223> OTHER INFORMATION: Synthetic: TN003, Nextera 10nt adaptor - i5
<220> FEATURE:
<221> NAME/KEY: misc_feature
<222> LOCATION: (30)..(39)
<223> OTHER INFORMATION: n is a, c, g, or t

<400> SEQUENCE: 3
aatgatacgg cgaccaccga gatctacacn nnnnnnnnnt cgtcggcagc gtcagatgtg    60
tataagagac ag                                                       72

<210> SEQ ID NO 4
<211> LENGTH: 68
<212> TYPE: DNA
<213> ORGANISM: Artificial Sequence
<220> FEATURE:
<223> OTHER INFORMATION: Synthetic: TN004, Nextera 10nt adaptor - i7
<220> FEATURE:
<221> NAME/KEY: misc_feature
<222> LOCATION: (25)..(34)
<223> OTHER INFORMATION: n is a, c, g, or t

<400> SEQUENCE: 4
caagcagaag acggcatacg agatnnnnnn nnnngtctcg tgggctcgga gatgtgtata    60
agagacag                                                            68

<210> SEQ ID NO 5
<211> LENGTH: 34
<212> TYPE: DNA
<213> ORGANISM: Artificial Sequence

```
<220> FEATURE:
<223> OTHER INFORMATION: Synthetic: TN005, Nextera short adaptor - i5

<400> SEQUENCE: 5
tcgtcggcag cgtcagatgt gtataagaga cagt                                    34

<210> SEQ ID NO 6
<211> LENGTH: 34
<212> TYPE: DNA
<213> ORGANISM: Artificial Sequence
<220> FEATURE:
<223> OTHER INFORMATION: Synthetic: TN006, Nextera short adaptor - i7

<400> SEQUENCE: 6
ctgtctctta tacacatctc cgagcccacg agac                                    34

<210> SEQ ID NO 7
<211> LENGTH: 41
<212> TYPE: DNA
<213> ORGANISM: Artificial Sequence
<220> FEATURE:
<223> OTHER INFORMATION: Synthetic: TN007, Nextera nrUMI adaptor - i5
<220> FEATURE:
<221> NAME/KEY: misc_feature
<222> LOCATION: (35)..(40)
<223> OTHER INFORMATION: n is a, c, g, or t

<400> SEQUENCE: 7
tcgtcggcag cgtcagatgt gtataagaga cagtnnnnnn t                            41

<210> SEQ ID NO 8
<211> LENGTH: 40
<212> TYPE: DNA
<213> ORGANISM: Artificial Sequence
<220> FEATURE:
<223> OTHER INFORMATION: Synthetic: TN008, Nextera nrUMI adaptor - i7
<220> FEATURE:
<221> NAME/KEY: misc_feature
<222> LOCATION: (1)..(6)
<223> OTHER INFORMATION: n is a, c, g, or t

<400> SEQUENCE: 8
nnnnnnctgt ctcttataca catctccgag cccacgagac                              40

<210> SEQ ID NO 9
<211> LENGTH: 58
<212> TYPE: DNA
<213> ORGANISM: Artificial Sequence
<220> FEATURE:
<223> OTHER INFORMATION: Synthetic: TL001, TruSeq universal adaptor - i5

<400> SEQUENCE: 9
aatgatacgg cgaccaccga gatctacact ctttccctac acgacgctct tccgatct          58

<210> SEQ ID NO 10
<211> LENGTH: 63
<212> TYPE: DNA
<213> ORGANISM: Artificial Sequence
<220> FEATURE:
<223> OTHER INFORMATION: Synthetic: TL002, TruSeq 6nt adaptor - i7
<220> FEATURE:
<221> NAME/KEY: misc_feature
<222> LOCATION: (34)..(39)
<223> OTHER INFORMATION: n is a, c, g, or t

<400> SEQUENCE: 10
gatcggaaga gcacacgtct gaactccagt cacnnnnnna tctcgtatgc cgtcttctgc        60
```

-continued ttg                                                                63

<210> SEQ ID NO 11
<211> LENGTH: 70
<212> TYPE: DNA
<213> ORGANISM: Artificial Sequence
<220> FEATURE:
<223> OTHER INFORMATION: Synthetic: TL003, TruSeq 8nt adaptor - i5
<220> FEATURE:
<221> NAME/KEY: misc_feature
<222> LOCATION: (30)..(37)
<223> OTHER INFORMATION: n is a, c, g, or t

<400> SEQUENCE: 11
aatgatacgg cgaccaccga gatctacacn nnnnnnnaca ctctttccct acacgacgct    60
cttccgatct                                                          70

<210> SEQ ID NO 12
<211> LENGTH: 65
<212> TYPE: DNA
<213> ORGANISM: Artificial Sequence
<220> FEATURE:
<223> OTHER INFORMATION: Synthetic: TL004, TruSeq 8nt adaptor - i7
<220> FEATURE:
<221> NAME/KEY: misc_feature
<222> LOCATION: (34)..(41)
<223> OTHER INFORMATION: n is a, c, g, or t

<400> SEQUENCE: 12
gatcggaaga gcacacgtct gaactccagt cacnnnnnnn natctcgtat gccgtcttct    60
gcttg                                                               65

<210> SEQ ID NO 13
<211> LENGTH: 72
<212> TYPE: DNA
<213> ORGANISM: Artificial Sequence
<220> FEATURE:
<223> OTHER INFORMATION: Synthetic: TL005, TruSeq 10nt adaptor - i5
<220> FEATURE:
<221> NAME/KEY: misc_feature
<222> LOCATION: (30)..(39)
<223> OTHER INFORMATION: n is a, c, g, or t

<400> SEQUENCE: 13
aatgatacgg cgaccaccga gatctacacn nnnnnnnna cactctttcc ctacacgacg    60
ctcttccgat ct                                                       72

<210> SEQ ID NO 14
<211> LENGTH: 67
<212> TYPE: DNA
<213> ORGANISM: Artificial Sequence
<220> FEATURE:
<223> OTHER INFORMATION: Synthetic: TL006, TruSeq 10nt adaptor - i7
<220> FEATURE:
<221> NAME/KEY: misc_feature
<222> LOCATION: (34)..(43)
<223> OTHER INFORMATION: n is a, c, g, or t

<400> SEQUENCE: 14
gatcggaaga gcacacgtct gaactccagt cacnnnnnnn nnnatctcgt atgccgtctt    60
ctgcttg                                                             67

<210> SEQ ID NO 15
<211> LENGTH: 33
<212> TYPE: DNA
<213> ORGANISM: Artificial Sequence

```
<220> FEATURE:
<223> OTHER INFORMATION: Synthetic: TL007, TruSeq short adaptor - i5

<400> SEQUENCE: 15
acactctttc cctacacgac gctcttccga tct                                33

<210> SEQ ID NO 16
<211> LENGTH: 33
<212> TYPE: DNA
<213> ORGANISM: Artificial Sequence
<220> FEATURE:
<223> OTHER INFORMATION: Synthetic: TL008, TruSeq short adaptor - i7

<400> SEQUENCE: 16
gatcggaaga gcacacgtct gaactccagt cac                                33

<210> SEQ ID NO 17
<211> LENGTH: 40
<212> TYPE: DNA
<213> ORGANISM: Artificial Sequence
<220> FEATURE:
<223> OTHER INFORMATION: Synthetic: TL009, TruSeq nrUMI adaptor - i5
<220> FEATURE:
<221> NAME/KEY: misc_feature
<222> LOCATION: (34)..(39)
<223> OTHER INFORMATION: n is a, c, g, or t

<400> SEQUENCE: 17
acactctttc cctacacgac gctcttccga tctnnnnnnt                         40

<210> SEQ ID NO 18
<211> LENGTH: 40
<212> TYPE: DNA
<213> ORGANISM: Artificial Sequence
<220> FEATURE:
<223> OTHER INFORMATION: Synthetic: TL010, TruSeq nrUMI adaptor -i5
<220> FEATURE:
<221> NAME/KEY: misc_feature
<222> LOCATION: (1)..(6)
<223> OTHER INFORMATION: n is a, c, g, or t

<400> SEQUENCE: 18
nnnnnnagat cggaagagca cacgtctgaa ctccagtcac                         40

<210> SEQ ID NO 19
<211> LENGTH: 20
<212> TYPE: DNA
<213> ORGANISM: Artificial Sequence
<220> FEATURE:
<223> OTHER INFORMATION: Synthetic: p5 sequence

<400> SEQUENCE: 19
aatgatacgg cgaccaccga                                               20

<210> SEQ ID NO 20
<211> LENGTH: 21
<212> TYPE: DNA
<213> ORGANISM: Artificial Sequence
<220> FEATURE:
<223> OTHER INFORMATION: Synthetic: p7 sequence

<400> SEQUENCE: 20
tcgtatgccg tcttctgctt g                                             21

<210> SEQ ID NO 21
<211> LENGTH: 21
<212> TYPE: DNA
```

<213> ORGANISM: Artificial Sequence
<220> FEATURE:
<223> OTHER INFORMATION: Synthetic: P7 reverse complement (P7')

<400> SEQUENCE: 21
caagcagaag acggcatacg a                                            21

<210> SEQ ID NO 22
<211> LENGTH: 33
<212> TYPE: DNA
<213> ORGANISM: Artificial Sequence
<220> FEATURE:
<223> OTHER INFORMATION: Synthetic: TruSeq i7 adaptor region

<400> SEQUENCE: 22
gatcggaaga gcacacgtct gaactccagt cac                               33

<210> SEQ ID NO 23
<211> LENGTH: 32
<212> TYPE: DNA
<213> ORGANISM: Artificial Sequence
<220> FEATURE:
<223> OTHER INFORMATION: Synthetic: TruSeq i5 adaptor region

<400> SEQUENCE: 23
acactctttc cctacacgac gctcttccga tc                                32

<210> SEQ ID NO 24
<211> LENGTH: 33
<212> TYPE: DNA
<213> ORGANISM: Artificial Sequence
<220> FEATURE:
<223> OTHER INFORMATION: Synthetic: V2.A14.METS sequence

<400> SEQUENCE: 24
tcgtcggcag cgtcagatgt gtataagaga cag                               33

<210> SEQ ID NO 25
<211> LENGTH: 34
<212> TYPE: DNA
<213> ORGANISM: Artificial Sequence
<220> FEATURE:
<223> OTHER INFORMATION: Synthetic: V2.B15.METS sequence

<400> SEQUENCE: 25
gtctcgtggg ctcggagatg tgtataagag acag                              34

<210> SEQ ID NO 26
<211> LENGTH: 6
<212> TYPE: DNA
<213> ORGANISM: Artificial Sequence
<220> FEATURE:
<223> OTHER INFORMATION: Synthetic: N-mer domain (e.g., a UMI)
<220> FEATURE:
<221> NAME/KEY: misc_feature
<222> LOCATION: (1)..(6)
<223> OTHER INFORMATION: n is a mix of 25 percent of each A, T, C, or G

<400> SEQUENCE: 26 nnnnnn                                                              6

<210> SEQ ID NO 27
<211> LENGTH: 70
<212> TYPE: DNA
<213> ORGANISM: Artificial Sequence
<220> FEATURE:
<223> OTHER INFORMATION: Synthetic: BN001, Nextera Blocker1 i5

<400> SEQUENCE: 27
aatgatacgg cgaccaccga gatctacact tttttttcg tcggcagcgt cagatgtgta      60
taagagacag                                                            70

<210> SEQ ID NO 28
<211> LENGTH: 66
<212> TYPE: DNA
<213> ORGANISM: Artificial Sequence
<220> FEATURE:
<223> OTHER INFORMATION: Synthetic: BN002, Nextera Blocker2 i7

<400> SEQUENCE: 28
caagcagaag acggcatacg agattttttt ttgtctcgtg ggctcggaga tgtgtataag      60
agacag                                                                66

<210> SEQ ID NO 29
<211> LENGTH: 71
<212> TYPE: DNA
<213> ORGANISM: Artificial Sequence
<220> FEATURE:
<223> OTHER INFORMATION: Synthetic: BN003, NRCBLK1PrimeRC

<400> SEQUENCE: 29
gctgtctctt atacacatct gacgctgccg acgattttttt ttgtgtagat ctcggtggtc     60
gccgtatcat t                                                          71

<210> SEQ ID NO 30
<211> LENGTH: 67
<212> TYPE: DNA
<213> ORGANISM: Artificial Sequence
<220> FEATURE:
<223> OTHER INFORMATION: Synthetic: BN004, NRCBLK2PrimeRC

<400> SEQUENCE: 30
gctgtctctt atacacatct ccgagcccac gagactttttt tttatctcgt atgccgtctt     60
ctgcttg                                                               67

<210> SEQ ID NO 31
<211> LENGTH: 70
<212> TYPE: DNA
<213> ORGANISM: Artificial Sequence
<220> FEATURE:
<223> OTHER INFORMATION: Synthetic: BN005, TiS517 with basepairing index
      sequence example

<400> SEQUENCE: 31
aatgatacgg cgaccaccga gatctacacg cgtaagatcg tcggcagcgt cagatgtgta      60
taagagacag                                                            70

<210> SEQ ID NO 32
<211> LENGTH: 66
<212> TYPE: DNA
<213> ORGANISM: Artificial Sequence
<220> FEATURE:
<223> OTHER INFORMATION: Synthetic: BN006, TiS701 with basepairing index
      sequence example

<400> SEQUENCE: 32
caagcagaag acggcatacg agattcgcct tagtctcgtg ggctcggaga tgtgtataag      60
agacag                                                                66

<210> SEQ ID NO 33
<211> LENGTH: 62
<212> TYPE: DNA
<213> ORGANISM: Artificial Sequence
<220> FEATURE:
<223> OTHER INFORMATION: Synthetic: BN007, TiBNA7

<400> SEQUENCE: 33
aatgatacgg cgaccaccga gatctacact cgtcggcagc gtcagatgtg tataagagac    60
ag                                                                  62

<210> SEQ ID NO 34
<211> LENGTH: 58
<212> TYPE: DNA
<213> ORGANISM: Artificial Sequence
<220> FEATURE:
<223> OTHER INFORMATION: Synthetic: BN008, TiBNA8

<400> SEQUENCE: 34
caagcagaag acggcatacg agatgtctcg tgggctcgga gatgtgtata agagacag     58

<210> SEQ ID NO 35
<211> LENGTH: 62
<212> TYPE: DNA
<213> ORGANISM: Artificial Sequence
<220> FEATURE:
<223> OTHER INFORMATION: Synthetic: BN009, TiLNA7

<400> SEQUENCE: 35
aatgatacgg cgaccaccga gatctacact cgtcggcagc gtcagatgtg tataagagac    60
ag                                                                  62

<210> SEQ ID NO 36
<211> LENGTH: 58
<212> TYPE: DNA
<213> ORGANISM: Artificial Sequence
<220> FEATURE:
<223> OTHER INFORMATION: Synthetic: BN010, TiLNA8

<400> SEQUENCE: 36
caagcagaag acggcatacg agatgtctcg tgggctcgga gatgtgtata agagacag     58

<210> SEQ ID NO 37
<211> LENGTH: 62
<212> TYPE: DNA
<213> ORGANISM: Artificial Sequence
<220> FEATURE:
<223> OTHER INFORMATION: Synthetic: BN011, TiBNA11

<400> SEQUENCE: 37
aatgatacgg cgaccaccga gatctacact cgtcggcagc gtcagatgtg tataagagac    60
ag                                                                  62

<210> SEQ ID NO 38
<211> LENGTH: 58
<212> TYPE: DNA
<213> ORGANISM: Artificial Sequence
<220> FEATURE:
<223> OTHER INFORMATION: Synthetic: BN012, TiBNA12

<400> SEQUENCE: 38
caagcagaag acggcatacg agatgtctcg tgggctcgga gatgtgtata agagacag     58

```
<210> SEQ ID NO 39
<211> LENGTH: 63
<212> TYPE: DNA
<213> ORGANISM: Artificial Sequence
<220> FEATURE:
<223> OTHER INFORMATION: Synthetic: BN013, TiBNA15G

<400> SEQUENCE: 39
aatgatacgg cgaccaccga gatctacacg tcgtcggcag cgtcagatgt gtataagaga      60
cag                                                                   63

<210> SEQ ID NO 40
<211> LENGTH: 59
<212> TYPE: DNA
<213> ORGANISM: Artificial Sequence
<220> FEATURE:
<223> OTHER INFORMATION: Synthetic: BN014, TiBNA16G

<400> SEQUENCE: 40
caagcagaag acggcatacg agatggtctc gtgggctcgg agatgtgtat aagagacag       59

<210> SEQ ID NO 41
<211> LENGTH: 63
<212> TYPE: DNA
<213> ORGANISM: Artificial Sequence
<220> FEATURE:
<223> OTHER INFORMATION: Synthetic: BN015, TiBNA15N
<220> FEATURE:
<221> NAME/KEY: misc_feature
<222> LOCATION: (30)..(30)
<223> OTHER INFORMATION: n is a, c, g, or t

<400> SEQUENCE: 41
aatgatacgg cgaccaccga gatctacacn tcgtcggcag cgtcagatgt gtataagaga      60
cag                                                                   63

<210> SEQ ID NO 42
<211> LENGTH: 59
<212> TYPE: DNA
<213> ORGANISM: Artificial Sequence
<220> FEATURE:
<223> OTHER INFORMATION: Synthetic: BN016, TiBNA16N
<220> FEATURE:
<221> NAME/KEY: misc_feature
<222> LOCATION: (25)..(25)
<223> OTHER INFORMATION: n is a, c, g, or t

<400> SEQUENCE: 42
caagcagaag acggcatacg agatngtctc gtgggctcgg agatgtgtat aagagacag       59

<210> SEQ ID NO 43
<211> LENGTH: 62
<212> TYPE: DNA
<213> ORGANISM: Artificial Sequence
<220> FEATURE:
<223> OTHER INFORMATION: Synthetic: BN017, TiLNA11

<400> SEQUENCE: 43
aatgatacgg cgaccaccga gatctacact cgtcggcagc gtcagatgtg tataagagac      60
ag                                                                    62

<210> SEQ ID NO 44
<211> LENGTH: 58
<212> TYPE: DNA
<213> ORGANISM: Artificial Sequence
<220> FEATURE:
```

<223> OTHER INFORMATION: Synthetic: BN018, TiLNA12

<400> SEQUENCE: 44
caagcagaag acggcatacg agatgtctcg tgggctcgga gatgtgtata agagacag    58

<210> SEQ ID NO 45
<211> LENGTH: 63
<212> TYPE: DNA
<213> ORGANISM: Artificial Sequence
<220> FEATURE:
<223> OTHER INFORMATION: Synthetic: BN019, TiLNA15G

<400> SEQUENCE: 45
aatgatacgg cgaccaccga gatctacacg tcgtcggcag cgtcagatgt gtataagaga    60
cag    63

<210> SEQ ID NO 46
<211> LENGTH: 59
<212> TYPE: DNA
<213> ORGANISM: Artificial Sequence
<220> FEATURE:
<223> OTHER INFORMATION: Synthetic: BN020, TiLNA16G

<400> SEQUENCE: 46
caagcagaag acggcatacg agatggtctc gtgggctcgg agatgtgtat aagagacag    59

<210> SEQ ID NO 47
<211> LENGTH: 63
<212> TYPE: DNA
<213> ORGANISM: Artificial Sequence
<220> FEATURE:
<223> OTHER INFORMATION: Synthetic: BN021, TiLNA15N
<220> FEATURE:
<221> NAME/KEY: misc_feature
<222> LOCATION: (30)..(30)
<223> OTHER INFORMATION: n is a, c, g, or t

<400> SEQUENCE: 47
aatgatacgg cgaccaccga gatctacacn tcgtcggcag cgtcagatgt gtataagaga    60
cag    63

<210> SEQ ID NO 48
<211> LENGTH: 59
<212> TYPE: DNA
<213> ORGANISM: Artificial Sequence
<220> FEATURE:
<223> OTHER INFORMATION: Synthetic: BN022, TiLNA16N
<220> FEATURE:
<221> NAME/KEY: misc_feature
<222> LOCATION: (25)..(25)
<223> OTHER INFORMATION: n is a, c, g, or t

<400> SEQUENCE: 48
caagcagaag acggcatacg agatngtctc gtgggctcgg agatgtgtat aagagacag    59

<210> SEQ ID NO 49
<211> LENGTH: 29
<212> TYPE: DNA
<213> ORGANISM: Artificial Sequence
<220> FEATURE:
<223> OTHER INFORMATION: Synthetic: BN023, P5LNA

<400> SEQUENCE: 49
aatgatacgg cgaccaccga gatctacac    29

```
<210> SEQ ID NO 50
<211> LENGTH: 24
<212> TYPE: DNA
<213> ORGANISM: Artificial Sequence
<220> FEATURE:
<223> OTHER INFORMATION: Synthetic: BN024, P7LNA

<400> SEQUENCE: 50
caagcagaag acggcatacg agat                                              24

<210> SEQ ID NO 51
<211> LENGTH: 33
<212> TYPE: DNA
<213> ORGANISM: Artificial Sequence
<220> FEATURE:
<223> OTHER INFORMATION: Synthetic: BN025, TiLNAS1

<400> SEQUENCE: 51
tcgtcggcag cgtcagatgt gtataagaga cag                                    33

<210> SEQ ID NO 52
<211> LENGTH: 34
<212> TYPE: DNA
<213> ORGANISM: Artificial Sequence
<220> FEATURE:
<223> OTHER INFORMATION: Synthetic: BN026, TiLNAS2

<400> SEQUENCE: 52
gtctcgtggg ctcggagatg tgtataagag acag                                   34

<210> SEQ ID NO 53
<211> LENGTH: 42
<212> TYPE: DNA
<213> ORGANISM: Artificial Sequence
<220> FEATURE:
<223> OTHER INFORMATION: Synthetic: BN027, TiLNA17

<400> SEQUENCE: 53
ggcgaccacc gagatctaca ctcgtcggca gcgtcagatg tg                          42

<210> SEQ ID NO 54
<211> LENGTH: 42
<212> TYPE: DNA
<213> ORGANISM: Artificial Sequence
<220> FEATURE:
<223> OTHER INFORMATION: Synthetic: BN028, TiLNA18

<400> SEQUENCE: 54
ggcatacgag atgtctcgtg ggctcggaga tgtgtataag ag                          42

<210> SEQ ID NO 55
<211> LENGTH: 29
<212> TYPE: DNA
<213> ORGANISM: Artificial Sequence
<220> FEATURE:
<223> OTHER INFORMATION: Synthetic: BN029, P5BNA-All

<400> SEQUENCE: 55
aatgatacgg cgaccaccga gatctacac                                         29

<210> SEQ ID NO 56
<211> LENGTH: 24
<212> TYPE: DNA
<213> ORGANISM: Artificial Sequence
<220> FEATURE:
<223> OTHER INFORMATION: Synthetic: BN030, P7BNA-All
```

```
<400> SEQUENCE: 56
caagcagaag acggcatacg agat                                          24

<210> SEQ ID NO 57
<211> LENGTH: 33
<212> TYPE: DNA
<213> ORGANISM: Artificial Sequence
<220> FEATURE:
<223> OTHER INFORMATION: Synthetic: BN031, TiBNAS1-All

<400> SEQUENCE: 57
tcgtcggcag cgtcagatgt gtataagaga cag                                33

<210> SEQ ID NO 58
<211> LENGTH: 34
<212> TYPE: DNA
<213> ORGANISM: Artificial Sequence
<220> FEATURE:
<223> OTHER INFORMATION: Synthetic: BN032, TiBNAS2-All

<400> SEQUENCE: 58
gtctcgtggg ctcggagatg tgtataagag acag                               34

<210> SEQ ID NO 59
<211> LENGTH: 29
<212> TYPE: DNA
<213> ORGANISM: Artificial Sequence
<220> FEATURE:
<223> OTHER INFORMATION: Synthetic: BN033, P5BNA-half

<400> SEQUENCE: 59
aatgatacgg cgaccaccga gatctacac                                     29

<210> SEQ ID NO 60
<211> LENGTH: 24
<212> TYPE: DNA
<213> ORGANISM: Artificial Sequence
<220> FEATURE:
<223> OTHER INFORMATION: Synthetic: BN034, P7BNA-half

<400> SEQUENCE: 60
caagcagaag acggcatacg agat                                          24

<210> SEQ ID NO 61
<211> LENGTH: 33
<212> TYPE: DNA
<213> ORGANISM: Artificial Sequence
<220> FEATURE:
<223> OTHER INFORMATION: Synthetic: BN035, TiBNAS1-half

<400> SEQUENCE: 61
tcgtcggcag cgtcagatgt gtataagaga cag                                33

<210> SEQ ID NO 62
<211> LENGTH: 34
<212> TYPE: DNA
<213> ORGANISM: Artificial Sequence
<220> FEATURE:
<223> OTHER INFORMATION: Synthetic: BN036, TiBNAS2-half

<400> SEQUENCE: 62
gtctcgtggg ctcggagatg tgtataagag acag                               34

<210> SEQ ID NO 63
<211> LENGTH: 29
```

```
<212> TYPE: DNA
<213> ORGANISM: Artificial Sequence
<220> FEATURE:
<223> OTHER INFORMATION: Synthetic: BN037, P5BNA-Alt

<400> SEQUENCE: 63
aatgatacgg cgaccaccga gatctacac                                    29

<210> SEQ ID NO 64
<211> LENGTH: 24
<212> TYPE: DNA
<213> ORGANISM: Artificial Sequence
<220> FEATURE:
<223> OTHER INFORMATION: Synthetic: BN038, P7BNA-Alt

<400> SEQUENCE: 64
caagcagaag acggcatacg agat                                         24

<210> SEQ ID NO 65
<211> LENGTH: 33
<212> TYPE: DNA
<213> ORGANISM: Artificial Sequence
<220> FEATURE:
<223> OTHER INFORMATION: Synthetic: BN039, TiBNAS1-Alt

<400> SEQUENCE: 65
tcgtcggcag cgtcagatgt gtataagaga cag                               33

<210> SEQ ID NO 66
<211> LENGTH: 34
<212> TYPE: DNA
<213> ORGANISM: Artificial Sequence
<220> FEATURE:
<223> OTHER INFORMATION: Synthetic: BN040, TiBNAS2-Alt

<400> SEQUENCE: 66
gtctcgtggg ctcggagatg tgtataagag acag                              34

<210> SEQ ID NO 67
<211> LENGTH: 70
<212> TYPE: DNA
<213> ORGANISM: Artificial Sequence
<220> FEATURE:
<223> OTHER INFORMATION: Synthetic: BN041, TiBNA3

<400> SEQUENCE: 67
aatgatacgg cgaccaccga gatctacact tttttttcg tcggcagcgt cagatgtgta   60
taagagacag                                                         70

<210> SEQ ID NO 68
<211> LENGTH: 66
<212> TYPE: DNA
<213> ORGANISM: Artificial Sequence
<220> FEATURE:
<223> OTHER INFORMATION: Synthetic: BN042, TiBNA4

<400> SEQUENCE: 68
caagcagaag acggcatacg agatttttttt ttgtctcgtg gctcggaga tgtgtataag  60 agacag                                                             66

<210> SEQ ID NO 69
<211> LENGTH: 70
<212> TYPE: DNA
<213> ORGANISM: Artificial Sequence
<220> FEATURE:
```

<223> OTHER INFORMATION: Synthetic: BN043, TiBNA1

<400> SEQUENCE: 69
aatgatacgg cgaccaccga gatctacact tttttttcg tcggcagcgt cagatgtgta    60
taagagacag                                                          70

<210> SEQ ID NO 70
<211> LENGTH: 66
<212> TYPE: DNA
<213> ORGANISM: Artificial Sequence
<220> FEATURE:
<223> OTHER INFORMATION: Synthetic: BN044, TiBNA2

<400> SEQUENCE: 70
caagcagaag acggcatacg agatttttt ttgtctcgtg ggctcggaga tgtgtataag    60
agacag                                                              66

<210> SEQ ID NO 71
<211> LENGTH: 63
<212> TYPE: DNA
<213> ORGANISM: Artificial Sequence
<220> FEATURE:
<223> OTHER INFORMATION: Synthetic: BL001, CT3 Blocker1 i7

<400> SEQUENCE: 71
caagcagaag acggcatacg agatttttt gtgactggag ttcagacgtg tgctcttccg    60
atc                                                                 63

<210> SEQ ID NO 72
<211> LENGTH: 57
<212> TYPE: DNA
<213> ORGANISM: Artificial Sequence
<220> FEATURE:
<223> OTHER INFORMATION: Synthetic: BL002, CT3 Blocker2 i5

<400> SEQUENCE: 72
aatgatacgg cgaccaccga gatctacact ctttccctac acgacgctct ccgatc       57

<210> SEQ ID NO 73
<211> LENGTH: 57
<212> TYPE: DNA
<213> ORGANISM: Artificial Sequence
<220> FEATURE:
<223> OTHER INFORMATION: Synthetic: BL003, TSLTLNA13

<400> SEQUENCE: 73
aatgatacgg cgaccaccga gatctacact ctttccctac acgacgctct ccgatc       57

<210> SEQ ID NO 74
<211> LENGTH: 57
<212> TYPE: DNA
<213> ORGANISM: Artificial Sequence
<220> FEATURE:
<223> OTHER INFORMATION: Synthetic: BL004, TSLTLNA14

<400> SEQUENCE: 74
caagcagaag acggcatacg agatgtgact ggagttcaga cgtgtgctct tccgatc      57

<210> SEQ ID NO 75
<211> LENGTH: 61
<212> TYPE: DNA
<213> ORGANISM: Artificial Sequence
<220> FEATURE:
<223> OTHER INFORMATION: Synthetic: BL005, TSHTLNA13

<400> SEQUENCE: 75
aatgatacgg cgaccaccga gatctacaca cactctttcc ctacacgacg ctcttccgat      60
c                                                                      61

<210> SEQ ID NO 76
<211> LENGTH: 57
<212> TYPE: DNA
<213> ORGANISM: Artificial Sequence
<220> FEATURE:
<223> OTHER INFORMATION: Synthetic: BL006, TSHTLNA14

<400> SEQUENCE: 76
caagcagaag acggcatacg agatgtgact ggagttcaga cgtgtgctct tccgatc        57

<210> SEQ ID NO 77
<211> LENGTH: 61
<212> TYPE: DNA
<213> ORGANISM: Artificial Sequence
<220> FEATURE:
<223> OTHER INFORMATION: Synthetic: BL007, TSHTLNA15

<400> SEQUENCE: 77
aatgatacgg cgaccaccga gatctacaca cactctttcc ctacacgacg ctcttccgat      60
c                                                                      61

<210> SEQ ID NO 78
<211> LENGTH: 57
<212> TYPE: DNA
<213> ORGANISM: Artificial Sequence
<220> FEATURE:
<223> OTHER INFORMATION: Synthetic: BL008, TSHTLNA16

<400> SEQUENCE: 78
caagcagaag acggcatacg agatgtgact ggagttcaga cgtgtgctct tccgatc        57

<210> SEQ ID NO 79
<211> LENGTH: 62
<212> TYPE: DNA
<213> ORGANISM: Artificial Sequence
<220> FEATURE:
<223> OTHER INFORMATION: Synthetic: BL009, TSHTLNA15G

<400> SEQUENCE: 79
aatgatacgg cgaccaccga gatctacacg acactctttc cctacacgac gctcttccga      60
tc                                                                     62

<210> SEQ ID NO 80
<211> LENGTH: 58
<212> TYPE: DNA
<213> ORGANISM: Artificial Sequence
<220> FEATURE:
<223> OTHER INFORMATION: Synthetic: BL010, TSHTLNA16G

<400> SEQUENCE: 80
caagcagaag acggcatacg agatggtgac tggagttcag acgtgtgctc ttccgatc      58

<210> SEQ ID NO 81
<211> LENGTH: 62
<212> TYPE: DNA
<213> ORGANISM: Artificial Sequence
<220> FEATURE:
<223> OTHER INFORMATION: Synthetic: BL011, TSHTLNA15N
<220> FEATURE:

```
<221> NAME/KEY: misc_feature
<222> LOCATION: (30)..(30)
<223> OTHER INFORMATION: n is a, c, g, or t

<400> SEQUENCE: 81
aatgatacgg cgaccaccga gatctacacn acactctttc cctacacgac gctcttccga    60
tc                                                                   62

<210> SEQ ID NO 82
<211> LENGTH: 58
<212> TYPE: DNA
<213> ORGANISM: Artificial Sequence
<220> FEATURE:
<223> OTHER INFORMATION: Synthetic: BL012, TSHTLNA16N
<220> FEATURE:
<221> NAME/KEY: misc_feature
<222> LOCATION: (25)..(25)
<223> OTHER INFORMATION: n is a, c, g, or t

<400> SEQUENCE: 82
caagcagaag acggcatacg agatngtgac tggagttcag acgtgtgctc ttccgatc      58

<210> SEQ ID NO 83
<211> LENGTH: 57
<212> TYPE: DNA
<213> ORGANISM: Artificial Sequence
<220> FEATURE:
<223> OTHER INFORMATION: Synthetic: BL013, TSLTBNA13

<400> SEQUENCE: 83
aatgatacgg cgaccaccga gatctacact ctttccctac acgacgctct tccgatc       57

<210> SEQ ID NO 84
<211> LENGTH: 57
<212> TYPE: DNA
<213> ORGANISM: Artificial Sequence
<220> FEATURE:
<223> OTHER INFORMATION: Synthetic: BL014, TSLTBNA14

<400> SEQUENCE: 84
caagcagaag acggcatacg agatgtgact ggagttcaga cgtgtgctct tccgatc       57

<210> SEQ ID NO 85
<211> LENGTH: 61
<212> TYPE: DNA
<213> ORGANISM: Artificial Sequence
<220> FEATURE:
<223> OTHER INFORMATION: Synthetic: BL015, TSHTBNA13

<400> SEQUENCE: 85
aatgatacgg cgaccaccga gatctacaca cactctttcc ctacacgacg ctcttccgat    60
c                                                                    61

<210> SEQ ID NO 86
<211> LENGTH: 57
<212> TYPE: DNA
<213> ORGANISM: Artificial Sequence
<220> FEATURE:
<223> OTHER INFORMATION: Synthetic: BL016, TSHTBNA14

<400> SEQUENCE: 86
caagcagaag acggcatacg agatgtgact ggagttcaga cgtgtgctct tccgatc       57

<210> SEQ ID NO 87
<211> LENGTH: 61
```

```
<212> TYPE: DNA
<213> ORGANISM: Artificial Sequence
<220> FEATURE:
<223> OTHER INFORMATION: Synthetic: BL017, TSHTBNA15

<400> SEQUENCE: 87
aatgatacgg cgaccaccga gatctacaca cactctttcc ctacacgacg ctcttccgat      60
c                                                                     61

<210> SEQ ID NO 88
<211> LENGTH: 57
<212> TYPE: DNA
<213> ORGANISM: Artificial Sequence
<220> FEATURE:
<223> OTHER INFORMATION: Synthetic: BL018, TSHTBNA16

<400> SEQUENCE: 88
caagcagaag acggcatacg agatgtgact ggagttcaga cgtgtgctct tccgatc        57

<210> SEQ ID NO 89
<211> LENGTH: 68
<212> TYPE: DNA
<213> ORGANISM: Artificial Sequence
<220> FEATURE:
<223> OTHER INFORMATION: Synthetic: BX001, Nextera Blocker1_2X

<400> SEQUENCE: 89
aatgataggc gaccaccgag atctacactt tttttttcgt cggcagcgtc agatgtgtat     60
aagagaag                                                              68

<210> SEQ ID NO 90
<211> LENGTH: 67
<212> TYPE: DNA
<213> ORGANISM: Artificial Sequence
<220> FEATURE:
<223> OTHER INFORMATION: Synthetic: BX002, Nextera Blocker1_3X

<400> SEQUENCE: 90
aatgataggc gaccaccgag attacacttt tttttcgtc ggcagcgtca gatgtgtata      60
agagaag                                                               67

<210> SEQ ID NO 91
<211> LENGTH: 68
<212> TYPE: DNA
<213> ORGANISM: Artificial Sequence
<220> FEATURE:
<223> OTHER INFORMATION: Synthetic: BX003, Nextera Blocker1_2Xalt

<400> SEQUENCE: 91
aatgatacgg cgaccaccga gattacactt tttttttcgt cggcagcgtc agatgtgtat     60
aagagaag                                                              68

<210> SEQ ID NO 92
<211> LENGTH: 67
<212> TYPE: DNA
<213> ORGANISM: Artificial Sequence
<220> FEATURE:
<223> OTHER INFORMATION: Synthetic: BX004, Nextera Blocker1_3Xalt

<400> SEQUENCE: 92
aatgatacgg cgaccaccga gattacactt tttttttgtc ggcagcgtca gatgtgtata     60
agagaag                                                               67
```

<210> SEQ ID NO 93
<211> LENGTH: 64
<212> TYPE: DNA
<213> ORGANISM: Artificial Sequence
<220> FEATURE:
<223> OTHER INFORMATION: Synthetic: BX005, Nextera Blocker2_2X

<400> SEQUENCE: 93
caagagaaga cggcatacga gattttttttt tgtctcgtgg gctcggagat gtgtataaga    60
gaag    64

<210> SEQ ID NO 94
<211> LENGTH: 63
<212> TYPE: DNA
<213> ORGANISM: Artificial Sequence
<220> FEATURE:
<223> OTHER INFORMATION: Synthetic: BX006, Nextera Blocker2_3X

<400> SEQUENCE: 94
caagagaaga cggcatagag attttttttt gtctcgtggg ctcggagatg tgtataagag    60
aag    63

<210> SEQ ID NO 95
<211> LENGTH: 64
<212> TYPE: DNA
<213> ORGANISM: Artificial Sequence
<220> FEATURE:
<223> OTHER INFORMATION: Synthetic: BX007, Nextera Blocker2_2Xalt

<400> SEQUENCE: 95
caagcagaag acggcatacg agattttttt ttgttcgtgg gctcggagat gtgtataaga    60
gaag    64

<210> SEQ ID NO 96
<211> LENGTH: 63
<212> TYPE: DNA
<213> ORGANISM: Artificial Sequence
<220> FEATURE:
<223> OTHER INFORMATION: Synthetic: BX008, Nextera Blocker2_3Xalt

<400> SEQUENCE: 96
caagcagaag acggcatacg agattttttt ttgttcgtgg gctggagatg tgtataagag    60
aag    63

<210> SEQ ID NO 97
<211> LENGTH: 61
<212> TYPE: DNA
<213> ORGANISM: Artificial Sequence
<220> FEATURE:
<223> OTHER INFORMATION: Synthetic: BX009, Nextera Blocker1_5X4Y

<400> SEQUENCE: 97
aatgataggc gacaccgaga ttacactttt tttttcgtcg gagcgtcaga ggaaagagaa    60
g    61

<210> SEQ ID NO 98
<211> LENGTH: 57
<212> TYPE: DNA
<213> ORGANISM: Artificial Sequence
<220> FEATURE:
<223> OTHER INFORMATION: Synthetic: BX010, Nextera Blocker2_5X4Y

<400> SEQUENCE: 98
caagagaaga ggcatagaga ttttttttg tctcgtgggt cggagaggaa agagaag    57

<210> SEQ ID NO 99
<211> LENGTH: 26
<212> TYPE: DNA
<213> ORGANISM: Artificial Sequence
<220> FEATURE:
<223> OTHER INFORMATION: Synthetic: BX011, Nextera Blocker1_5X4Y-outer

<400> SEQUENCE: 99
aatgataggc gacaccgaga ttacac    26

<210> SEQ ID NO 100
<211> LENGTH: 27
<212> TYPE: DNA
<213> ORGANISM: Artificial Sequence
<220> FEATURE:
<223> OTHER INFORMATION: Synthetic: BX012, Nextera Blocker1_5X4Y-inner

<400> SEQUENCE: 100
tcgtcggagc gtcagaggaa agagaag    27

<210> SEQ ID NO 101
<211> LENGTH: 21
<212> TYPE: DNA
<213> ORGANISM: Artificial Sequence
<220> FEATURE:
<223> OTHER INFORMATION: Synthetic: BX013, Nextera Blocker2_5X4Y-outer

<400> SEQUENCE: 101
caagagaaga ggcatagaga t    21

<210> SEQ ID NO 102
<211> LENGTH: 28
<212> TYPE: DNA
<213> ORGANISM: Artificial Sequence
<220> FEATURE:
<223> OTHER INFORMATION: Synthetic: BX014, Nextera Blocker2_5X4Y-inner

<400> SEQUENCE: 102
gtctcgtggg tcggagagga aagagaag    28

<210> SEQ ID NO 103
<211> LENGTH: 8
<212> TYPE: DNA
<213> ORGANISM: Artificial Sequence
<220> FEATURE:
<223> OTHER INFORMATION: Synthetic: Thymine bases at index position in
      oligos

<400> SEQUENCE: 103 tttttttt    8

<210> SEQ ID NO 104
<211> LENGTH: 70
<212> TYPE: DNA
<213> ORGANISM: Artificial Sequence
<220> FEATURE:
<223> OTHER INFORMATION: Synthetic: Nextera Blocker1 (15016424) i5,
      Illumina Nextera i5 blocker

<400> SEQUENCE: 104
aatgatacgg cgaccaccga gatctacact tttttttcg tcggcagcgt cagatgtgta    60
taagagacag    70

<210> SEQ ID NO 105
<211> LENGTH: 66
<212> TYPE: DNA
<213> ORGANISM: Artificial Sequence
<220> FEATURE:
<223> OTHER INFORMATION: Synthetic: Nextera Blocker2 (15016425) i7,
      Illumina Nextera i7 blocker

<400> SEQUENCE: 105
caagcagaag acggcatacg agatttttt ttgtctcgtg ggctcggaga tgtgtataag      60
agacag                                                                66

<210> SEQ ID NO 106
<211> LENGTH: 70
<212> TYPE: DNA
<213> ORGANISM: Artificial Sequence
<220> FEATURE:
<223> OTHER INFORMATION: Synthetic: TiBNA1, Nextera Blocker1_3XCG

<400> SEQUENCE: 106
aatgatacgg cgaccaccga gatctacact tttttttcg tcggcagcgt cagatgtgta      60
taagagacag                                                            70

<210> SEQ ID NO 107
<211> LENGTH: 66
<212> TYPE: DNA
<213> ORGANISM: Artificial Sequence
<220> FEATURE:
<223> OTHER INFORMATION: Synthetic: TiBNA2, Nextera Blocker2_3XCG

<400> SEQUENCE: 107
caagcagaag acggcatacg agatttttt ttgtctcgtg ggctcggaga tgtgtataag      60
agacag                                                                66

<210> SEQ ID NO 108
<211> LENGTH: 70
<212> TYPE: DNA
<213> ORGANISM: Artificial Sequence
<220> FEATURE:
<223> OTHER INFORMATION: Synthetic: TiBNA3, Nextera Blocker1_6XCG

<400> SEQUENCE: 108
aatgatacgg cgaccaccga gatctacact tttttttcg tcggcagcgt cagatgtgta      60
taagagacag                                                            70

<210> SEQ ID NO 109
<211> LENGTH: 66
<212> TYPE: DNA
<213> ORGANISM: Artificial Sequence
<220> FEATURE:
<223> OTHER INFORMATION: Synthetic: TiBNA4, Nextera Blocker2_6XCG

<400> SEQUENCE: 109
caagcagaag acggcatacg agatttttt ttgtctcgtg ggctcggaga tgtgtataag      60
agacag                                                                66

<210> SEQ ID NO 110
<211> LENGTH: 70
<212> TYPE: DNA
<213> ORGANISM: Artificial Sequence
<220> FEATURE:
<223> OTHER INFORMATION: Synthetic: TiBNA5, Nextera Blocker1_10XCG

```
<400> SEQUENCE: 110
aatgatacgg cgaccaccga gatctacact tttttttcg tcggcagcgt cagatgtgta      60
taagagacag                                                            70

<210> SEQ ID NO 111
<211> LENGTH: 66
<212> TYPE: DNA
<213> ORGANISM: Artificial Sequence
<220> FEATURE:
<223> OTHER INFORMATION: Synthetic: TiBNA6, Nextera Blocker2_10XCG

<400> SEQUENCE: 111
caagcagaag acggcatacg agatttttt ttgtctcgtg ggctcggaga tgtgtataag      60
agacag                                                                66

<210> SEQ ID NO 112
<211> LENGTH: 70
<212> TYPE: DNA
<213> ORGANISM: Artificial Sequence
<220> FEATURE:
<223> OTHER INFORMATION: Synthetic: TiS517, SSpecificBlocker517

<400> SEQUENCE: 112
aatgatacgg cgaccaccga gatctacacg cgtaagatcg tcggcagcgt cagatgtgta      60
taagagacag                                                             70

<210> SEQ ID NO 113
<211> LENGTH: 66
<212> TYPE: DNA
<213> ORGANISM: Artificial Sequence
<220> FEATURE:
<223> OTHER INFORMATION: Synthetic: TiS701, SSpecificBlocker701

<400> SEQUENCE: 113
caagcagaag acggcatacg agattcgcct tagtctcgtg ggctcggaga tgtgtataag      60
agacag                                                                66

<210> SEQ ID NO 114
<211> LENGTH: 62
<212> TYPE: DNA
<213> ORGANISM: Artificial Sequence
<220> FEATURE:
<223> OTHER INFORMATION: Synthetic: BL007, TSHTLNA15G

<400> SEQUENCE: 114
aatgatacgg cgaccaccga gatctacacg acactctttc cctacacgac gctcttccga      60
tc                                                                    62

<210> SEQ ID NO 115
<211> LENGTH: 58
<212> TYPE: DNA
<213> ORGANISM: Artificial Sequence
<220> FEATURE:
<223> OTHER INFORMATION: Synthetic: BL008, TSHTLNA16G

<400> SEQUENCE: 115
caagcagaag acggcatacg agatggtgac tggagttcag acgtgtgctc ttccgatc       58

<210> SEQ ID NO 116
<211> LENGTH: 62
<212> TYPE: DNA
<213> ORGANISM: Artificial Sequence
```

```
<220> FEATURE:
<223> OTHER INFORMATION: Synthetic: BL009, TSHTLNA15N
<220> FEATURE:
<221> NAME/KEY: misc_feature
<222> LOCATION: (30)..(30)
<223> OTHER INFORMATION: n is a, c, g, or t

<400> SEQUENCE: 116
aatgatacgg cgaccaccga gatctacacn acactctttc cctacacgac gctcttccga    60
tc                                                                   62

<210> SEQ ID NO 117
<211> LENGTH: 58
<212> TYPE: DNA
<213> ORGANISM: Artificial Sequence
<220> FEATURE:
<223> OTHER INFORMATION: Synthetic: BL010, TSHTLNA16N
<220> FEATURE:
<221> NAME/KEY: misc_feature
<222> LOCATION: (25)..(25)
<223> OTHER INFORMATION: n is a, c, g, or t

<400> SEQUENCE: 117
caagcagaag acggcatacg agatngtgac tggagttcag acgtgtgctc ttccgatc      58

<210> SEQ ID NO 118
<211> LENGTH: 29
<212> TYPE: DNA
<213> ORGANISM: Artificial Sequence
<220> FEATURE:
<223> OTHER INFORMATION: Synthetic: BN023, P5LNA

<400> SEQUENCE: 118
aatgatacgg cgaccaccga gatctacac                                      29

<210> SEQ ID NO 119
<211> LENGTH: 24
<212> TYPE: DNA
<213> ORGANISM: Artificial Sequence
<220> FEATURE:
<223> OTHER INFORMATION: Synthetic: BN024, P7LNA

<400> SEQUENCE: 119
caagcagaag acggcatacg agat                                           24

<210> SEQ ID NO 120
<211> LENGTH: 33
<212> TYPE: DNA
<213> ORGANISM: Artificial Sequence
<220> FEATURE:
<223> OTHER INFORMATION: Synthetic: BN025, TiLNAS1

<400> SEQUENCE: 120
tcgtcggcag cgtcagatgt gtataagaga cag                                 33

<210> SEQ ID NO 121
<211> LENGTH: 34
<212> TYPE: DNA
<213> ORGANISM: Artificial Sequence
<220> FEATURE:
<223> OTHER INFORMATION: Synthetic: BN026, TiLNAS2

<400> SEQUENCE: 121
gtctcgtggg ctcggagatg tgtataagag acag                                34

<210> SEQ ID NO 122
```

```
<211> LENGTH: 42
<212> TYPE: DNA
<213> ORGANISM: Artificial Sequence
<220> FEATURE:
<223> OTHER INFORMATION: Synthetic: BN027, TiLNA17

<400> SEQUENCE: 122
ggcgaccacc gagatctaca ctcgtcggca gcgtcagatg tg                              42

<210> SEQ ID NO 123
<211> LENGTH: 42
<212> TYPE: DNA
<213> ORGANISM: Artificial Sequence
<220> FEATURE:
<223> OTHER INFORMATION: Synthetic: BN028, TiLNA18

<400> SEQUENCE: 123
ggcatacgag atgtctcgtg ggctcggaga tgtgtataag ag                              42
```

COMPOSITIONS AND METHODS FOR IMPROVING LIBRARY ENRICHMENT

CROSS-REFERENCE TO RELATED APPLICATIONS

This application is a national stage entry of International Patent Application No. PCT/US2019/046396, filed Aug. 13, 2019, which claims benefit under 35 U.S.C. § 119(e) of U.S. Provisional Application No. 62/764,753, filed Aug. 15, 2018, the contents of which is are incorporated herein by reference in its their entirety.

SEQUENCE LISTING

This application contains a Sequence Listing in computer readable form entitled "01243-0009-00PCT_ST25," created Aug. 5, 2019, having a size of 32 KB, which is incorporated by reference herein.

SUMMARY OF THE INVENTION

Despite rapid advances in next-generation sequencing (NGS) throughput, classic library preparation and enrichment methods are time-intensive and may result in a throughput-limiting bottleneck. This disclosure describes compositions including a blocker and/or a hybridization buffer, methods for using those compositions, and methods for improving the efficiency of nucleic acid selection prior to sequencing.

In one aspect, this disclosure describes a hybridization buffer including a crowding agent and at least one of human Cot-1 DNA, a destabilizing agent, salt, and a blocker.

In another aspect, this disclosure describes a method that includes using the hybridization buffer. This disclosure also describes a kit including the hybridization buffer.

In a further aspect, this disclosure describes a blocker including an oligonucleotide, wherein the blocker is capable of binding to an adaptor. The adaptor includes a universal primer sequence and at least one of an index region or a unique molecular identifier (UMI). The region of the blocker capable of binding to the index region and/or UMI of the adaptor includes: at least three thymine bases or universal bases and at least one non-universal base.

In yet another aspect, this disclosure describes a blocker including two non-connected oligonucleotides. The blocker is capable of binding to at least a portion of an adaptor, wherein the adaptor comprises a universal primer sequence and at least one of an index region or a unique molecular identifier (UMI). The non-connected oligonucleotides include bases that do not correspond to the index region and/or the UMI of the adaptor.

This disclosure also describes a method that includes using the blockers described herein and a kit including the blockers described herein.

In a further aspect, this disclosure describes a method that includes contacting a library with a blocker in the presence of a hybridization buffer; and contacting the library with a probe, wherein the probe hybridizes to a region of interest within a library member. The method does not include amplifying the library members using PCR prior to sequencing the library members.

As used herein, the term "nucleic acid" is intended to be consistent with its use in the art and includes naturally occurring nucleic acids or functional analogs thereof. Particularly useful functional analogs are capable of hybridizing to a nucleic acid in a sequence specific fashion or capable of being used as a template for replication of a particular nucleotide sequence. Naturally occurring nucleic acids generally have a backbone containing phosphodiester bonds. An analog structure can have an alternate backbone linkage including any of a variety of those known in the art. Naturally occurring nucleic acids generally have a deoxyribose sugar (e.g., found in deoxyribonucleic acid (DNA)) or a ribose sugar (e.g., found in ribonucleic acid (RNA)). A nucleic acid can contain any of a variety of analogs of these sugar moieties that are known in the art. A nucleic acid can include native or non-native bases. In this regard, a native deoxyribonucleic acid can have one or more bases selected from the group consisting of adenine, thymine, cytosine or guanine and a ribonucleic acid can have one or more bases selected from the group consisting of uracil, adenine, cytosine or guanine. Useful non-native bases that can be included in a nucleic acid are known in the art. The term "target," when used in reference to a nucleic acid, is intended as a semantic identifier for the nucleic acid in the context of a method or composition set forth herein and does not necessarily limit the structure or function of the nucleic acid beyond what is otherwise explicitly indicated.

As used herein, the term "$T_m$" refers to the temperature at which half of the DNA strands of a sample are in a double helical state and half of the DNA strands of a sample are in a random coil state.

As used herein, the term "adaptor" and its derivatives (e.g., universal adaptor, non-target adaptor, etc.) refer generally to any linear, single-stranded oligonucleotide which can be ligated to a nucleic acid molecule of the disclosure. In some embodiments, the adaptor is substantially non-complementary to the 3' end or the 5' end of any target sequence present in the sample. In some embodiments, suitable adaptor lengths are in the range of 10-100 nucleotides, 12-60 nucleotides and 15-50 nucleotides in length. Generally, the adaptor can include any combination of nucleotides and/or nucleic acids. In some aspects, the adaptor can include one or more cleavable groups at one or more locations. In another aspect, the adaptor can include a sequence that is substantially identical, or substantially complementary, to at least a portion of a primer, for example a universal primer. In some embodiments, the adaptor can include an index or tag to assist with downstream error correction, identification or sequencing.

As used herein, the term "universal sequence" refers to a region of sequence that is common to two or more nucleic acid molecules, e.g., adaptor-target adaptor molecules, where the molecules also have regions of sequence that differ from each other. A universal sequence that is present in different members of a collection of molecules can allow capture of multiple different nucleic acids using a population of universal capture nucleic acids that are complementary to a portion of the universal sequence, e.g., a universal extension primer binding site. Non-limiting examples of universal extension primer binding sites include sequences that are identical to or complementary to P5 and P7 primers. Similarly, a universal sequence present in different members of a collection of molecules can allow the replication or amplification of multiple different nucleic acids using a population of universal primers that are complementary to a portion of the universal sequence, e.g., a universal primer binding site. Thus, a universal capture nucleic acid or a universal primer includes a sequence that can hybridize specifically to a universal sequence. Target nucleic acid molecules may be modified to attach universal adaptors, for example, at one or both ends of the different target sequences, as described herein.

The terms "P5" and "P7" may be used when referring to amplification primers, e.g., universal primer extension primers. The terms "P5'" (P5 prime) and "P7'" (P7 prime) refer to the complements of P5 and P7, respectively. It will be understood that any suitable amplification primers can be used in the methods presented herein, and that the use of P5 and P7 are exemplary embodiments only. Uses of amplification primers such as P5 and P7 on flow cells are known in the art, as exemplified by the disclosures of WO 2007/010251, WO 2006/064199, WO 2005/065814, WO 2015/106941, WO 1998/044151, and WO 2000/018957. For example, any suitable forward amplification primer, whether immobilized or in solution, can be useful in the methods presented herein for hybridization to a complementary sequence and amplification of a sequence. Similarly, any suitable reverse amplification primer, whether immobilized or in solution, can be useful in the methods presented herein for hybridization to a complementary sequence and amplification of a sequence. One of skill in the art will understand how to design and use primer sequences that are suitable for capture, and amplification of nucleic acids as presented herein.

As used herein, "amplify," "amplifying," or "amplification reaction" and their derivatives, refer generally to any action or process whereby at least a portion of a nucleic acid molecule is replicated or copied into at least one additional nucleic acid molecule. The additional nucleic acid molecule optionally includes sequence that is substantially identical or substantially complementary to at least some portion of the template nucleic acid molecule. The template nucleic acid molecule can be single-stranded or double-stranded and the additional nucleic acid molecule can independently be single-stranded or double-stranded. Amplification optionally includes linear or exponential replication of a nucleic acid molecule. In some embodiments, such amplification can be performed using isothermal conditions; in other embodiments, such amplification can include thermocycling. In some embodiments, the amplification is a multiplex amplification that includes the simultaneous amplification of a plurality of target sequences in a single amplification reaction. In some embodiments, "amplification" includes amplification of at least some portion of DNA and RNA based nucleic acids alone, or in combination. The amplification reaction can include any of the amplification processes known to one of ordinary skill in the art. In some embodiments, the amplification reaction includes polymerase chain reaction (PCR).

As used herein, "amplification conditions" and its derivatives, generally refer to conditions suitable for amplifying one or more nucleic acid sequences. Such amplification can be linear or exponential. In some embodiments, the amplification conditions can include isothermal conditions or alternatively can include thermocycling conditions, or a combination of isothermal and thermocycling conditions. In some embodiments, the conditions suitable for amplifying one or more nucleic acid sequences include polymerase chain reaction (PCR) conditions. Typically, the amplification conditions refer to a reaction mixture that is sufficient to amplify nucleic acids such as one or more target sequences, or to amplify an amplified target sequence ligated to one or more adaptors, e.g., an adaptor-ligated amplified target sequence. Generally, the amplification conditions include a catalyst for amplification or for nucleic acid synthesis, for example a polymerase; a primer that possesses some degree of complementarity to the nucleic acid to be amplified; and nucleotides, such as deoxyribonucleotide triphosphates (dNTPs) to promote extension of the primer once hybridized to the nucleic acid. The amplification conditions can require hybridization or annealing of a primer to a nucleic acid, extension of the primer and a denaturing step in which the extended primer is separated from the nucleic acid sequence undergoing amplification. Typically, but not necessarily, amplification conditions can include thermocycling; in some embodiments, amplification conditions include a plurality of cycles where the steps of annealing, extending and separating are repeated. Typically, the amplification conditions include cations such as $Mg^{2+}$ or $Mn^{2+}$ and can also include various modifiers of ionic strength.

As used herein, the term "polymerase chain reaction" ("PCR") refers to the method as described in U.S. Pat. Nos. 4,683,195 and 4,683,202, which describe a method for increasing the concentration of a segment of a polynucleotide of interest in a mixture of genomic DNA without cloning or purification. This process for amplifying the polynucleotide of interest consists of introducing a large excess of two oligonucleotide primers to the DNA mixture containing the desired polynucleotide of interest, followed by a series of thermal cycling in the presence of a DNA polymerase. The two primers are complementary to their respective strands of the double stranded polynucleotide of interest. The mixture is denatured at a higher temperature first and the primers are then annealed to complementary sequences within the polynucleotide of interest molecule. Following annealing, the primers are extended with a polymerase to form a new pair of complementary strands. The steps of denaturation, primer annealing, and polymerase extension can be repeated many times (referred to as thermocycling) to obtain a high concentration of an amplified segment of the desired polynucleotide of interest. The length of the amplified segment of the desired polynucleotide of interest (amplicon) is determined by the relative positions of the primers with respect to each other, and therefore, this length is a controllable parameter. By virtue of repeating the process, the method is referred to as the "polymerase chain reaction" (hereinafter "PCR"). Because the desired amplified segments of the polynucleotide of interest become the predominant nucleic acid sequences (in terms of concentration) in the mixture, they are said to be "PCR amplified." In a modification to the method discussed above, the target nucleic acid molecules can be PCR amplified using a plurality of different primer pairs, in some cases, one or more primer pairs per target nucleic acid molecule of interest, thereby forming a multiplex PCR reaction.

As defined herein "multiplex amplification" refers to the simultaneous amplification of two or more target sequences within a sample. In some embodiments, multiplex amplification is performed such that some or all of the target sequences are amplified within a single reaction vessel. The "plexy" or "plex" of a given multiplex amplification refers generally to the number of different target-specific sequences that are amplified during that single multiplex amplification. It is also possible to detect the amplified target sequences by several different methodologies (e.g., gel electrophoresis followed by densitometry, quantitation with a bioanalyzer or quantitative PCR, hybridization with a labeled probe; incorporation of biotinylated primers followed by avidin-enzyme conjugate detection; incorporation of 32P-labeled deoxynucleotide triphosphates into the amplified target sequence).

As used herein, the term "primer" and its derivatives refer generally to any polynucleotide that can hybridize to a target sequence of interest. Typically, the primer functions as a substrate onto which nucleotides can be polymerized by a polymerase; in some embodiments, however, the primer can become incorporated into the synthesized nucleic acid strand and provide a site to which another primer can hybridize to prime synthesis of a new strand that is complementary to the synthesized nucleic acid molecule. The primer may be comprised of any combination of nucleotides or analogs thereof. In some embodiments, the primer is a single-stranded oligonucleotide or polynucleotide. The terms "polynucleotide" and "oligonucleotide" are used interchangeably herein to refer to a polymeric form of nucleotides of any length, and may comprise ribonucleotides, deoxyribonucleotides, analogs thereof, or mixtures thereof. The terms should be understood to include, as equivalents, analogs of either DNA or RNA made from nucleotide analogs and to be applicable to single stranded (such as sense or antisense) and double stranded polynucleotides. The term as used herein also encompasses cDNA, that is complementary or copy DNA produced from an RNA template, for example by the action of reverse transcriptase. This term refers only to the primary structure of the molecule. Thus, the term includes triple-, double- and single-stranded deoxyribonucleic acid ("DNA"), as well as triple-, double- and single-stranded ribonucleic acid ("RNA").

As used herein, the terms "ligating," "ligation," and their derivatives refer generally to the process for covalently linking two or more molecules together, for example covalently linking two or more nucleic acid molecules to each other. In some embodiments, ligation includes joining nicks between adjacent nucleotides of nucleic acids. In some embodiments, ligation includes forming a covalent bond between an end of a first and an end of a second nucleic acid molecule. In some embodiments, the ligation can include forming a covalent bond between a 5' phosphate group of one nucleic acid and a 3' hydroxyl group of a second nucleic acid thereby forming a ligated nucleic acid molecule. In some embodiments, a target sequence can be ligated to an adaptor to generate an adaptor-target sequence. The skilled person will recognize that a ligation reaction may not result in linking all molecules present in the reaction.

As used herein, "ligase" and its derivatives refer generally to any agent capable of catalyzing the ligation of two substrate molecules. In some embodiments, a ligase includes an enzyme capable of catalyzing the joining of nicks between adjacent nucleotides of a nucleic acid. In some embodiments, a ligase includes an enzyme capable of catalyzing the formation of a covalent bond between a 5' phosphate of one nucleic acid molecule to a 3' hydroxyl of another nucleic acid molecule thereby forming a ligated nucleic acid molecule. Suitable ligases may include, but not limited to, T4 DNA ligase, T4 RNA ligase, thermostable T4 DNA ligase, and E. coli DNA ligase.

The term "flow cell" as used herein refers to a chamber comprising a solid surface across which one or more fluid reagents can be flowed. Examples of flow cells and related fluidic systems and detection platforms that can be readily used in the methods of the present disclosure are described, for example, in Bentley et al., Nature 456:53-59 (2008); WO 04/018497; WO 91/06678; WO 07/123744; U.S. Pat. Nos. 7,057,026; 7,211,414; 7,315,019; 7,329,492; 7,405,281; and U.S. Pat. Publication No. 2008/0108082.

As used herein, the term "library" refers to a collection of members. In one embodiment, the library includes a collection of nucleic acid members, for example, a collection of whole genomic, subgenomic fragments, cDNA, cDNA fragments, RNA, RNA fragments, or a combination thereof. In some embodiments, a portion or all library members include a non-target adaptor sequence. The adaptor sequence can be located at one or both ends. The adaptor sequence can be used in, for example, a sequencing method (for example, an NGS method), for amplification, for reverse transcription, or for cloning into a vector.

"Member" or "library member" or other similar term, as used herein, refers to a nucleic acid molecule, for example, a DNA, RNA, or a combination thereof, that is the member of a library. Typically, a member is a DNA molecule, for example, genomic DNA or cDNA. A member can be fragmented, for example, sheared or enzymatically prepared, genomic DNA. Members include a sequence from a subject and can also include a sequence not derived from a subject, for example, a non-target sequence such as an adaptor sequence, a primer sequence, and/or other sequences that allow for identification, for example, an index.

As used herein, an "index" (also referred to as an "index region" or "index adaptor") refers to a nucleic acid tag that can be used to identify a sample or source of the nucleic acid material. When nucleic acid samples are derived from multiple sources, the nucleic acids in each nucleic acid sample can be tagged with different nucleic acid tags such that the source of the sample can be identified. Any suitable index or set of indexes can be used, as known in the art and as exemplified by the disclosures of U.S. Pat. No. 8,053,192, PCT Publication No. WO 05/068656, and U.S. Pat. Publication No. 2013/0274117. In some embodiments, an index can include a six-base Index 1 (i7) sequence, an eight-base Index 1 (i7) sequence, an eight-base Index 2 (i5) sequence, a ten-base Index 1 (i7) sequence, or a ten-base Index 2 (i5) sequence from Illumina, Inc. (San Diego, CA).

As used herein, the term "unique molecular identifier" or "UMI" or "barcode" refers to a molecular tag that may be attached to a nucleic acid molecule. When incorporated into a nucleic acid molecule, a UMI can be used to correct for subsequent amplification bias by directly counting unique molecular identifiers (UMIs) that are sequenced after amplification.

As used herein, the term "tagmentation" refers to the modification of DNA by a transposome complex comprising a transposase enzyme complexed with adaptors comprising a double-stranded recognition sequence (hybridized transposon end sequences). Tagmentation results in the simultaneous fragmentation of the DNA and ligation of the adaptors to the 5' ends of both strands of duplex fragments. Following purification to remove the transposase enzyme, gap-filling, and ligation, a fully double-stranded product results. Additional sequences can be added to the ends of the adapted fragments, for example by PCR, ligation, or any other suitable methodology known to those of skill in the art. See, for example, U.S. Pat. Publication No. 2017/0044525.

The term "and/or" means one or more of the listed elements or a combination of any two or more of the listed elements.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "comprises" and variations thereof do not have a limiting meaning where these terms appear in the description and claims.

It is understood that wherever embodiments are described herein with the language "include," "includes," or "including," and the like, otherwise analogous embodiments described in terms of "consisting of" and/or "consisting essentially of" are also provided. The term "consisting of" is limited to whatever follows the phrase "consisting of." That is, "consisting of" indicates that the listed elements are required or mandatory, and that no other elements may be present. The term "consisting essentially of" indicates that any elements listed after the phrase are included, and that other elements than those listed may be included provided that those elements do not interfere with or contribute to the activity or action specified in the disclosure for the listed elements.

Unless otherwise specified, "a," "an," "the," and "at least one" are used interchangeably and mean one or more than one.

As used herein, the term "each," when used in reference to a collection of items, is intended to identify an individual term in the collection but does not necessarily refer to every term in the collection unless the context clearly dictates otherwise.

The recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. And, as appropriate, any combination of two or more steps may be conducted simultaneously.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

All headings are for the convenience of the reader and should not be used to limit the meaning of the text that follows the heading, unless so specified.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

BRIEF DESCRIPTION OF THE FIGURES

FIG. 1A-FIG. 1B are schematics showing an exemplary embodiment of a hybrid capture during enrichment and comparative off-target capture. FIG. 1A. A probe includes a region designed to hybridize a region of interest within the target genome and a ligand that permits subsequent capture of the probe (e.g., a biotin group). Once hybridization is complete and a DNA template-probe hybrid is formed, a capture means (that is, a component having affinity for the probe including, for example, a streptavidin-coated magnetic bead) is used to bind the probe that is hybridized to the DNA target, removing the target from a pool of oligonucleotides. FIG. 1B. Unwanted or off-target oligonucleotides may be recovered during hybrid capture due to interactions between terminal adaptor sequences in the target sequences and those in off-target library preparation products.

FIG. 3A. Diagram of NEXTERA blockers with bases that are complementary to an 8- or 10-base index region of the adaptor. FIG. 3B. Diagram of NEXTERA blockers modified with 8 or 10 deoxyinosine bases in the region of the blocker that correspond with the index region of the adaptor. FIG. 3C. Diagram of TRUSEQ blockers modified with 6, 8, or 10 deoxyinosine bases in the region of the blocker that corresponds with the index region of the adaptor. FIG. 3D. Diagram of NEXTERA and TRUSEQ blockers with 6 or 8 thymines in the region of the blocker that corresponds with the index region of the adaptor. FIG. 3E. Diagram of split NEXTERA blockers that include a component that corresponds to a region 5' to an 8- or 10-base index region and a component that corresponds to a region 3' to the index region. These constructs do not include any bases that correspond with the index region of the adaptor (indicated by an 8- or 10-base gap that corresponds to the index region). FIG. 3F. Diagram of split TRUSEQ blockers that include a component that corresponds to a region 5' to an 8- or 10-base index region and a component that corresponds to a region 3' to the index region. These constructs do not include any bases correspond to the index region of the adaptor (indicated by an 8- or 10-base gap corresponds with the index region). FIG. 3G. Diagram of NEXTERA blockers that correspond to only a portion of the region of the adaptor 3' of the index region. FIG. 3H. Diagram of TRU SEQ blockers that pair to only a portion of the region of the adaptor 3' of the index region. FIG. 3I. Diagram of NEXTERA or TRUSEQ blockers that correspond to only a portion of the region of the adaptor 5' of the index region (e.g., p5 or p7 sequence).

FIG. 6A shows a diagram of various blocker constructs including (1) a pair of split blockers with a first sequence that is complementary to a 25-30-mer region 5' of the index region and a second sequence complementary to a 34-35-mer region 3' of the index region, (2) a blocker that pairs to only a 3' portion of the adaptor ("Inner" blocker), (3) a blocker that pairs to only a 5' portion of the adaptor ("Outer" blocker), and (4) a short (8 nucleotide) blocker that corresponds with the index region ("Short8nt"). FIG. 6B shows Padded Read Enrichment results achieved using xGEN Blocking Oligos (Integrated DNA Technologies, Coralville, IA), split blockers, or blockers that bind to only a portion of the adaptor.

FIG. 7A shows Padded Read Enrichment results achieved using differing concentrations of dextran sulfate in the hybridization buffer. FIG. 7B shows Padded Read Enrichment results achieved using 100 µL hybridization volume and four different probe panels and three different buffer conditions (IDT hybridization buffer, Illumina non-enhanced hybridization buffer, and Illumina enhanced hybridization buffer). FIG. 7C shows Padded Read Enrichment and uniformity of coverage results for all four probe panels at different hybridization incubation times and with and without an additional temperature ramping step. The dotted black line in the left panel indicates the result of hybridization in buffer without dextran sulfate. Three sets of sequencing results are shown including NOVASEQ (FIG. 7D), NEXTSEQ (FIG. 7E), and ISEQ (FIG. 7F) (percent reads identified (PF) for NOVASEQ and NEXTSEQ, and index percent (%) for ISEQ) and associated coefficients of variation (CV) for runs using dextran sulfate hybridization buffer and 30 µL library volume.

FIG. 8A shows Padded Read Enrichment results when using modified blockers, a wash temperature increase, and/or a crowding agent (dextran sulfate) in the hybridization buffer. FIG. 8B shows Padded Read Enrichment results achieved using the methods described in Example 6 in nine probe panels using enhanced hybridization buffer with xGEN blockers, as compared to results of IDT exome panel using the IDT xGEN LOCKDOWN kit protocol. FIG. 8C shows detection of somatic variants by single-hybridization enrichment protocol using a 12 gene, 535 probe panel to enrich libraries generated from the Horizon Discover HD701 quantitative multiplex (QM) DNA standard.

FIG. 9A shows a schematic of an exemplary workflow for hybrid capture showing library preparation using a bead-based tagmentation protocol; any suitable library preparation method may be used prior to enrichment. Notably, only one round of hybridization and capture is included. FIG. 9B shows a schematic of an exemplary workflow for hybrid capture. FIG. 9C shows a schematic of an exemplary workflow for PCR-free hybrid capture. FIG. 9D shows a schematic of an exemplary workflow for PCR-free hybrid capture with a shortened hybridization time.

DETAILED DESCRIPTION OF ILLUSTRATIVE EMBODIMENTS

This disclosure describes compositions including a blocker and/or a hybridization buffer, and methods for improving the efficiency of nucleic acid selection prior to sequencing including methods of using those compositions and methods including of hybrid capture.

Enrichment by Hybrid Capture

A variety of methods may be used to enrich for desired sequences from a complex pool of nucleic acids. These methods include the polymerase chain reaction (PCR), molecular inversion probes (MIPs), or sequence capture by hybrid formation ("hybrid capture"). See, for example, Mamanova et al., *Nat. Methods* 7:111-118 (2010)); U.S. Pat. Publication No. 2014/0031240; and U.S. Pat. Publication No. 2017/0114404.

Figure 1B:
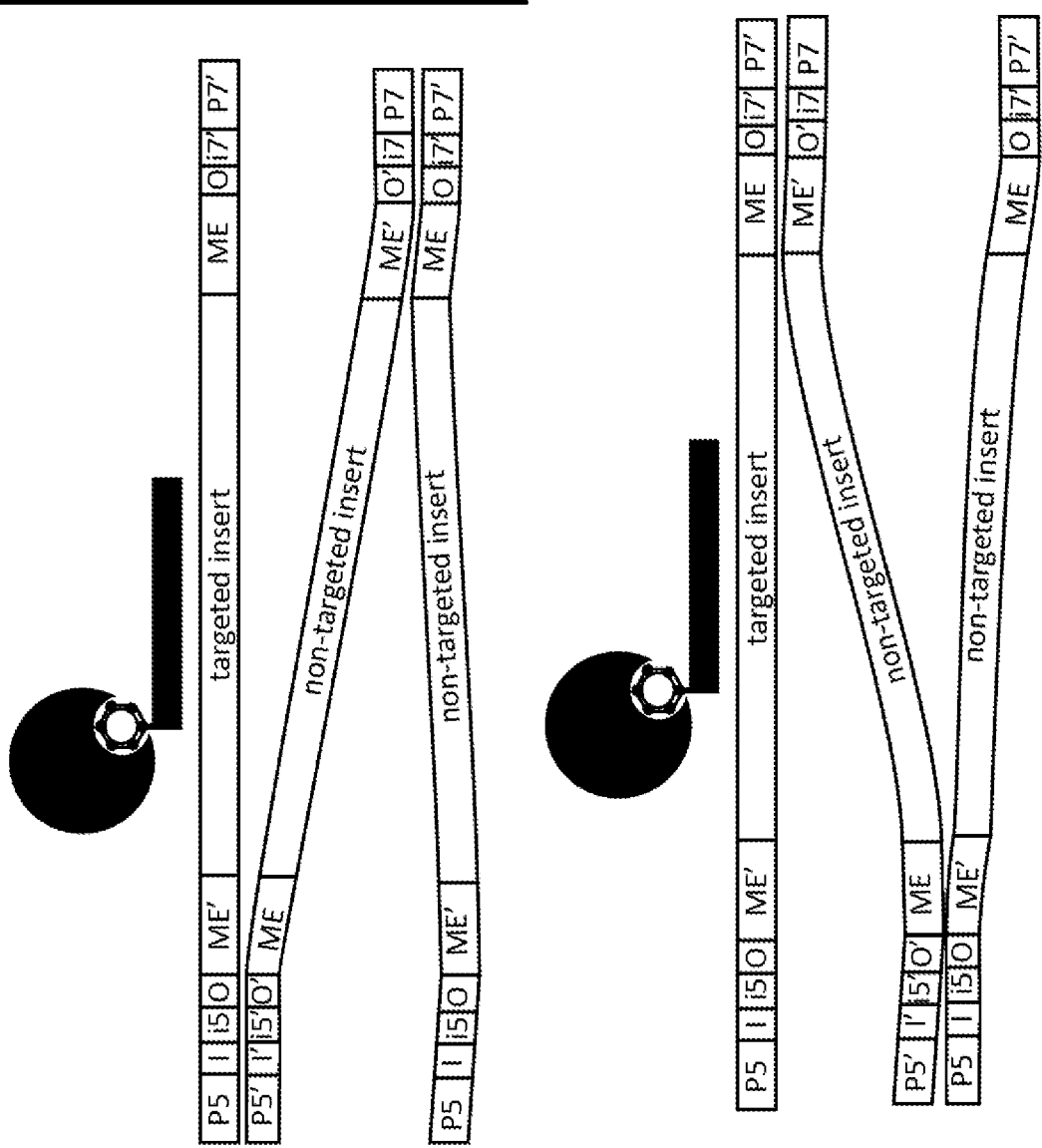

Next generation sequencing (NGS) applications typically use the hybrid capture method of enrichment. A prepared pool of NGS templates—a library—is heat denatured and mixed with a pool of capture probe oligonucleotides ("probes"). The probes are designed to hybridize to the regions of interest within the target genome and are usually 60 to 200 bases in length and further are modified to contain a ligand that permits subsequent capture of the bound probes. A common capture method incorporates a biotin group (or groups) on the probes. After hybridization to form the DNA template-probe hybrids is complete, capture is performed with a component having affinity for only the probe, as shown in one embodiment in FIG. 1A. For example, streptavidin-coated magnetic beads can be used to bind the biotin moiety of biotinylated-probes that are hybridized to the desired DNA targets from the library. Washing removes unbound nucleic acids, reducing the complexity of the retained material. The retained material is then eluted from the magnetic beads and introduced into automated sequencing processes.

Though DNA hybridization with the probes can be exquisitely specific, unwanted sequences remain in the enriched pool following completion of the hybrid capture method. The largest fraction of these unwanted sequences is present due to undesired hybridization events between library members having no complementarity to the probes and library members that do (that is, an on-target library member). Two types of sequences lead to undesired hybridizations during hybrid capture methods: (1) highly repetitive DNA elements that are found in endogenous genomic DNA; and (2) the terminal adaptor sequences that are engineered into each of the library members.

The repetitive endogenous DNA elements, such as an Alu sequence or Long interspersed nuclear element (LINE) sequence, present in one DNA fragment in the complex pool can hybridize to another similar element present in another unrelated DNA fragment. These fragments, which may originally derive from very different locations within the genome, become linked during the hybridization process of the hybrid capture method. If one of these DNA fragments represents a desired fragment that contains a binding site for a probe, the unwanted fragment will be captured along with the desired fragment. This class of off-target library members can be reduced by adding an excess of the repeat elements to the hybridization buffer of the hybridization reaction. Most commonly, human Cot-1 DNA (which binds Alu, LINE, and other repeat sites in the target and blocks the ability of NGS templates to interact with each other on that basis) is added to the hybridization buffer.

Off-target (also referred to as non-target) library members may also be captured due to interactions between terminal adaptor sequences in individual library members. Typically, library members include a segment of sequence from a gene of interest, for example, a segment for sequencing. If a member is on-target, the sequence from the gene of interest forms a duplex with the capture probe. On-target sequences may include, for example, an exon or an intron (or fragment thereof), a coding region or a non-coding region, an enhancer, an untranslated region, a specific SNP, etc. Typically, library members also include one or more non-target sequences. These non-target sequences typically do not include a target sequence of interest but do include, for example, an adaptor. Because a pool of library members typically will contain at least some identical terminal adaptor sequences, the adaptor sequences are present at a very high effective concentration(s) in the hybridization solution. Consequently, library members containing off-target sequences can anneal to captured target sequences through portions of their appended adaptor sequences, thereby resulting in capture of off-target sequences along with on-target library members (for example, by a concatenation or "daisy chain" of sequences being linked together), as shown in one embodiment in FIG. 1B. Because the annealed target sequence includes a binding site for a probe, the entire daisy chain may be captured. In this way, capture of a single desired fragment can bring along a large number of undesired fragments, reducing the overall efficiency of enrichment for the desired segment.

In some aspects, this disclosure describes methods and compositions for minimizing selection of an off-target nucleic acid by hybrid capture.

Blocker Oligonucleotide

Figure 2:
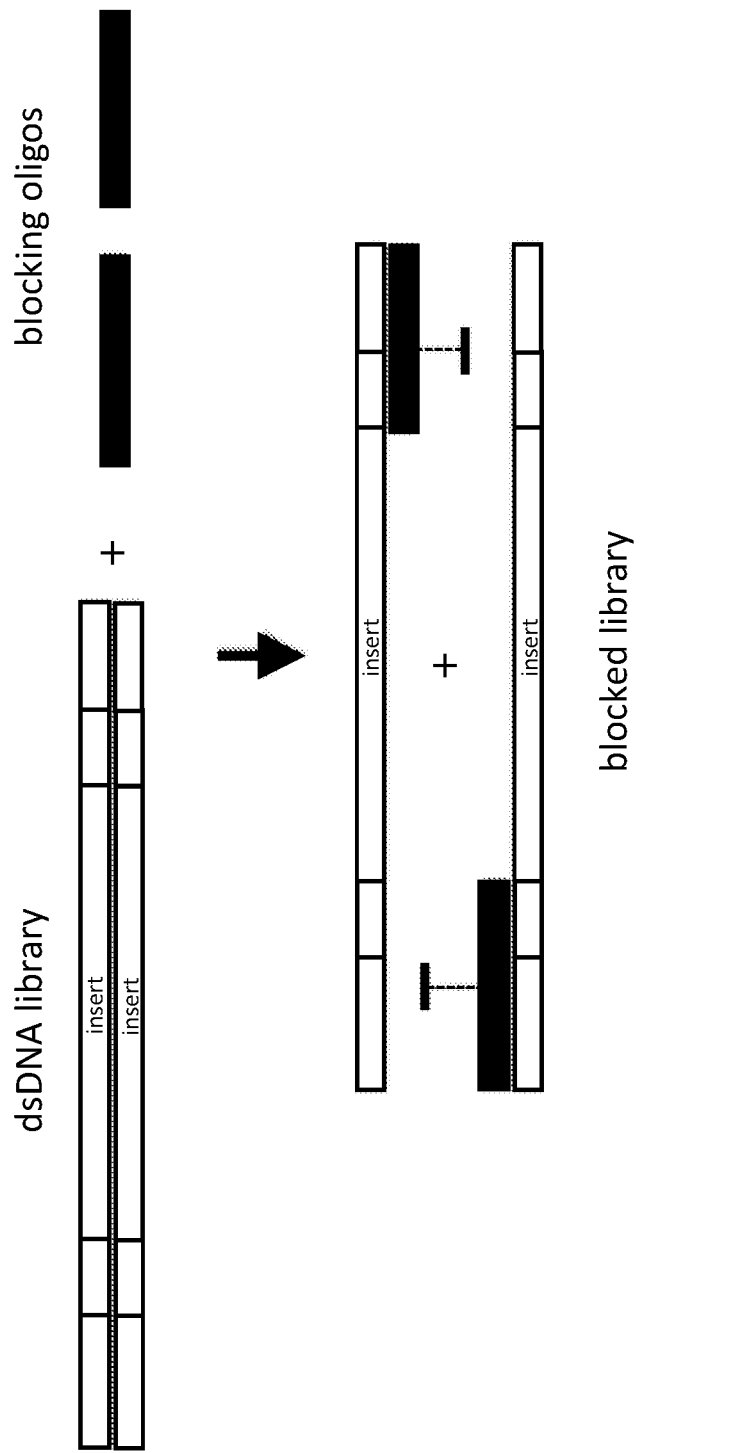
FIG. 2 shows an exemplary mechanism by which blockers prevent hybridization of adaptor sequences and prevent off-target capture.

In one aspect, this disclosure describes a "blocker oligonucleotide" (also referred to herein as a "blocker") and a method of preventing selection of an off-target nucleic acid during hybrid capture by using the blocker to bind to (e.g., form a duplex with) at least a portion of an adaptor sequence. When used, as shown in one embodiment in FIG. 2, the blocker's binding to the adaptor sequence prevents interactions between adaptor sequences in off-target library preparation products—including, for example, the formation of concatenated chains—that can result in unwanted library members being recovered during hybrid capture.

In some embodiments, at least two blockers can be used, with a first blocker binding to (e.g., forming a duplex with) a first adaptor sequence, and a second blocker binding to (e.g., forming a duplex with) a second adaptor sequence. In some embodiments, the first adaptor sequence may be at the 5' end of a library member and the second adaptor sequence may be at the 3' end of a library member. In some embodiments, a plurality of different blockers may be used.

In some embodiments, the blocking oligonucleotide forms a duplex with an adaptor sequence of at least 1, at least 2, at least 5, at least 10, at least 20, at least 50, at least 100, or at least 200 library members, and the resulting duplex has a $T_m$ that is higher than the $T_m$ of a duplex formed by an adaptor sequence to a background nucleic acid including, for example, the complement of the adaptor sequence.

In some embodiments, a blocker-adaptor complex exhibits a greater $T_m$ than an adaptor-adaptor complex. Such increased $T_m$ means that a blocker-adaptor complex is more likely to form before an adaptor-adaptor complex, which may prevent off target capture (e.g., by preventing the formation of daisy chains). In some embodiments, the $T_m$ of the blocker-adaptor oligonucleotide duplex is at least 1.5° C., at least 2° C., at least 3° C., at least 4° C., at least 5° C., at least 10° C., at least 15° C., at least 20° C., or at least 25° C. greater than the $T_m$ of an adaptor duplex with its exact complement. In some embodiments, the $T_m$ of the blocker-adaptor oligonucleotide duplex is up to 2° C., up to 3° C., up to 4° C., up to 5° C., up to 10° C., up to 15° C., up to 20° C., up to 25° C., or up to 30° C. greater than the $T_m$ of an adaptor duplex with its exact complement.

In some embodiments, the blocking oligonucleotide has an association rate with an adaptor sequence of at least 1, at least 2, at least 5, at least 10, at least 20, at least 50, at least 100, or at least 200 library members, that is higher than the association rate of the adaptor sequence to a background nucleic acid including, for example, the complement of the adaptor sequence. In some embodiments, the association rate is at least 2-fold greater, at least 4-fold greater, at least 6-fold greater, at least 8-fold greater, or at least 10-fold greater. In some embodiments, the association rate is up to 4-fold greater, up to 6-fold greater, up to 8-fold greater, up to 10-fold greater, or up to 12-fold greater.

In some embodiments, the blocking oligonucleotide has a dissociation rate with an adaptor sequence of at least 1, at least 2, at least 5, at least 10, at least 20, at least 50, at least 100, or at least 200 library members that is lower than the dissociation rate of the adaptor sequence to a background nucleic acid including, for example, the complement of the adaptor sequence. In some embodiments, the dissociation rate is at least 2-fold lower, at least 4-fold lower, at least 6-fold lower, at least 8-fold lower, or at least 10-fold lower. In some embodiments, the association rate is up to 4-fold lower, up to 6-fold lower, up to 8-fold lower, up to 10-fold lower, or up to 12-fold lower.

In some embodiments, a duplex formed between the blocking oligonucleotide and an adaptor sequence of at least 1, at least 2, at least 5, at least 10, at least 20, at least 50, at least 100, or at least 200 library members is longer than the duplex formed between the adaptor sequence and its complement including, for example, between the Watson and Crick strands of a double-stranded adaptor. In some embodiments, the duplex between a blocking oligonucleotide and an adaptor sequence is at least 1, at least 2, at least 3, at least 4, at least 5, at least 6, at least 7, at least 8, at least 9, at least 10, at least 15, or at least 20 nucleotides longer than the duplex formed between the adaptor sequence and its complement.

In some embodiments, the blocker preferably includes a modification that increases the $T_m$ of the blocker relative to an oligonucleotide having the same sequence as the blocker that does not include the modification. For example, in some embodiments, the blocker may be a "$T_m$-enhanced oligonucleotide," that is an oligonucleotide that includes at least one modified group that provides an increased thermal melting temperature value for a duplex nucleic acid that includes as a hybridization partner the oligonucleotide relative to a duplex nucleic acid that includes as a hybridization partner an oligonucleotide having identical nucleobase composition and unmodified groups. A "$T_m$-enhanced oligonucleotide" is further described in U.S. Pat. Publication No. 2014/0031240.

In some embodiments, the blocker includes one or more non-naturally-occurring nucleotides. In some embodiments, a duplex formed between a blocking oligonucleotide having non-naturally-occurring nucleotides and the adaptor sequence of at least 1, at least 2, at least 5, at least 10, at least 20, at least 50, at least 100, or at least 200 library members, has a value for a parameter related to the binding interaction (for example, affinity, association rate, inverse of dissociation rate, or $T_m$) that is higher than the value for the non-target nucleic acid sequence to a background nucleic acid, for example, other complementary non-target nucleic acid sequences.

In some embodiments, the blocker includes a modified base. Any suitable modified base may be included in a blocker. In some embodiments, the modification preferably includes a $T_m$-enhancing modification, that is, a modification that increases $T_m$ of a blocker-adaptor complex including a modified base relative to the $T_m$ of a blocker-adaptor complex that has the same sequence but does not include a modified base. Such a $T_m$-enhancing modification may include, for example, a DNA or RNA oligonucleotide modified to capture low GC regions; a crosslinked oligonucleotide; a modified 5-methyl deoxycytidine (5-methyl-dc); 2,6-diaminopurine; a locked nucleic acid (LNA); a bridged nucleic acid (also referred to as a bicyclic nucleic acid or BNA); a tricyclic nucleic acid; a peptide nucleic acid (PNA); a C5-modified pyrimidine base; a propynyl pyrimidine; a morpholino; a phosphoramidite; a 5'-Pyrene cap; etc. In some embodiments, an LNA includes the ribose moiety of a nucleotide is modified with an extra bridge connecting the 2' oxygen and 4' carbon. Exemplary BNA are disclosed in, for example, U.S. Pat. Nos. 7,399,845, 7,427,672, 7,547,684, 7,696,345, 7,741,457, 8,022,193, 8,268,980, 8,278,425, 8,278,426, 8,846,637, 8,846,639, and 9,546,368. In some embodiments, a BNA may include a constrained ethyl nucleic acid from Ionis Pharmaceuticals (Carlsbad, CA) or a 2'-O,4'-aminoethylene bridged nucleic acid from Biosynthesis, Inc. (Lewisville, TX). In some embodiments, a PNA includes repeating N-(2-aminoethyl)-glycine units linked by peptide bonds. In some embodiments, a tricyclic nucleic acid includes a tricyclic nucleic acid disclosed in, for example, U.S. Pat. No. 9,221,864. Exemplary phosphoramidites include 1-[5'-O-(4,4'-Dimethoxytrityl)-β-D-2'-deoxyribofuranosyl]-9-(2-trifluoroacetamidoethoxy)-1,3-diaza-2-oxophenoxazine,3'-[(2-cyanoethyl)-(N,N-diisopropyl)]phosphoramidite (AP-dC-CE phosphoramidite), 5'-Dimethoxytrityl-Uridine,2'-O-methyl,3'-[(2-cyanoethyl)-(N,N-diisopropyl)]-phosphoramidite (2'-OMe-U-CE phosphoramidite), 5'-Dimethoxytrityl-N-acetyl-5-methyl-Cytidine,2'-O-methyl,3'-[(2-cyanoethyl)-(N,N-diisopropyl)]-phosphoramidite (2'-OMe-5-Me-C-CE phosphoramidite), 5'-Dimethoxytrityl-N-acetyl-Cytidine,2'-O-methyl,3'-[(2-cyanoethyl)-(N,N-diisopropyl)]-phosphoramidite (2'-OMe-Ac-C-CE phosphoramidite), etc.

In some embodiments, a modification that increases the $T_m$ of the blocker relative to an oligonucleotide having the same sequence as the blocker that does not include the modification may include a non-base modification. Such modification can include, for example, a minor grove binder (MGB), spermine, G-clamp, or a Uaq anthraquinone cap.

In some embodiments, a blocking oligonucleotide is at least 20, at least 30, at least 40, at least 50, at least 60, at least 70, at least 80, at least 90, at least 100 nucleotides in length. In some embodiments, a blocking oligonucleotide is up to 45, up to 50, up to 55, up to 60, up to 70, up to 80, up to 90, up to 100, up to 150, or up to 200 nucleotides in length.

In some embodiments, a blocking oligonucleotide will include a plurality of modifications that increase the $T_m$ of the blocker. In some embodiments, the preferred number of modifications is that number which provides an increase in the optimal $T_m$ value under stringent conditions (0.1×SSC) ("optimal enhanced $T_m$ value") of at least about 1.4° C. for a duplex DNA containing the modification(s) as one complementary strand. In some embodiments, the preferred number of modifications in a $T_m$-enhanced blocking oligonucleotide provides for a $T_m$ of the blocker-adaptor oligonucleotide duplex of at least 1.5° C., at least 2° C., at least 3° C., at least 4° C., at least 5° C., at least 10° C., at least 15° C., at least 20° C., or at least 25° C. greater than the $T_m$ of an adaptor duplex with its exact complement. In some embodiments, the preferred number of modifications in a $T_m$-enhanced blocking oligonucleotide provides for a $T_m$ of the blocker-adaptor oligonucleotide duplex of up to 2° C., up to 3° C., up to 4° C., up to 5° C., up to 10° C., up to 15° C., up to 20° C., up to 25° C., or up to 30° C. greater than the $T_m$ of an adaptor duplex with its exact complement.

In some embodiments, the blocking oligonucleotide will include modifications of at least 2 percent (%), at least 5%, at least 10%, at least 20%, at least 30%, at least 40%, at least 50%, at least 60%, at least 70%, at least 80%, or at least 90% of the bases in the blocking oligonucleotide. In some embodiments, the blocking oligonucleotide will include modifications of up to 5%, up to 10%, up to 20%, up to 30%, up to 40%, up to 50%, up to 60%, up to 70%, up to 80%, up to 90%, or up to 100% of the bases in the blocking oligonucleotide.

In some embodiments, modification to the blocker will be included in a particular pattern. For example, a modified base may be included every 2 bases (see, e.g., Table 2A, BN021 and BN022), every 3 bases (see, e.g., Table 2A, BN035 and BN036), every 4 bases, or every 5 bases, or some combination thereof (see, e.g., Table 2A, BN036). In some embodiments, each base in the blocker may be modified (see, e.g., Table 2A, BN027 and BN028). In some embodiments, guanine—which has a high affinity than other nucleotides when modified—may be preferentially modified. For example, in some embodiments, an LNA or BNA form of guanine may be included in the blocker.

In some embodiments, the blocker may include a terminal modification. For example, the blocker may include a 3' terminal group that precludes the availability of the blocker to serve as a primer for DNA synthesis. Such 3' terminal group may include, for example, 3'-dC, 2',3'-ddC (also referred to herein as 3ddc), inverted dT, 3'-spacer C3 (also referred to herein as 3SpC3), etc.

The blocker may bind to (e.g., form a duplex with) any suitable adaptor sequence (including any portion thereof). As used herein, the portion of the blocker sequence that binds to (e.g., forms a duplex with) a portion of the adaptor sequence is referred to as the portion of the blocker sequence that "corresponds" to the portion of the adaptor sequence. In some embodiments, the corresponding sequence may be the exact complement of the adaptor sequence. In some embodiments, however, up to 1, up to 2, up to 3, up to 4, up to 5, up to 6, up to 7, up to 8, up to 9, or up to 10 bases in the corresponding sequence may not be complementary.

In some exemplary embodiments, the blocker may bind to an adaptor as shown in Table 1. (Adaptor sequences are shown in Table 1A and additional information about the sequence components is shown in Table 1B.) In some exemplary embodiments, the blocker may bind to an adaptor including a sequence disclosed in Illumina Adapter Sequences (available on the World Wide Web at support.i- llumina.com/content/dam/illumina-support/documents/documentation/chemistry_documentation/experiment-design/illumina-adapter-sequences-1000000002694-07.pdf In some embodiments, the blocker binds to an adaptor wherein the adaptor includes a universal sequence including, for example, a universal adaptor and/or a universal primer sequence. In some embodiments, the universal primer sequence may include P5, P7, P5', and/or P7'. In some embodiments, the universal primer sequence may include V2.A14.METS sequence, V2.B15.METS sequence, the complement of V2.A14.METS sequence, and/or the complement of V2.B15.METS sequence. For example BN001, as shown in Table 2A, includes P5 and V2.A14.METS sequence; BN002, as shown in Table 2A, includes P7 and V2.B15.METS sequence; BN003, as shown in Table 2A, includes P5' and the reverse complement of V2.A14.METS sequence; BN004, as shown in Table 2A, includes P7' and the reverse complement of V2.B15.METS sequence.

Figure 3A:
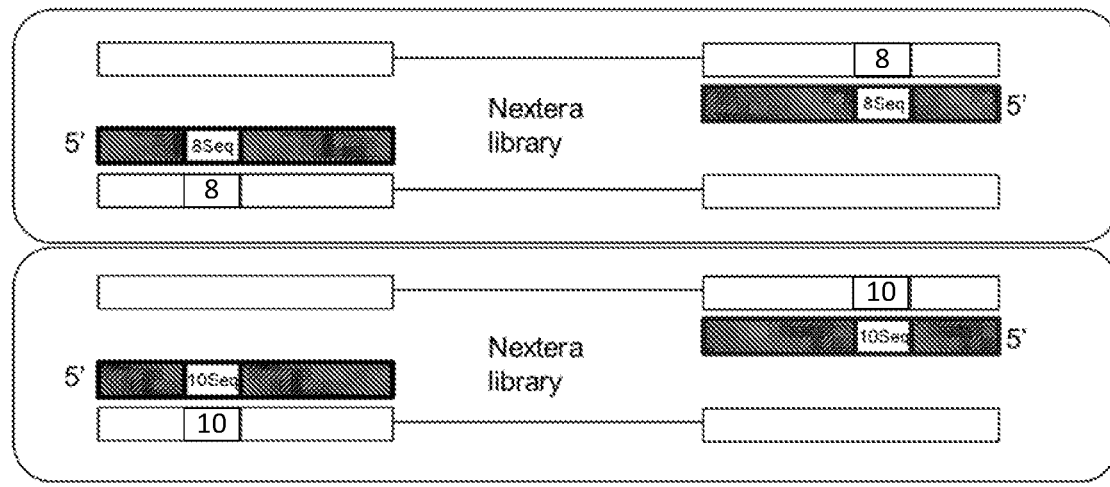
FIG. 3A-FIG. 3I show diagrams of exemplary blockers.
Figure 3B:
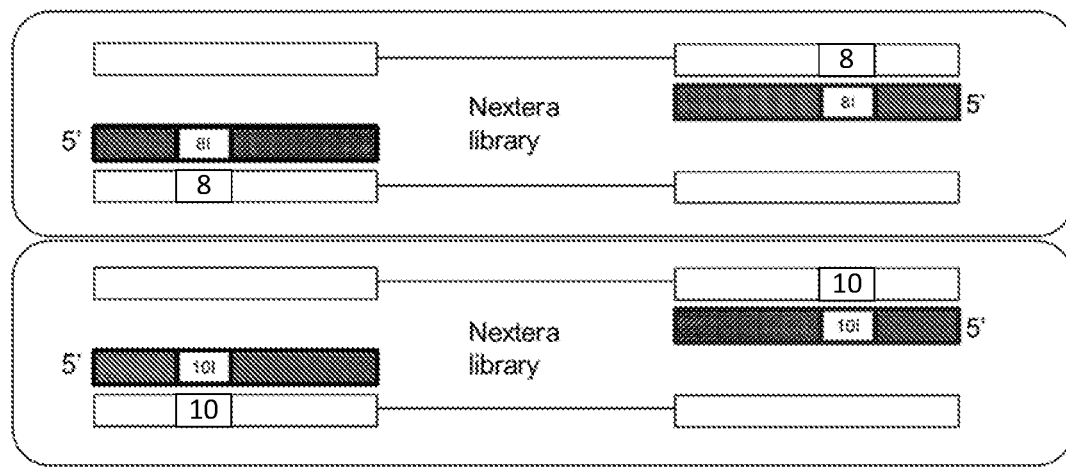
Figure 3C:
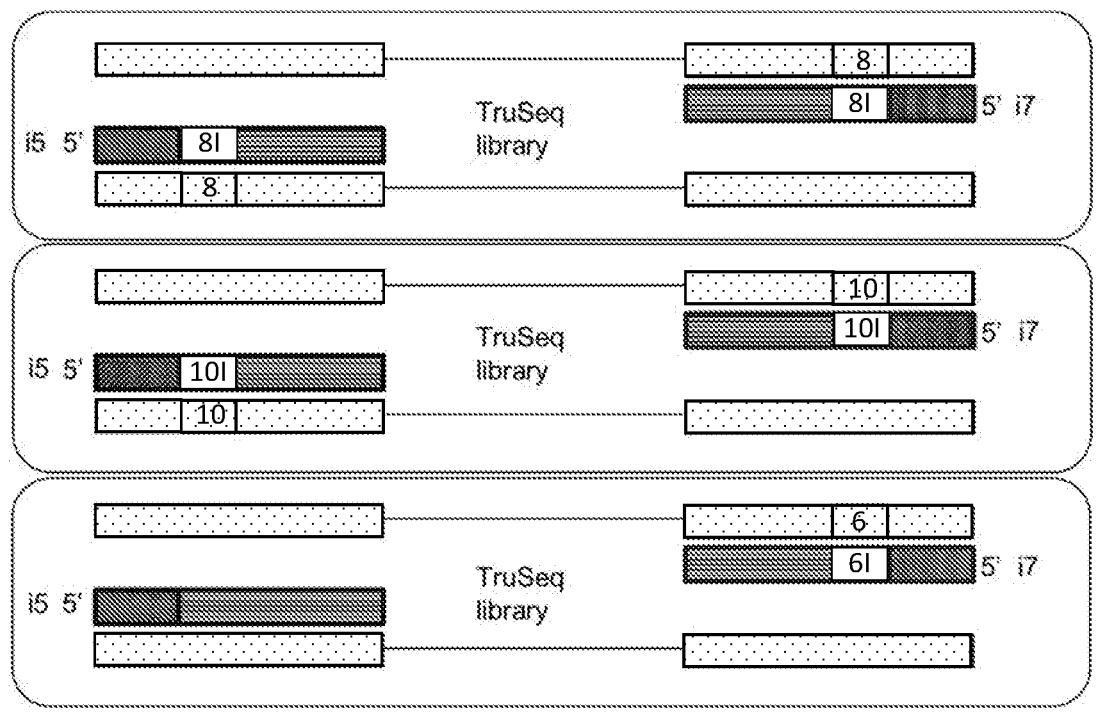

In some sequencing applications, it is desirable for library members to include at least one index and/or a UMI sequence. Thus, in some embodiments, a blocker binds to an adaptor where the adaptor includes at least one of an index and a UMI. U.S. Pat. Publication No. 2014/0031240 describes "three approaches can be used to make blocking oligonucleotides" for adaptors that include an index (which U.S. Pat. Publication No. 2014/0031240 refers to as a "barcode domain"): "1) synthesize a series of blockers which are perfect match to each adaptor, 2) synthesize a single blocker with an N-mer domain to pair with the barcode domain of the adaptor, or 3) synthesize a single blocker with a universal base domain to pair with the barcode domain of the adaptor." As each different index and/or UMI has a unique sequence, a fully complementary blocker as in approach 1 would be a sequence that include a perfect complementary match to each index and/or UMI sequence present (see FIG. 3A). If many distinct indexes and/or UMIs are used, however, including a blocker having a perfect complementary match would require tens or hundreds of unique blockers for multiplex amplification—an approach that is not cost effective.

Figure 3D:
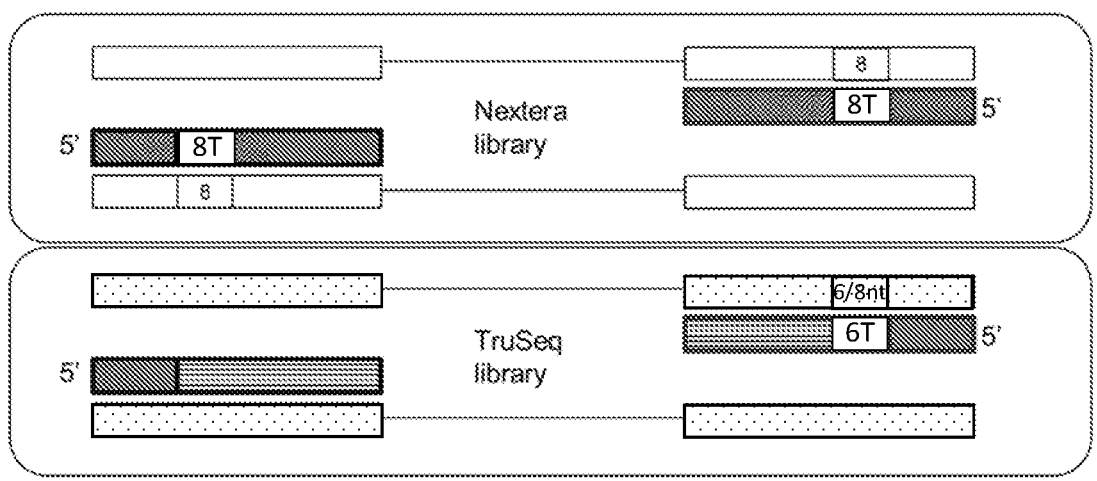
Figure 3E:
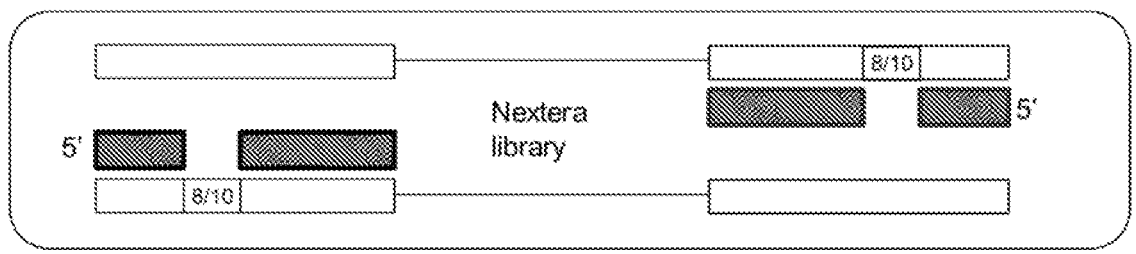
Figure 3F:
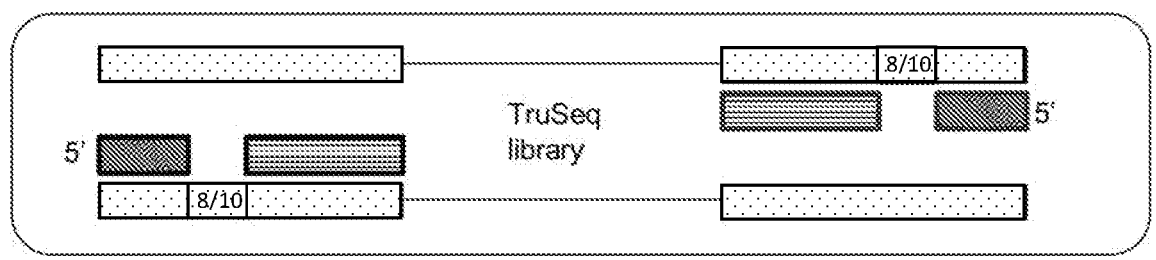
Figure 3G:
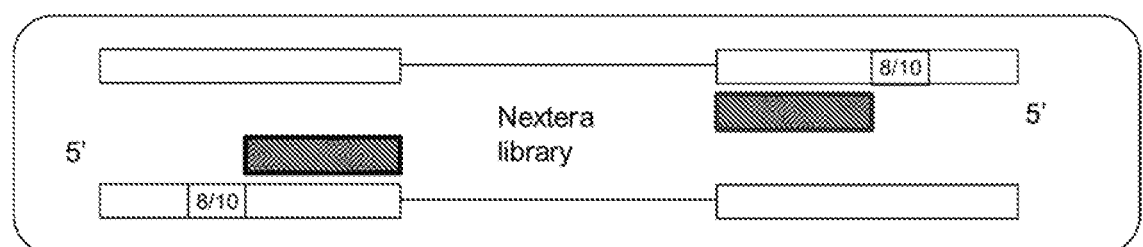
Figure 3H:
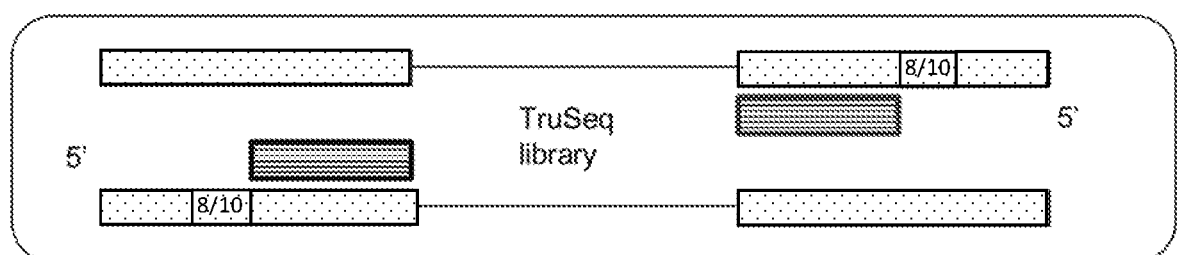
Figure 3I:
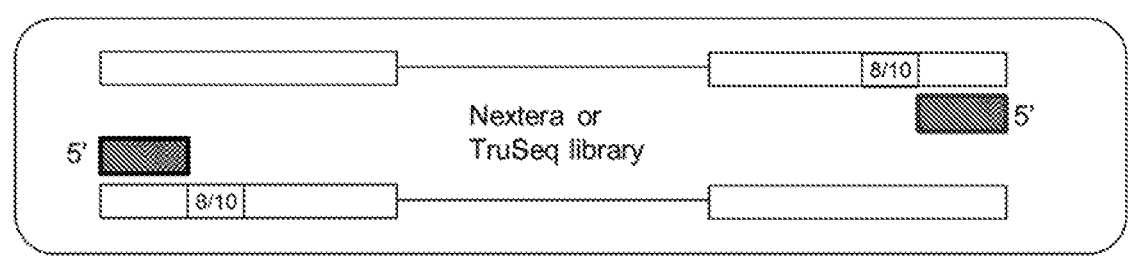

In some aspects, this disclosure describes blockers for adaptors that include an index and/or a UMI including, and methods of using such blockers, for example, a blocker that includes thymine in the region of the blocker that corresponds to the index and/or UMI (FIG. 3D & Example 2);

a blocker than includes universal bases and at least one non-universal base (FIG. 5 & Example 3); or a blocker that does not include an index region (including, for example a "split blocker" or a blocker that pairs to only part of an adaptor) (FIG. 3E-FIG. 3I, FIG. 6A, & Examples 4, 8, and 9).

In some embodiments, the blocker includes at least one of the sequences of Table 2A, Table 2B, Table 2C, or Table 3. In some embodiments, the sequences of Table 2A may be used following a tagmentation (e.g., NEXTERA) library preparation (Illumina, Inc., San Diego, CA). In some embodiments, the sequences of Table 2B may be used following a ligation-based library preparation and/or a TRUSEQ preparation (Illumina, Inc., San Diego, CA). In some embodiments, the sequences of Table 2C may be used following a tagmentation (e.g., NEXTERA) library preparation (Illumina, Inc., San Diego, CA). In some embodiments, if a sequence of Table 2 includes a BNA-modified nucleic acid, the BNA-modified nucleic acid may include a 2'-O,4'-aminoethylene bridged nucleic acid from Biosynthesis, Inc. (Lewisville, TX). In some embodiments, if a sequence of Table 2 includes a LNA-modified nucleic acid, the LNA-modified nucleic acid may include an LNA-containing oligonucleotide from Qiagen (Hilden, Germany). Additional information about the components of the sequences of Table 2A, Table 2B, and Table 2C may be found in Table 1B and Table 2D.

In another aspect, the disclosure describes a kit that includes a blocking oligonucleotide. The blocking oligonucleotide may include a blocker as described herein. In some embodiments, the blocking oligonucleotide is a plurality of blocking oligonucleotides. The kit may further include one or more of: a hybridization buffer, a probe, a panel of probes, and a flow cell. The hybridization buffer may include a hybridization buffer as described elsewhere in this disclosure. In some embodiments, the probe(s) are as described elsewhere in this disclosure. In some embodiments the components may be provided in separate containers. For example, the blocking oligonucleotide may be provided in a first container and another component, for example, a hybridization buffer, or a probe or panel of probes may be provided in a different container(s). Alternatively, the blocking oligonucleotide and the hybridization buffer may be provided in a first container, and a probe or panel of probes may be provided in a different container(s).

TABLE 1A

Exemplary Adaptor Sequences

| SEQ ID NO | Ref. No. | Oligo Name | Sequence |
|---|---|---|---|
| 1 | TN001 | NEXTERA 8 nt adaptor-i5 | 5'-AATGATACGGCGACCACCGAGATCTACAC[i5]TCGTCGGCAGCGTCAGATGTGTATAAGAGACAG |
| 2 | TN002 | NEXTERA 8 nt adaptor-i7 | 5'-CAAGCAGAAGACGGCATACGAGAT[i7]GTCTCGTGGGCTCGGAGATGTGTATAAGAGACAG |
| 3 | TN003 | NEXTERA 10 nt adaptor-i5 | 5'-AATGATACGGCGACCACCGAGATCTACAC[i5]TCGTCGGCAGCGTCAGATGTGTATAAGAGACAG |
| 4 | TN004 | NEXTERA 10 nt adaptor-i7 | 5'-CAAGCAGAAGACGGCATACGAGAT[i7]GTCTCGTGGGCTCGGAGATGTGTATAAGAGACAG |
| 5 | TN005 | NEXTERA short adaptor-i5 | 5'-TCGTCGGCAGCGTCAGATGTGTATAAGAGACAGT |
| 6 | TN006 | NEXTERA short adaptor-i7 | 5'-CTGTCTCTTATACACATCTCCGAGCCCACGAGAC |
| 7 | TN007 | NEXTERA nrUMI adaptor-i5 | 5'-TCGTCGGCAGCGTCAGATGTGTATAAGAGACAGTNNNNNNT |
| 8 | TN008 | NEXTERA nrUMI adaptor-i7 | /5Phos/NNNNNCTGTCTCTTATACACATCTCCGAGCCCACGAGAC |
| 9 | TL001 | TRUSEQ universal adaptor | 5'-AATGATACGGCGACCACCGAGATCTACACTCTTTCCCTACACGACGCTCTTCCGATCT |
| 10 | TL002 | TRUSEQ 6 nt adaptor | 5'-GATCGGAAGAGCACACGTCTGAACTCCAGTCAC[i7]ATCTCGTATGCCGTCTTCTGCTTG |
| 11 | TL003 | TRUSEQ 8 nt adaptor | 5'-AATGATACGGCGACCACCGAGATCTACACTCTTTCCCTACACGACGCTCTTCCGATCT |
| 12 | TL004 | TRUSEQ 8 nt adaptor-i7 | 5'-GATCGGAAGAGCACACGTCTGAACTCCAGTCAC[i7]ATCTCGTATGCCGTCTTCTGCTTG |
| 13 | TL005 | TRUSEQ 10 nt adaptor-i5 | 5'-AATGATACGGCGACCACCGAGATCTACAC[i5]ACACTCTTTCCCTACACGACGCTCTTCCGATCT |
| 14 | TL006 | TRUSEQ 10 nt adaptor-i7 | 5'-GATCGGAAGAGCACACGTCTGAACTCCAGTCAC[i7]ATCTCGTATGCCGTCTTCTGCTTG |
| 15 | TL007 | TRUSEQ short adaptor-i5 | 5'-ACACTCTTTCCCTACACGACGCTCTTCCGATCT |
| 16 | TL008 | TRUSEQ short adaptor-i7 | /5Phos/GATCGGAAGAGCACACGTCTGAACTCCAGTCAC |
| 17 | TL009 | TRUSEQ nrUMI adaptor-i5 | 5'-ACACTCTTTCCCTACACGACGCTCTTCCGATCTNNNNNNT |
| 18 | TL010 | TRUSEQ nrUMI adaptor-i7 | /5Phos/NNNNNNAGATCGGAAGAGCACACGTCTGAACTCCAGTCAC |

TABLE 1B

| SEQ ID NO | Description | Sequence |
| --- | --- | --- |
| 19 | p5 sequence | AATGATACGGCGACCACCGA |
| 20 | p7 sequence | TCGTATGCCGTCTTCTGCTTG |
| 21 | P7 reverse complement (P7') | CAAGCAGAAGACGGCATACGA |
| 22 | TRUSEQ i7 adaptor region | GATCGGAAGAGCACACGTCTGAACTCCAGTCAC |
| 23 | TRUSEQ i5 adaptor region | ACACTCTTTCCCTACACGACGCTCTTCCGATC |
| 24 | V2.A14.METS sequence | TCGTCGGCAGCGTCAGATGTGTATAAGAGACAG |
| 25 | V2.615.METS sequence | GTCTCGTGGGCTCGGAGATGTGTATAAGAGACAG |
|  | Index Sequence (8 or 10 nucleotides) | [i7] or [i5] |
| 26 | N-mer domain (a mix of 25% of each A, T, C, G) (e.g., a UMI) | NNNNNN |
|  | 5' phosphorylation | /5Phos/ |

TABLE 2A

Exemplary Blocker Sequences

| SEQ ID NO | Ref No | Oligo Name | Sequence |
|---|---|---|---|
| 27 | BN001 | NEXTERA Blocker1 i5 | 5'-AATGATACGGCGACCACCGAGATCTACACTTTTTTTTTCGTCGGCAGCGTCAGATGTGTATAAGAGACAG/3ddC/-3' |
| 28 | BN002 | NEXTERA Blocker2 i7 | 5'-CAAGCAGAAGACGGCATACGAGATTTTTTTTTGTCTCGTGGGCTCGGAGATGTGTATAAGAGACAG/3ddC/-3' |
| 29 | BN003 | NRCBLK1PrimeRC | 5'-GCT GTC TCT TAT ACA CAT CTG ACG ATT TTT GTG TAG ATC TCG GTG GTC GCC GTA TCA TT |
| 30 | BN004 | NRCBLK2PrimeRC | 5'-GCT GTC TCT TAT ACA CAT CTC CGA GCC CAC GAG ACT TTT TAT CTC GTA TGC CGT CTT CTT G |
| 31 | BN005 | TiS517 with basepairing index sequence example | 5'-AATGATACGGCGACCAC+CGAGA+TCTA+CACG+CGTA+AGATCG+TCGG+CAGCG+TCAGATG+TGTATAA+GAGACAG/3SpC3/ |
| 32 | BN006 | TiS701 with basepairing index sequence example | 5'-CAAGCAGAAGA+CGGCA+TACGAGATT+CGCCTTAG+TCT+CGTGGGC+TCGGAGA+TGTGTATAA+GAGACAG/3SpC3/ |
| 33 | BN007 | TiBNA7 | 5'-AATGATACGGCGACCAC+CGAGA+TCT+ACA+C/ideoxyI//ideoxyI//ideoxyI//ideoxyI//ideoxyI//ideoxyI//ideoxyI/+TCG+TCG+GCA+GCG+TCAGATG+TGTATAA+GAGA+CAG/3SpC3/ |
| 34 | BN008 | TiBNA8 | 5'-CAAGCAGAAGA+CGGCA+TACGAGA+T/ideoxyI//ideoxyI//ideoxyI//ideoxyI//ideoxyI//ideoxyI//ideoxyI/+GTC+TCG+TGGGC+TCGG+AGA+TGTG+TATAA+GAGA+CAG/3SpC3/ |
| 35 | BN009 | TiLNA7 | 5'-AATGATACGGCGACCAC+CGAGA+TCT+ACA+C/ideoxyI//ideoxyI//ideoxyI//ideoxyI//ideoxyI//ideoxyI//ideoxyI/+TCG+TCG+GCA+GCG+TCAGATG+TGTATAA+GAGA+CAG/3SpC3/ |
| 36 | BN010 | TiLNA8 | 5'-CAAGCAGAAGA+CGGCA+TACGAGA+T/ideoxyI//ideoxyI//ideoxyI//ideoxyI//ideoxyI//ideoxyI//ideoxyI/+GTC+TCG+TGGGC+TCGG+AGA+TGTG+TATAA+GAGA+CAG/3SpC3/ |
| 37 | BN011 | TiBNA11 | 5'-AATGATACGGCGACCAC+CGAGA+TCT+ACA+C/ideoxyI//ideoxyI//ideoxyI//ideoxyI//ideoxyI//ideoxyI//ideoxyI/+TCG+TCG+GCA+GCG+TCAGATG+TGTATAA+GAGA+CAG/3SpC3/ |
| 38 | BN012 | TiBNA12 | 5'-CAAGCAGAAGA+CGGCA+TACGAGA+T/ideoxyI//ideoxyI//ideoxyI//ideoxyI//ideoxyI//ideoxyI//ideoxyI/+GTC+TCG+TGGGC+TCGG+AGA+TGTG+TATAA+GAGA+CAG/3SpC3/ |
| 39 | BN013 | TiBNA15G | 5'-AATGATACGGCGACCAC+CGAGA+TCT+ACA+C/ideoxyI//ideoxyI//ideoxyI//ideoxyI//ideoxyI//ideoxyI/+G/ideoxyI//ideoxyI//ideoxyI/+TCG+TCG+GCA+GCG+TCAGATG+TGTA+TAA+GAGA+CAG/3SpC3/ |
| 40 | BN014 | TiBNA16G | 5'-CAAGCAGAAGA+CGGCA+TACGAGA+T/ideoxyI//ideoxyI//ideoxyI//ideoxyI//ideoxyI//ideoxyI/+G/ideoxyI//ideoxyI//ideoxyI/+GTC+TCG+TGGGC+TCGG+AGA+TGTG+TA+TAA+GAGA+CAG/3SpC3/ |
| 41 | BN015 | TiBNA15N | 5'-AATGATACGGCGACCAC+CGAGA+TCT+ACA+C/ideoxyI//ideoxyI//ideoxyI//ideoxyI//ideoxyI//ideoxyI/N/ideoxyI//ideoxyI//ideoxyI/+TCG+TCG+GCA+GCG+TCAGATG+TGTA+TAA+GAGA+CAG/3SpC3/ |
| 42 | BN016 | TiBNA16N | 5'-CAAGCAGAAGA+CGGCA+TACGAGA+T/ideoxyI//ideoxyI//ideoxyI//ideoxyI//ideoxyI//ideoxyI/N/ideoxyI//ideoxyI//ideoxyI/+GTC+TCG+TGGGC+TCGG+AGA+TGTG+TA+TAA+GAGA+CAG/3SpC3/ |

TABLE 2A-continued

| SEQ ID NO | Ref No | Oligo Name | Sequence |
|---|---|---|---|
| 43 | BN017 | T1LNA11 | 5'-AATGATACGGCGACCAC+CGAGA+TCT+ACA+C/ideoxy1//ideoxy1//ideoxy1//ideoxy1//ideoxy1//ideoxy1/+TCG+TCG+GCA+GCG+TCAGATG+TGTATA+GAGA+CAG/3SpC3/ |
| 44 | BN018 | T1LNA12 | 5'-CAAGCAGAAGA+CGGCA+TACGAGA+T/ideoxy1//ideoxy1//ideoxy1//ideoxy1//ideoxy1//ideoxy1/+GTC+TCG+TGGGC+TCGG+AGA+TGTG+TATAA+GAGA+CAG/3SpC3/ |
| 45 | BN019 | T1LNA15G | 5'-AATGATACGGCGACCAC+CGAGA+TCT+ACA+C/ideoxy1//ideoxy1//ideoxy1//ideoxy1/+G/ideoxy1//ideoxy1//ideoxy1/+GTC+TCG+GCA+GCG+TCAGATG+TGTA+TAA+GAGA+CAG/3SpC3/ |
| 46 | BN020 | T1LNA16G | 5'-CAAGCAGAAGA+CGGCA+TACGAGA+T/ideoxy1//ideoxy1//ideoxy1//ideoxy1/+G/ideoxy1//ideoxy1//ideoxy1/+GTC+TCG+TGGGC+TCGG+AGA+TGTG+TA+TAA+GAGA+CAG/3SpC3/ |
| 47 | BN021 | T1LNA15N | 5'-AATGATACGGCGACCAC+CGAGA+TCT+ACA+C/ideoxy1//ideoxy1//ideoxy1//ideoxy1/N/ideoxy1//ideoxy1//ideoxy1/+GTC+TCG+GCA+GCG+TCAGATG+TGTA+TAA+GAGA+CAG/3SpC3/ |
| 48 | BN022 | T1LNA16N | 5'-CAAGCAGAAGA+CGGCA+TACGAGA+T/ideoxy1//ideoxy1//ideoxy1//ideoxy1/N/ideoxy1//ideoxy1//ideoxy1/+GTC+TCG+TGGGC+TCGG+AGA+TGTG+TA+TAA+GAGA+CAG/3SpC3/ |
| 49 | BN023 | P5LNA | 5'-AATGA+TAC+GGC+GAC+CAC+CGA+GAT+CTA+CAC/3SpC3/ |
| 50 | BN024 | P7LNA | 5'-CAAGC+AGA+AGA+CGG+CAT+ACG+A+GA+T/3SpC3/ |
| 51 | BN025 | T1LNAS1 | 5'-TCGTC+GGC+AGC+GTC+AGA+TGT+GTA+TAA+GAG+ACA+G/3SpC3/ |
| 52 | BN026 | T1LNAS2 | 5'-GTCT+CGT+GGGC+TCG+GAG+ATG+TGT+ATAA+GAG+ACA+G/3SpC3/ |
| 53 | BN027 | T1LNA17 | 5'-GGGCAC+CAC+CGAGA+TCT+ACA+C/ideoxy1//ideoxy1//ideoxy1//ideoxy1//ideoxy1//ideoxy1/ |
| 54 | BN028 | T1LNA18 | 5'-GGCA+TAC+GAGA+T/ideoxy1//ideoxy1//ideoxy1//ideoxy1//ideoxy1//ideoxy1//ideoxy1/+GTC+TCG+TGG+GC+TCGG+TATAA+GAG/3SpC3/ |
| 55 | BN029 | P5BNA-All | 5'-+A+A+T+G+A+T+A+C+G+G+C+G+A+C+C+A+C+C+G+A+G+A+T+C+T+A+C+A+C/3SpC3/ |
| 56 | BN030 | P7BNA-All | 5'-+C+A+A+G+C+A+G+A+A+G+A+C+G+G+C+A+T+A+C+G+A+G+A+T/3SpC3/ |
| 57 | BN031 | T1BNAS1-All | 5'-+T+C+G+T+C+G+G+C+A+G+C+G+T+C+A+G+A+T+G+T+G+T+A+T+A+A+G+A+G+A+C+A+G/3SpC3/ |
| 58 | BN032 | T1BNAS2-All | 5'-+G+T+C+T+C+G+T+G+G+G+C+T+C+G+G+A+G+A+T+G+T+G+T+A+T+A+A+G+A+G+A+C+A+G/3SpC3/ |
| 59 | BN033 | P5BNA-half | 5'-AA+TG+AT+AC+GG+CG+AC+CA+CC+GA+GA+TC+TA+CA+C/3SpC3/ |
| 60 | BN034 | P7BNA-half | 5'-C+AA+GC+AG+AA+GA+CG+GC+AT+AC+GA+G+A+T/3SpC3/ |
| 61 | BN035 | T1BNAS1-half | 5'-TC+GT+CG+GC+AG+CG+TC+AG+AT+GT+GT+AT+AA+GA+GA+CA+G/3SpC3/ |
| 62 | BN036 | T1BNAS2-half | 5'-G+TC+TC+GT+GG+GC+TC+GG+AG+AT+GT+GT+AT+AA+GA+GA+CA+G/3SpC3/ |

TABLE 2A-continued

| SEQ ID NO | Ref No | Oligo Name | Exemplary Blocker Sequences Sequence |
|---|---|---|---|
| 63 | BN037 | P5BNA-Alt | 5'-A+AT+GA+TA+CG+GC+GA+CC+AC+CG+AG+AT+CT+AC+A+C/3SpC3/ |
| 64 | BN038 | P7BNA-Alt | 5'-+CA+AG+CA+GA+AG+AC+GG+CA+T+A+C+G+A+G+A+T/3SpC3/ |
| 65 | BN039 | TiBNAS1-Alt | 5'-T+CG+TC+GG+CA+GC+GT+CA+GA+TG+TA+TA+AG+AG+AC+A+G/3SpC3/ |
| 66 | BN040 | TiBNAS2-Alt | 5'-+GT+CT+CG+TG+GG+CT+CG+GA+GA+TG+TA+TA+AG+AG+AC+A+G/3SpC3/ |
| 67 | BN041 | TiBNA3 | 5'-AATGATACGGCGACCACCGAGA+TCTACACTTTTTTTTTTCG+TCGG+CAGCG+TCAGATG+TGTATAA+GAGACAG/3ddC/ |
| 68 | BN042 | TiBNA4 | 5'-5'CAAGCAGAAGACGGCA+TACGAGATTTTTTTTTTG+TCT+CGTGGGC-TTCGGAGATG-TTGTATAA+GAGACAG/3ddC/ |
| 69 | BN043 | TiBNA1 | 5'-AATGATACGGCGACCACCGAGAT+CTACACTTTTTTTTT+CGTCGGCAGCGTCAGATGTGTATAAGAGA+CAG/3ddC/ |
| 70 | BN044 | TiBNA2 | 5'-CAAGCAGAAGACGGCATACGAGATTTTTTTTGT+CTCGTGGGCT+CGGAGATGTGTATAAGAGA+CAG/3ddC/ |

TABLE 2B

| SEQ ID NO | Ref No | Oligo Name | Exemplary Blocker Sequences Sequence |
|---|---|---|---|
| 71 | BL001 | CT3 Blocker1 i7 | 5'-CAAGCAGAAGACGGCATACGAGATTTTTTGTGACTGGAGTTCAGACGTGTGCTCTTCCGATC/3ddC/ |
| 72 | BL002 | CT3 Blocker2 i5 | 5'-AATGATACGGCGACCACCGAGATCTACACTCTTTCCCTACACGACGCTCTTCCGATC/3ddC/ |
| 73 | BL003 | TSLTLNA13 | 5'-AATGATACGGCGACCAC+CGA+GAT+CTA+CAC+TCT+TTC+CCT+ACA+CGA+CGC+TCT+TCC+GAT+C/3ddC/ |
| 74 | BL004 | TSLTLNA14 | 5'-CAAGCAGAAGACGG+CAT+ACG+AGA+T/ideoxy1//ideoxy1//ideoxy1/+GTG+ACT+GGA+GTT+CAG+ACG+TGT+GCT+CTTCCG+ATC/3ddC/ |
| 75 | BL005 | TSHTLNA13 | 5'-AATGATACGGCGACCAC+CGA+GAT+CTA+CAC/ideoxy1//ideoxy1//ideoxy1//ideoxy1//ideoxy1/ACAC+TCT+TTC+CCT+ACA+CGA+CGC+TCT+TCC+GAT+C/3ddC/ |
| 76 | BL006 | TSHTLNA14 | 5'-CAAGCAGAAGACGG+CAT+ACG+AGA+T/ideoxy1//ideoxy1//ideoxy1//ideoxy1//ideoxy1/+GTG+ACT+GGA+GTT+CAG+ACG+TGTGCT+CTT+CCG+ATC/3ddC/ |
| 77 | BL007 | TSHTLNA15 | 5'-AATGATACGGCGACCAC+CGA+GAT+CTA+CAC/ideoxy1//ideoxy1//ideoxy1//ideoxy1//ideoxy1//ideoxy1/ACAC+TCT+TTC+CCT+ACA+CGA+CGC+TCT+TCC+GAT+C/3ddC/ |
| 78 | BL008 | TSHTLNA16 | 5'-CAAGCAGAAGACGG+CAT+ACG+AGA+T/ideoxy1//ideoxy1//ideoxy1//ideoxy1//ideoxy1//ideoxy1/+GTG+ACT+GGA+GTT+CAG+ACG+TGTGCT+CTT+CCG+ATC/3ddC/ |
| 79 | BL009 | TSHTLNA15G | 5'-AATGATACGGCGACCAC+CGA+GAT+CTA+CAC/ideoxy1//ideoxy1//ideoxy1//ideoxy1/+G/ideoxy1//ideoxy1/ACAC+TCT+TTC+CCT+ACA+CGA+CGC+TCT+TCC+GAT+C/3ddC/ |
| 80 | BL010 | TSHTLNA16G | 5'-CAAGCAGAAGACGG+CAT+ACG+AGA+T/ideoxy1//ideoxy1//ideoxy1//ideoxy1/+G/ideoxy1//ideoxy1//ideoxy1/+GTG+ACT+GGA+GTT+CAG+ACG+TGTGCT+CTT+CCG+ATC/3ddC/ |

TABLE 2B-continued

Exemplary Blocker Sequences

| SEQ ID NO | Ref No | Oligo Name | Sequence |
|---|---|---|---|
| 81 | BL011 | TSHTLNA15N | 5'-AATGATACGGCGACCAC+CGA+GAT+CTA+CAC/ideoxyl//ideoxyl//ideoxyl/N/ideoxyl//ideoxyl/ideoxyl/ACAC+TCT+TTC+CCT+ACA+CGC+TCT+TCC+GAT+C/3ddC/ |
| 82 | BL012 | TSHTLNA16N | 5'-CAAGCAGAAGACGG+CAT+ACG+AGA+T/ideoxyl//ideoxyl//ideoxyl/N/ideoxyl//ideoxyl//ideoxyl/+GTG+ACT+GGA+GTT+CAG+ACG+TGTGCT+CTT+CCG+ATC/3ddC/ |
| 83 | BL013 | TSLTBNA13 | AATGATACGGCGACCAC+CGA+GAT+CTA+CAC/ideoxyl//ideoxyl//ideoxyl/+TTC+CCT+ACA+CGA+CGC+TCT+TCC+GAT+C/3ddc/ |
| 84 | BL014 | TSUTBNA14 | 5'-CAAGCAGAAGACGG+CAT+ACG+AGA+T/ideoxyl//ideoxyl//ideoxyl/+GTG+ACT+GGA+GTT+CAG+ACG+TGTGCT+CTT+CCG+ATC/3ddC/ |
| 85 | BL015 | TSHTBNA13 | 5'-AATGATACGGCGACCAC+CGA+GAT+CTA+CAC/ideoxyl//ideoxyl//ideoxyl//ideoxyl/ACAC+TCT+TTC+CCT+ACA+CGA+CGC+TCT+TCC+GAT+C/3ddC/ |
| 86 | BL016 | TSHTBNA14 | 5'-CAAGCAGAAGACGG+CAT+ACG+AGA+T/ideoxyl//ideoxyl//ideoxyl//ideoxyl/+GTG+ACT+GGA+GTT+CAG+ACG+TGTGCT+CTT+CCG+ATC/3ddC/ |
| 87 | BL017 | TSHTBNA15 | 5'-AATGATACGGCGACCAC+CGA+GAT+CTA+CAC/ideoxyl//ideoxyl//ideoxyl//ideoxyl/ACAC+TCT+TTC+CCT+ACA+CGA+CGC+TCT+TCC+GAT+C/3ddC/ |
| 88 | BL018 | TSHTBNA16 | 5'-CAAGCAGAAGACGG+CAT+ACG+AGA+T/ideoxyl//ideoxyl//ideoxyl//ideoxyl/+GTG+ACT+GGA+GTT+CAG+ACG+TGTGCT+CTT+CCG+ATC/3ddC/ |

TABLE 2C

Exemplary Blocker Sequences

| SEQ ID | Ref No | Oligo Name | Sequence |
|---|---|---|---|
| 89 | BX001 | NEXTERA Blocker1_2X | 5'-AATGATAXGGCGACCACCGAGATCTACACTTTTTTTTTTCGTCGGCAGCGTCAGATGTGTATAAGAGAxAG/3ddC/ |
| 90 | BX002 | NEXTERA Blocker1_3X | 5'-AATGATAXGGCGACCACCGAGATXTACACTTTTTTTTTTCGTCGGCAGCGTCAGATGTGTATAAGAGAxAG/3ddC/ |
| 91 | BX003 | NEXTERA Blocker1_2Xalt | 5'-AATGATACGGCGACCACCGAGATXTACACTTTTTTTTTTCGTCGGCAGCGTCAGATGTGTATAAGAGAxAG/3ddC/ |
| 92 | BX004 | NEXTERA Blocker1_3Xalt | 5'-AATGATACGGCGACCACCGAGATXTACACTTTTTTTTTTXGTCGGCAGCGTCAGATGTGTATAAGAGAxAG/3ddC/ |
| 93 | BX005 | NEXTERA Blocker2_2X | 5'-CAAGXAGAAGACGGCATACGAGATTTTTTTTTTGTCTCGTGGGCTCGTGGGCTCGGAGATGTGTATAAGAGAXAG/3ddC/ |
| 94 | BX006 | NEXTERA Blocker2_3X | 5'-CAAGXAGAAGACGGCATAXGAGATTTTTTTTTTGTCTCGTGGGCTCGGAGATGTGTATAAGAGAXAG/3ddC/ |
| 95 | BX007 | NEXTERA Blocker2_2Xalt | 5'-CAAGCAGAAGACGGCATACGAGATTTTTTTTTTTTTTTTGTXTCGTGGGCTCGGAGATGTGTATAAGAGAXAG/3ddC/ |
| 96 | BX008 | NEXTERA Blocker2_3Xalt | 5'-CAAGCAGAAGACGGCATACGAGATXTTTTTTTTTTTTTTGTXTCGTGGGCTXGGAGATGTGTATAAGAGAXAG/3ddC/ |
| 97 | BX009 | NEXTERA Blocker1_5X4Y | 5'-AATGATAXGGCGAXCACCGAGATXGCATAXCACCGAGATXCACTTTTTTTTTTTCGTCGGXAGCGTCAGAYGYGYAYAAGAGAXAG/3ddC/-3' |
| 98 | BX010 | NEXTERA Blocker2_5X4Y | 5'-CAAGXAGAAGAXGGCATAXGAGATTTTTTTTTTGTCTCGTGGGXTCGGAGAYGYGYAYAAGAGAXAG/3ddC/-3' |
| 99 | BX011 | NEXTERA Blocker1_5X4Y-outer | 5'-AATGATAXGGCGAXCACCGAGATXTACAC |
| 100 | BX012 | NEXTERA Blocker1_5X4Y-inner | 5'-TCGTCGGXAGCGTCAGAYGYGYAYAAGAGAXAG/3ddC/-3' |
| 101 | BX013 | NEXTERA Blocker2_5X4Y-outer | 5'-CAAGXAGAAGAXGGCATAXGAGAT |
| 102 | BX014 | NEXTERA Blocker2_5X4Y-inner | 5'-GTCTCGTGGGXTCGGAGAYGYGYAYAAGAGAXAG/3ddC/-3' |

TABLE 2D

| | |
|---|---|
| Thymine bases at index position in oligos (8 nucleotides) | TTTTTTTT (SEQ ID NO: 103) |
| /ideoxyl/ | 2'-deoxyinosine |
| /3ddC/ | 2',3' Dideoxycytosine |
| /3SpC3/ | 3' Spacer C3 |
| LNA- or BNA-modified base (as indicated in the "Oligo Name" column of Table 2A) | +A +C +T or +G |
| AP-dC-CE Phosphoramidite | X |
| 2'-Ome-U-CE Phosphoramidite | Y |

Blocker with Thymine

In some embodiments, a blocker may include at least three thymine bases, at least four thymine bases, at least five thymine bases, at least six thymine bases, at least seven thymine bases, at least eight thymine bases, at least nine thymine bases, or at least ten thymine bases in the region of the blocker corresponding to the index region of the adaptor and/or the UMI of the adaptor (e.g., the region of the blocker that binds to the index region and/or UMI of the adaptor).

In some embodiments, the region of the blocker corresponding to the index region of the adaptor and/or the UMI of the adaptor (e.g., that binds to the index region and/or UMI of the adaptor) includes as many thymine bases as the number of bases in the index region of the adaptor and/or the UMI of the adaptor.

In some embodiments, the blocker includes at least one sequence of Table 2A, Table 2B, Table 2C, or Table 3. Some exemplary embodiments of such a blocker are described in Example 2.

Blocker with Universal Bases and at Least One Non-Universal Base

In some embodiments, a blocker may include universal bases and at least one non-universal base in the region of the blocker that corresponds to the index region. As used herein, a "universal base" is a modified nucleobase that hybridizes to at least two of the common bases (e.g., deoxyadenosine (A), deoxythymidine (T), deoxycytidine (C), deoxyguanosine (G), and uridine (U)). In some embodiments, a universal base hybridizes to any of the common bases. As used herein, a "non-universal base" is a nucleobase (including, in some embodiments, a modified nucleobase) that hybridizes only in a traditional Watson-Crick base pair interaction (e.g., deoxyadenosine(A)-deoxythymidine (T) or deoxyguanosine (G)-deoxycytidine (C)).

In some embodiments, the at least one non-universal base may be included every third base of the blocker sequence corresponding to the index region. In some embodiments, the at least one non-universal base may be at the third and/or the fifth positions (from 5' end) of the blocker sequence corresponding to the index region. In some embodiments, the at least one non-universal base may be at the second and/or the fourth positions of the blocker sequence corresponding to the index region. In some embodiments, the at least one non-universal base includes a modified guanine. In some embodiments, the modified guanine may be LNA-modified or BNA-modified. In some embodiments, the at least one non-universal base includes a random (A, T, G, or C) nucleotide.

Without wishing to be bound by theory, it is believed that including a modified guanine or a random nucleotide in addition to the universal bases in the region of the blocker that corresponds to the index region (as shown in one embodiment in FIG. 5), improves affinity of the blocker for a library member. Some exemplary embodiments of such a blocker are described in Example 3.

The universal base may include any known universal base. In some embodiments, a universal base used in the index region can include, for example, 2'-deoxyinosine, 2'-deoxynebularine, 3-nitropyrrole 2'-deoxynucleoside, or 5-nitroindole 2'-deoxynucleoside. In some embodiments, a combination of universal bases may be used in the index region.

The modified guanine may be a guanine modified in any suitable way including, for example, an LNA-modified guanine, a BNA-modified guanine, etc. In some embodiments, the modified guanine is preferably an LNA-modified guanine.

In some embodiments, the blocker includes at least one sequence of Table 2A, Table 2B, Table 2C, or Table 4.

Split Blockers

In some embodiments, a blocker may include at least two non-connected oligonucleotides, wherein the non-connected oligonucleotides include bases that do not correspond to the index region and/or the UMI of the adaptor (e.g., include bases that do not bind the index region and/or the UMI of the adaptor) or include bases that only partially correspond to the index region and/or the UMI of the adaptor (e.g., include bases that bind to only a portion of the index region and/or the UMI of the adaptor). In some embodiments, the blocker includes four non-connected oligonucleotides.

In some embodiments, the at least two non-connected oligonucleotides hybridize to the same strand of the target sequence. In some embodiments, at least a portion of the blocker will correspond to the 5' end of the adaptor and at least a portion of the blocker will correspond to the 3' end of the same adaptor. In some embodiments, including, for example, when the blocker includes four non-connected oligonucleotides, two non-connected oligonucleotides may hybridize to the same strand of a first target sequence, and two non-connected oligonucleotides may hybridize to the same strand of a second target sequence. Exemplary embodiments of such blockers are shown in FIG. 3E-FIG. 3I and FIG. 6A and are described in Examples 4, 8, and 9.

In some embodiments, at least a portion of the blocker will correspond to a universal extension primer. In some embodiments, at least a portion of the blocker will correspond to P5, P7, P5', and/or P7'. In some embodiments, at least a portion of the blocker will correspond to V2.A14.METS, V2.B15.METS, the complement of V2.A14.METS, and/or the complement of V2.B15.METS.

In some embodiments, the blocker will include the same number of bases as the adaptor excluding the portion of the adaptor containing the bases of the index region and/or the UMI of the adaptor. In some embodiments the blocker will include one base fewer, two bases fewer, three bases fewer, four bases fewer, or five bases fewer than the number of bases making up the portion of the adaptor excluding the bases of the index region and/or the UMI of the adaptor.

In some embodiments, a blocker including more bases may be preferred including, for example, when increased enrichment performance is desired. In some embodiments, a blocker including fewer bases may be preferred including, for example, when the cost of the blocker, synthesis purity and/or yield are a factor.

In some embodiments, up to five bases of the blocker, up to four bases of the blocker, up to three bases of the blocker, up to two bases of the blocker, only one base of the blocker, or no bases of the blocker will pair with the index region of the adaptor and/or the UMI of the adaptor.

In some embodiments, the blocker includes at least one sequence (or portion of a sequence) of Table 2A, Table 2B, Table 2C, or Table 5. In some embodiments, the blocker includes at least one of BN023, BN024, BN025, and BN026 of Table 2A. In some embodiments, the blocker includes BN023 and BN025 of Table 2A. In some embodiments, the blocker includes BN024 and BN026 of Table 2A.

Hybridization Buffer

In another aspect, this disclosure describes a hybridization buffer including a crowding agent and methods of using that hybridization buffer. As used herein, a "crowding agent" includes a compound that allows for, enhances, or facilitates molecular crowding. In some embodiments, a crowding agent includes an inert macromolecule used at a concentration that alters a DNA-protein interaction. A "hybridization buffer" is defined as any buffer in which a nucleotide-probe hybrid may be formed as part of a hybrid capture assay.

In some embodiments, the crowding agent may include at least one of dextran, dextran sulfate, polyethylene glycol (PEG), Ficoll, glycerol, betaine, etc. Dextran and dextran sulfate may include high molecular weight dextran (e.g., dextran having a molecular weight of at least 500,000 Da) and/or low molecular weight dextran (e.g., dextran having a molecular weight of up to 10,000 Da, up to 50,000 Da, or up to 100,000 Da). In some embodiments, the crowding agent preferably includes dextran sulfate.

In some embodiments, the crowding agent may be included in the hybridization buffer in an amount of at least 0.5% weight/volume (w/v), at least 1% (w/v), at least 1.5% (w/v), at least 2% (w/v), at least 3% (w/v), or at least 4% (w/v). In some embodiments, the crowding agent may be included in the hybridization buffer in an amount of up to 1% (w/v), up to 1.5% (w/v), up to 2% (w/v), up to 3% (w/v), up to 4% (w/v), up to 5% (w/v), up to 6% (w/v), up to 8% (w/v), or up to 10% (w/v).

As described in some embodiments in Example 5 (see, e.g., FIGS. 7D-7F), inclusion of a crowding agent (e.g., dextran sulfate) in a hybridization buffer may, in some embodiments, allow for decreased hybridization time and/or hybridization in larger volumes (e.g., higher dilution of target oligonucleotide) of hybridization buffer than hybridization buffer without a crowding agent. For example, inclusion of dextran sulfate in hybridization buffer may be capable of reducing the hybridization time from overnight to approximately 80 minutes at a single temperature or 60 minutes with an additional temperature ramping step.

In some embodiments, inclusion of a crowding agent may improve the enrichment specificity. For example, one embodiment is shown in Example 5 (see FIG. 8A), wherein the enrichment specificity was increased from 45% to 80-95%. In some embodiments, improvement of the enrichment specificity due to the inclusion of a crowding agent may be more pronounced with a shorter incubation time.

In some embodiments, inclusion of a crowding agent in the hybridization buffer allows an enrichment reaction to happen more quickly with a lower concentration of DNA (including, for example, in a larger relative volume of hybridization buffer). Such an increase may be used to facilitate "pooling-by-volume" and/or elimination of a sample concentration step. Generally, to achieve a fast hybridization reaction requires the use of a high concentration of DNA resulting from the library preparation and a high concentration of probes and, therefore, in some embodiments, a correspondingly small volume of hybridization buffer (e.g., less than 20 μL). Achieving this small volume requires a sample concentration step after library preparation (with resulting increases in the time and cost of the assay as a whole). With the inclusion of a crowding agent in the hybridization buffer, an enrichment reaction may be achieved more quickly, at a lower DNA concentration and/or probe concentration (and, in some embodiments, in a larger volume). In some embodiments, inclusion of a crowding agent in the hybridization buffer allows the combination of multiple library preparation samples without a concentration step prior to hybridization. In some embodiments, the samples resulting from different library preparations may be pooled by volume, as further described in this disclosure, allowing for multiplex enrichment. The "plexy" or "plex" of a given multiplex enrichment refers to the number of different library preparations that are combined before enrichment (e.g., hybridization and capture). In some embodiments, the plexy of multiplex enrichment can be up to 2-plex, up to 4-plex, up to 6-plex, up to 12-plex, up to 24-plex, up to 48-plex, up to 96-plex, or higher.

In some embodiments, a hybridization buffer including a crowding agent further includes at least one of human Cot-1 DNA, a destabilizing agent, salt, and a blocker. In some embodiments, the components of hybridization buffer such as Cot-1 DNA and a blocker are kept separated from the components of hybridization buffer including a destabilizing agent and a crowding agent until the hybridization reaction is performed.

In some embodiments, a hybridization buffer may include human Cot-1 DNA in an amount of at least 0.05 mg/mL, at least 0.1 mg/mL, at least 0.2 mg/mL, or at least 0.3 mg/mL. In some embodiments, a hybridization buffer may include human Cot-1 DNA in an amount of up to 0.1 mg/mL, up to 0.2 mg/mL, up to 0.3 mg/mL, or up to 0.5 mg/mL. In some embodiments, a hybridization buffer may preferably include human Cot-1 DNA in an amount of 0.2 mg/mL.

In some embodiments, a hybridization buffer may include a destabilizing agent. In some embodiments, the destabilizing agent may include formamide and/or urea. In some embodiments, the hybridization buffer may include at least 1% (v:v), at least 5% (v:v), or at least 10% (v:v) formamide. In some embodiments, the hybridization buffer may include up to 5% (v:v), up to 10% (v:v), or up to 15% (v:v) formamide. In some embodiments, the hybridization buffer may include at least 1 M urea, at least 2 M urea, or at least 4 M urea. In some embodiments, the hybridization buffer may include up to 2 M urea, up to 4 M urea, or up to 6 M urea. In some embodiments, a hybridization buffer may preferably include 10% formamide.

In some embodiments, a hybridization buffer may include a buffer. Any suitable buffer may be used. In some embodiments, the buffer may include a phosphate including, for example, potassium phosphate or sodium phosphate; Tris-HCl; piperazine-N,N'-bis(2-ethanesulfonic acid) (PIPES); Piperazine-N,N'-bis(3-propanesulfonic acid) (PIPPS); 2-(N-morpholino)ethanesulfonic acid (MES); (4-(2-hydroxyethyl)-1-piperazineethanesulfonic acid) (HEPES), etc. In some embodiments, a hybridization buffer may include at least 40 mM, at least 50 mM, at least 55 mM, at least 60 mM, at least 65 mM, or at least 70 mM phosphate. In some embodiments, a hybridization buffer may include up to 50 mM, up to 55 mM, up to 60 mM, up to 65 mM, up to 70 mM, up to 75 mM, or up to 80 mM phosphate. In some embodiments, a phosphate containing buffer may include monobasic dihydrogen phosphate and/or dibasic monohydrogen phosphate. In some embodiments, a phosphate containing buffer may include $KH_2PO_4$—$K_2HPO$. In some embodiments, a hybridization buffer may preferably include 66.6 mM $KH_2PO_4$—$K_2HPO_4$.

In some embodiments, a hybridization buffer may include a salt. Any suitable salt may be included. In some embodiments, the salt may be, for example, NaCl, or a sodium citrate (e.g., trisodium citrate), etc. In some embodiments, a hybridization buffer may include at least 0.1 M, at least 0.2 M, at least 0.3 M, at least 0.4 M, at least 0.5 M, at least 0.6 M, at least 0.7 M, at least 0.8 M, at least 0.9 M, or at least 1 M salt. In some embodiments, a hybridization buffer may include up to 0.2 M, up to 0.3 M, up to 0.4 M, up to 0.5 M, up to 0.6 M, up to 0.7 M, up to 0.8 M, up to 0.9 M, up to 1 M, up to 2 M, up to 3 M, or up to 4 M salt. In some embodiments, a hybridization buffer may preferably include 0.8 M NaCl.

In some embodiments, a hybridization buffer may include a detergent including, for example, an anionic detergent (e.g., sodium dodecyl sulfate, a sulfonic acid salt, an alcohol sulfate, an alkylbenzene sulfonate, a phosphoric acid ester, or a carboxylic acid salt), a nonionic detergent (e.g., a polyoxyethylene or glycoside detergent, such as a Tween, Triton, or Brij detergent), a cationic detergent (e.g., a quarternary ammonium cationic surfactant), or a zwitterionic detergent (e.g., CHAPS). In some embodiments, the detergent is an anionic detergent. In some embodiments, the detergent is a nonionic detergent. In some embodiments, the detergent is TWEEN 20, TWEEN 80, sodium dodecyl sulfate (SDS), etc. In some embodiments, a detergent may make up at least 0.001% volume/volume (v/v), at least 0.01% (v/v), at least 0.05% (v/v), at least 0.1% (v/v), at least 1% (v/v), or at least 5% (v/v) of the hybridization buffer. In some embodiments, a detergent may make up to 0.01% (v/v), up to 0.05% (v/v), up to 0.1% (v/v), up to 1% (v/v), up to 5% (v/v), or up to 10% (v/v) of the hybridization buffer. In some embodiments, a hybridization buffer may preferably include 0.04% (v/v) TWEEN 20.

For example, in some embodiments, a hybridization buffer may include 0.5% to 10% dextran sulfate, 0.05 mg/mL to 0.5 mg/mL human Cot-1 DNA, 1% to 15% (v/v) formamide, 40 mM to 80 mM $KH_2PO_4$—$K_2HPO_4$, 0.1 M to 4 M NaCl, and 0.001% to 10% (v/v) Tween 20. In some embodiments, a hybridization buffer may include (for example, in a final reaction) 1.5% dextran sulfate, 0.2 mg/mL Cot-1, 10% (v/v) formamide, 66.6 mM $KH_2PO_4$—$K_2HPO_4$, 0.8 M NaCl, and 0.04% (v/v) TWEEN 20.

In some embodiments, a hybridization buffer may include a blocker. In some embodiments, the blocker is as described elsewhere in this disclosure. In some embodiments, the blocker is present at a concentration of at least 0.001 mM, at least 0.005 mM, at least 0.01 mM, at least 0.05 mM, or at least 0.1 mM. In some embodiments, the blocker is present at a concentration of up to 0.01 mM, up to 0.05 mM, up to 0.1 mM, up to 0.2 mM, or up to 0.5 mM.

In another aspect, the disclosure describes a kit that includes a hybridization buffer, for example, as described herein. In an embodiment the kit further includes at least one of a blocker and a probe. In embodiments the components are provided in separate containers. For example, the hybridization buffer may be provided in a first container and another component, for example, a blocker or a probe may be provided in a different container(s). In some embodiments, the blocker and/or the probe are as described elsewhere in this disclosure.

Hybrid Capture

In a further aspect, this disclosure describes a method of hybrid capture. In some embodiments, the method includes steps including hybridizing probes to library members and capturing probes. In some embodiments, the method further includes pooling libraries prior to hybridizing probes. In some embodiments, the method further includes amplifying the captured sequences after capture. In some embodiments, the method may be used in combination with a blocker oligonucleotide as described in this disclosure. In some embodiments, the method may include the use of a hybridization buffer including a crowding agent as described in this disclosure.

Pooling Libraries

In some embodiments, samples resulting from different library preparations are combined prior to hybridization. In some embodiments, each library to be combined preferably includes sequences with index regions that are distinguishable from the index regions of the sequences in any other library to be combined.

In some embodiments, the samples resulting from different library preparations may be pooled by volume, allowing for multiplex enrichment. The "plexy" or "plex" of a given multiplex enrichment refers to the number of different library preparations that are combined before enrichment (e.g., hybridization and capture). In some embodiments, the plexy of multiplex enrichment can be up to 2-plex, up to 4-plex, up to 6-plex, up to 12-plex, up to 24-plex, up to 48-plex, up to 96-plex, or higher.

In some embodiments, a sample resulting from a library preparation results from a tagmentation reaction. See, e.g., U.S. Pat. No. 9,574,226. In some embodiments, a sample resulting from a library preparation results from a NEXTERA library preparation (Illumina, Inc., San Diego, CA). In some embodiments, the library preparation can be directly added into a hybridization reaction.

In some embodiments, the DNA concentration of each sample resulting from a library preparation being combined will be at least 0.1 ng/µL, at least 0.3 ng/µL, at least 0.4 ng/µL, at least 0.5 ng/µL, at least 1 ng/µL, at least 2 ng/µL, at least 4 ng/µL, at least 6 ng/µL, at least 8 ng/µL, at least 10 ng/µL, at least 12 ng/µL, at least 20 ng/µL, at least 50 ng/µL, at least 60 ng/µL, at least 100 ng/µL, or at least 200 ng/µL. In some embodiments, the DNA concentration of each sample resulting from a library preparation being combined will be up to 0.4 ng/µL, up to 0.5 ng/µL, up to 1 ng/µL, up to 2 ng/µL, up to 4 ng/µL, up to 6 ng/µL, up to 8 ng/µL, up to 10 ng/µL, up to 12 ng/µL, up to 15 ng/µL, up to 20 ng/µL, up to 50 ng/µL, up to 100 ng/µL, up to 120 ng/µL, up to 200 ng/µL, up to 300 ng/µL, or up to 400 ng/µL. For example, in some embodiments, the DNA concentration of each sample resulting from a library preparation will be in a range of 0.3 ng/µL to 400 ng/µL. For example, in some embodiments, the DNA concentration of each sample resulting from a library preparation will be in a range of 0.1 ng/µL to 120 ng/µL. For example, in some embodiments, the DNA concentration of the combination of the samples resulting from the library preparations will be in a range of 0.1 ng/µL to 120 ng/µL (e.g., in 100 µL). For example, in some embodiments, the DNA concentration of each sample resulting from a library preparation will be in a range of 0.5 ng/µL to 12 ng/µL. In some embodiments, the DNA concentration of the combination of the samples resulting from the library preparations will be in a range of 0.5 ng/µL to 12 ng/µL (e.g., in 100 µL). For example, in some embodiments, the DNA concentration of each sample resulting from a library preparation will be in a range of 0.5 ng/µL to 120 ng/µL. In some embodiments, the DNA concentration of the combination of the samples resulting from the library preparations will be in a range of 0.5 ng/µL to 120 ng/µL (e.g., in 100 µL).

In some embodiments, at least 1 µL, at least 2 µL, at least 3 µL, at least 5 µL, at least 10 µL, at least 15 µL, at least 20 µL, or at least 25 µL of each sample resulting from a library preparation will be combined. In some embodiments, up to 2 µL, up to 3 µL, up to 5 µL, up to 10 µL, up to 15 µL, up to 20 µL, up to 25 µL, up to 30 µL, up to 40 µL, or up to 50 µL of each sample resulting from a library preparation will be combined.

In some embodiments, at least 10 ng, at least 15 ng, at least 25 ng, at least 50 ng, at least 100 ng, at least 200 ng, at least 500 ng, at least 1,000 ng, or at least 5,000 ng of DNA from each library preparation will be combined. In some embodiments, up to 15 ng, up to 25 ng, up to 50 ng, up to 100 ng, up to 200 ng, up to 500 ng, up to 1,000 ng, up to 5,000 ng, up to 10,000 ng, or up to 12,000 ng of DNA from each library preparation will be combined. For example, in some embodiments, 10 ng to 12,000 ng of DNA from each library preparation may be combined.

Hybridizing Probes

In some aspects, a method of hybrid capture includes contacting the library with a probe wherein the probe hybridizes to a region of interest within a library member. The region of interest is separate from the adaptor region and includes genomic material of interest. The probe includes a ligand that allows for subsequent capture of the probe. In some embodiments, the ligand preferably includes a biotin group.

The library is contacted with the probe in the presence of a hybridization buffer. In some embodiments, the hybridization buffer may include a crowding agent, as described in this disclosure. In some embodiments, the hybridization buffer may include a blocker, as described in this disclosure.

In some embodiments, a method of hybrid capture includes a heat-denaturation step. For example, a hybridization mixture including library members, blockers, and a probe in hybridization buffer may be heated to at least 90° C., at least 92° C., or at least 95° C. In some embodiments, the hybridization mixture may be heated up to 92° C., up to 95° C., up to 97° C., or up to 100° C. In some embodiments, the hybridization mixture preferably further includes Cot-1 DNA. In some embodiments, the hybridization buffer may include a blocker prior to being added to the hybridization mixture; in some embodiments, the blocker may be added to the hybridization mixture independently of the hybridization buffer.

In some embodiments, the DNA concentration in the hybridization mixture (e.g., the final hybridization reaction) will be at least 0.1 ng/µL, at least 0.3 ng/µL, at least 0.4 ng/µL, at least 0.5 ng/µL, at least 1 ng/µL, at least 2 ng/µL, at least 4 ng/µL, at least 6 ng/µL, at least 8 ng/µL, at least 10 ng/µL, at least 12 ng/µL, at least 15 ng/µL, at least 20 ng/µL, at least 50 ng/µL, at least 75 ng/µL, at least 100 ng/µL, at least 120 ng/µL, at least 150 ng/µL, at least 200 ng/µL. In some embodiments, the DNA concentration in the hybridization mixture (e.g., the final hybridization reaction) will be up to 0.3 ng/µL, up to 0.4 ng/µL, up to 0.5 ng/µL, up to 1 ng/µL, up to 2 ng/µL, up to 4 ng/µL, up to 6 ng/µL, up to 8 ng/µL, up to 10 ng/µL, up to 12 ng/µL, up to 15 ng/µL, up to 20 ng/µL, up to 50 ng/µL, up to 75 ng/µL, up to 100 ng/µL, up to 120 ng/µL, up to 150 ng/µL, up to 200 ng/µL, or up to 500 ng/µL. For example, in some embodiments, the DNA concentration in the hybridization mixture (e.g., the final hybridization reaction) will be in a range of 0.1 ng/µL to 120 ng/µL.

In some embodiments, the method may include the use of a volume of hybridization mixture of up to 150 µL, up to 140 µL, up to 130 µL, up to 120 µL, up to 110 µL, up to 100 µL, up to 90 µL, up to 80 µL, up to 70 µL, up to 60 µL, or up to 50 µL. In some embodiments, the method may include the use of a volume of hybridization mixture of at least 10 µL, at least 20 µL, at least 30 µL, at least 40 µL, at least 50 µL, at least 60 µL, or at least 70 µL In some embodiments, the hybridization mixture may be heated at a rate of at least 1° C./minute, at least 1.5° C./minute, at least 2° C./minute, at least 2.5° C./minute, at least 3° C./minute, or at least 5° C./minute. In some embodiments, the hybridization mixture may be heated at a rate of up to 1.5° C./minute, up to 2° C./minute, up to 2.5° C./minute, up to 3° C./minute, up to 5° C./minute, or up to 10° C./minute. In some embodiments, the hybridization mixture may be maintained at a temperature for a heat-denaturation for at least 1 minute, at least 2 minutes, at least 5 minutes, at least 10 minutes, or at least 20 minutes. In some embodiments, the hybridization mixture may be maintained at a temperature for a heat-denaturation for up to 2 minutes, up to 5 minutes, up to 10 minutes, up to 20 minutes, or longer.

Following the heat-denaturation step, a method of hybrid capture includes cooling the hybridization mixture. As the hybridization mixture cools from the heat-denaturation step temperature to a hybridization temperature, probe:target hybrids (that is, probe:library member hybrids) will form.

In some embodiments, the hybridization temperature may be at least 50° C., at least 55° C., at least 56° C., at least 57° C., at least 58° C., at least 59° C., at least 60° C., at least 61° C., at least 62° C., at least 63° C., at least 64° C., at least 65° C., or at least 70° C. In some embodiments, the hybridization temperature may be up to 56° C., up to 58° C., up to 60° C., up to 61° C., up to 62° C., up to 63° C., up to 64° C., up to 65° C., or up to 70° C. In some embodiments, the hybridization may include a ramp-down of temperature from a denaturing temperature to the hybridization temperature. In some embodiments, the temperature ramp may include a rate of at least −5° C./minute, at least −2° C./minute, at least −1° C./minute, at least −0.5° C./minute, or at least −0.2° C./minute.

In some embodiments, the method may include maintaining the library in contact with the probe and/or maintaining the hybridization mixture at a hybridization temperature for up to 3 days, up to 2 days, up to 24 hours, up to 20 hours, up to 16 hours, up to 12 hours, up to 6 hours, up to 3 hours, up to 2 hours, up to 90 minutes, up to 1 hour, or up to 30 minutes. In some embodiments, the method may include maintaining the library in contact with the probe and/or maintaining the hybridization mixture at a hybridization temperature for at least 30 minutes, at least 45 minutes, at least 1 hour, at least 90 minutes, at least 2 hours, at least 3 hours, at least 6 hours, at least 12 hours, at least 16 hours, at least 20 hours, or at least 24 hours. In some embodiments, including when the $T_m$ of the blocker is higher than the $T_m$ of the adaptor, blocker:adaptor hybrids will form before adaptor:adaptor hybrids form, thereby preventing the formation of "daisy chains" or concatenation of adaptor:adaptor hybrids.

Capture

In some aspects, a method of hybrid capture includes capturing the probe once it has hybridized to a member of the library using a capture means. The probe may be captured by any suitable means. For example, when the probe includes a biotin group, the probe may be captured using a streptavidin bead including, for example, a streptavidin-coated magnetic bead. In some embodiments, the probe may include FITC, and the capture means may include anti-FITC. In some embodiments, the probe may include a hapten and the capture means may include a molecule (e.g., an antibody) that binds that hapten. Other means for capture may be used, such as isotachophoresis, size exclusion chromatography, liquid chromatography, magnetic means, and the like.

In some embodiments, including for example when the capture means includes a streptavidin-coated bead, the method may include forming a capture mixture including the probe (including, e.g., a probe:target hybrid) and the capture means.

In some embodiments, the method may include maintaining the capture mixture at a capture temperature. In some embodiments, the capture temperature may be at least 50° C., at least 55° C., at least 56° C., at least 57° C., at least 58° C., at least 59° C., at least 60° C., at least 61° C., at least 62° C., at least 63° C., at least 64° C., at least 65° C., or at least 70° C. In some embodiments, the capture temperature may be up to 56° C., up to 58° C., up to 60° C., up to 61° C., up to 62° C., up to 63° C., up to 64° C., up to 65° C., or up to 70° C. In some embodiments, the capture mixture may be maintained at the capture temperature for at least 2 minutes, at least 5 minutes, at least 10 minutes, or at least 15 minutes. In some embodiments, the capture mixture may be maintained at the capture temperature for up to 5 minutes, up to 10 minutes, up to 15 minutes, up to 20 minutes, up to 30 minutes, up to 45 minutes, or longer. In some embodiments, and/or shake-mixing may be added every 5 or 10 minutes.

In some embodiments, the method may further include washing the captured probe (the captured probe may include, for example, a probe:target hybrid and/or captured library members). In some embodiments, the captured probe may be washed at least one time, at least two times, at least three times, or more. In some embodiments, the captured probe may be washed up to one time, up to two times, up to three times, or up to five times.

In some embodiments, washing the captured library members may include heating the captured probe in a wash buffer to a wash temperature. In some embodiments, the wash buffer may include a detergent. Any suitable buffer may be used including, for example, Tris-HCl; piperazine-N,N'-bis (2-ethanesulfonic acid) (PIPES); Piperazine-N,N'-bis(3-propanesulfonic acid) (PIPPS); 2-(N-morpholino)ethanesulfonic acid (MES); (4-(2-hydroxyethyl)-1-piperazineethanesulfonic acid) (HEPES), etc. Any suitable detergent may be used including, for example, TWEEN 20, TWEEN 80, sodium dodecyl sulfate (SDS), etc. In some embodiments, the wash buffer may include a compound intended to reduce the formation of secondary structure in GC-rich regions including, for example, betaine. In some embodiments, the wash buffer may include an iron chelating agent including, for example, deferoxamine mesylate, EGTA, EDTA, etc.

A wash temperature may be at least 20° C., at least 23° C., at least 25° C., at least 30° C., at least 35° C., at least 40° C., at least 45° C., at least 50° C., at least 55° C., at least 56° C., at least 57° C., at least 58° C., at least 59° C., at least 60° C., at least 61° C., at least 62° C., at least 63° C., at least 64° C., at least 65° C., or at least 70° C. In some embodiments, a wash temperature may be up to 30° C., up to 35° C., up to 40° C., up to 45° C., up to 50° C., up to 55° C., up to 56° C., up to 60° C., up to 61° C., up to 62° C., up to 63° C., up to 64° C., up to 65° C., or up to 70° C.

In some embodiments, the method may further include eluting the captured library members from the capture means and/or from the probe. For example, the captured library members may be eluted from a streptavidin bead and/or from a biotinylated probe. In embodiments wherein the streptavidin bead includes a magnetic streptavidin bead, elution may include the use of a magnet. In some embodiments, elution may include the use of a strong base including, for example, NaOH, KOH, Ca(OH)$_2$, etc.

In some embodiments, a solid support media may be used as a capture means including, for example a solid support media containing streptavidin. In some embodiments, the capture means may be washed under successively more stringent conditions at a temperature below that of the estimated probe:target $T_m$ value and/or above the $T_m$ value of the adaptor.

In some embodiments, captured library members can be eluted from a ligand (e.g., eluted from a biotinylated probe) or a capture means (e.g., eluted from a streptavidin bead) and directly loaded onto the flow cell.

In some embodiments, at least 60 femtomoles, at least 80 femtomoles, at least 90 femtomoles, at least 100 femtomoles, or at least 150 femtomoles of DNA can be eluted. In some embodiments, up to 150 femtomoles, up to 500 femtomoles, up to 1 picomole, up to 2 picomoles, or up to 3 picomoles of DNA may be eluted. For example, in some embodiments, 100 femtomoles to 2 picomoles of DNA may be eluted.

In some embodiments, the eluted library members may be loaded onto the flow cell in a volume of less than 100 μL, a volume of less than 90 μL, a volume of less than 80 μL, a volume of less than 70 μL, or a volume of less than 60 μL. In some embodiments, the captured library members may be loaded onto a flow cell in a volume of approximately 55 μL.

In some embodiments, following elution, the eluant may have a DNA concentration of at least 1.1 picomolar (pM), at least 1.2 pM, at least 1.3 pM, at least 10 pM, or at least 100 pM. In some embodiments, the eluant may have a DNA concentration of up to 100 pM, up to 200 pM, up to 250 pM, or up to 300 pM. For example, in some embodiments, the eluant may have a DNA concentration in the range of 1.3 pM to 250 pM. In some embodiments, the eluant may be loaded onto the flow cell without further dilution and/or without altering the DNA concentration.

Amplification

In another aspect, this disclosure describes a method that includes amplifying the library members using PCR following hybrid capture but prior to sequencing the captured library members. Alternatively, this disclosure describes a method that does not include exposing the captured library member to amplification conditions following hybrid capture prior to sequencing the library members (e.g., does not include exposing the captured library members to a PCR step to amplify captured library members prior to sequencing the library members). Methods of sequencing the captured library members typically include amplifying the library members (e.g., using a PCR step) prior to sequencing the library members.

The amount of DNA captured during hybridization and hybrid capture can be too low to quantitate directly either by fluorometric or analytic methods (e.g., Bioanalyzer). Amplifying the library enables quantification and quality control of the process.

Further, it is typical to dilute a sample that has been amplified using PCR after hybrid capture and prior to sequencing. For example, the typical quantification of an Illumina, Inc.'s NEXTERA Rapid Capture sample after PCR is in the mid-nanomolar range, whereas sequencing concentrations are in the low picomolar range. Thus, several orders of magnitude more molecules are generated by amplifying the captured library members than are required for sequencing.

In some embodiments, this disclosure describes a method of sequencing captured library members following hybrid capture. Such a method may include directly loading the captured library members and/or the eluted library members onto a flow cell (e.g., using a direct flowcell loading jig, as described, for example, in U.S. Provisional Pat. Application No. 62/564,466, filed on Sep. 28, 2017).

In some embodiments, a method may further include sequencing the captured library members after hybrid capture.

EMBODIMENTS

Exemplary Blocker Embodiments

1. A blocker comprising an oligonucleotide;
wherein the blocker is capable of binding to an adaptor, wherein the adaptor comprises a universal primer sequence and at least one of an index region or a unique molecular identifier (UMI);
and wherein the region of the blocker capable of binding to the index region and/or UMI of the adaptor comprises:
at least three thymine bases, at least four thymine bases, at least five thymine bases, at least six thymine bases, at least seven thymine bases, at least eight thymine bases, at least nine thymine bases, or at least ten thymine bases; or
universal bases and at least one non-universal base.

2. The blocker of Blocker Embodiment 1, wherein the region of the blocker capable of binding to the index region or UMI of the adaptor comprises as many thymine bases as the number of bases in the index region and/or the UMI of the adaptor.

3. The blocker of Blocker Embodiment 1, wherein the at least one non-universal base is located in the region of the blocker sequence corresponding to the index region and/or UMI and wherein the non-universal base is at the third position or the fifth position or both of the blocker sequence, relative to the 5' end of the index region.

4. The blocker of Blocker Embodiment 1 or Blocker Embodiment 3, wherein the at least one non-universal base comprises a modified guanine.

5. The blocker of any one of Blocker Embodiments 1, 3, or 4, wherein the at least one non-universal base comprises a random nucleotide.

6. The blocker of any one of Blocker Embodiments 1, 3, 4, or 5, wherein the universal base comprises 2'-deoxyinosine, 2'-deoxynebularine, 3-nitropyrrole 2'-deoxynucleoside, or 5-nitroindole 2'-deoxynucleoside.

7. The blocker of any one of the previous Blocker Embodiments, wherein the universal primer sequence comprises at least one of P5, P7, P5', P7', V2.A14.METS, V2.B15.METS, the complement of V2.A14.METS, and the complement of V2.B15.METS.

8. The blocker of any one of the previous Blocker Embodiments, wherein the blocker comprises a modification that increases the $T_m$ of the blocker relative to the same blocker that does not include the modification.

9. The blocker of any one of the previous Blocker Embodiments, wherein the blocker comprises at least one of a DNA or RNA oligonucleotide modified to capture low GC regions; a crosslinked oligonucleotide; a modified 5-methyl deoxycytidine (5-methyl-dc); 2,6-diaminopurine; a locked nucleic acid (LNA); a bridged nucleic acid (BNA); a tricyclic nucleic acid; a peptide nucleic acid (PNA); a C5-modified pyrimidine base; a propynyl pyrimidine; a morpholino; a phosphoramidite; and a 5'-Pyrene cap.

10. The blocker of any one of the previous Blocker Embodiments, wherein the blocker comprises a modified base at every base, at least every 2 bases, at least every 3 bases, at least every 4 bases, or at least every 5 bases.

11. The blocker of any one of the previous Blocker Embodiments, wherein the blocker comprises a 3' terminal group that precludes the availability of the blocker to serve as a primer for DNA synthesis.

12. The blocker of Blocker Embodiment 11, wherein the 3' terminal group comprises 3'-dC, 2',3'-ddC, inverted dT, or 3'-spacer C3.

13. The blocker of any one of the previous Blocker Embodiments, wherein the blocker comprises a sequence of Table 2A, Table 2B, Table 2C, or Table 3.

14. A kit comprising the blocker of any one of the preceding Blocker Embodiments.

Exemplary Split Blocker Embodiments

1. A blocker comprising two non-connected oligonucleotides;
wherein the blocker is capable of binding to at least a portion of an adaptor, wherein the adaptor comprises a universal primer sequence and at least one of an index region or a unique molecular identifier (UMI);
and wherein the non-connected oligonucleotides comprise bases that do not correspond to the index region and/or the UMI of the adaptor.

2. The blocker of Split Blocker Embodiment 1, wherein the non-connected oligonucleotides do not comprise bases corresponding to the index region and/or the UMI of the adaptor.

3. The blocker of any one of the previous Split Blocker Embodiments, wherein the universal primer sequence includes at least one of P5, P7, P5', P7', V2.A14.METS, V2.B15.METS, the complement of V2.A14.METS, and the complement of V2.B15.METS.

4. The blocker of any one of the previous Split Blocker Embodiments, wherein the blocker comprises a modification that increases the $T_m$ of the blocker relative to the same blocker that does not include the modification.

5. The blocker of any one of the previous Split Blocker Embodiments, wherein the blocker comprises at least one of a DNA or RNA oligonucleotide modified to capture low GC regions; a crosslinked oligonucleotide; a modified 5-methyl deoxycytidine (5-methyl-dc); 2,6-diaminopurine; a locked nucleic acid (LNA); a bridged nucleic acid (BNA); a tricyclic nucleic acid; a peptide nucleic acid (PNA); a C5-modified pyrimidine base; a propynyl pyrimidine; a morpholino; a phosphoramidite; and a 5'-Pyrene cap.

6. The blocker of any one of the previous Split Blocker Embodiments, wherein the blocker comprises a modified base at every base, at least every 2 bases, at least every 3 bases, at least every 4 bases, or at least every 5 bases.

7. The blocker of any one of the previous Split Blocker Embodiments, wherein the blocker comprises a 3' terminal group that precludes the availability of the blocker to serve as a primer for DNA synthesis.

8. The blocker of Split Blocker Embodiment 11, wherein the 3' terminal group comprises 3'-dC, 2',3'-ddC, inverted dT, or 3'-spacer C3.

9. The blocker of any one of the previous Split Blocker Embodiments, wherein the blocker comprises a sequence of Table 2A, Table 2B, Table 2C, or Table 3.

10. The blocker of any of the previous Split Blocker Embodiments, wherein the blocker comprises at least one of BN023, BN024, BN027, and BN028 of Table 2A.

11. A kit comprising the blocker of any one of the preceding Split Blocker Embodiments.

Exemplary Hybridization Buffer Embodiments

1. A hybridization buffer comprising a crowding agent.
2. The hybridization buffer of Hybridization Buffer Embodiment 1, wherein the crowding agent comprises at least one of dextran, dextran sulfate, polyethylene glycol (PEG), Ficoll, glycerol, and betaine.
3. The hybridization buffer of any one of the preceding Hybridization Buffer Embodiments, wherein the crowding agent is included in the hybridization buffer in an amount of at least 0.5%, at least 1%, at least 1.5%, at least 2%, at least 3%, or at least 4%.
4. The hybridization buffer of any one of the preceding Hybridization Buffer Embodiments, wherein the crowding agent is included in the hybridization buffer in an amount of up to 1%, up to 1.5%, up to 2%, up to 3%, up to 4%, up to 5%, up to 6%, up to 8%, or up to 10%.
5. The hybridization buffer of any one of the preceding Hybridization Buffer Embodiments, wherein the hybridization buffer comprises at least one of human Cot-1 DNA, a destabilizing agent, salt, and a blocker.
6. The hybridization buffer of Hybridization Buffer Embodiment 5, wherein the hybridization buffer comprises Cot-1 DNA in an amount of at least 0.05 mg/mL, at least 0.1 mg/mL, at least 0.2 mg/mL, or at least 0.3 mg/mL.
7. The hybridization buffer of Hybridization Buffer Embodiment 5 or 6, wherein the hybridization buffer comprises Cot-1 DNA in an amount of up to 0.1 mg/mL, up to 0.2 mg/mL, up to 0.3 mg/mL, or up to 0.5 mg/mL.
8. The hybridization buffer of any one of Hybridization Buffer Embodiments 5 to 7, wherein the destabilizing agent comprises at least 1% (v/v), at least 5% (v/v), or at least 10% (v/v) of the hybridization buffer.
9. The hybridization buffer of any one of Hybridization Buffer Embodiments 5 to 8, wherein the destabilizing agent comprises up to 5% (v/v), up to 10% (v/v), or up to 15% (v/v) of the hybridization buffer.
10. The hybridization buffer of any one of Hybridization Buffer Embodiments 5 to 9, wherein the destabilizing agent comprises formamide.
11. The hybridization buffer of any one of Hybridization Buffer Embodiments 5 to 10, wherein the hybridization buffer comprises at least 0.1 M, at least 0.2 M, at least 0.3 M, at least 0.4 M, at least 0.5 M, at least 0.6 M, at least 0.7 M, at least 0.8 M, at least 0.9 M, or at least 1 M salt.
12. The hybridization buffer of any one of Hybridization Buffer Embodiments 5 to 11, wherein the hybridization buffer comprises up to 0.2 M, up to 0.3 M, up to 0.4 M, up to 0.5 M, up to 0.6 M, up to 0.7 M, up to 0.8 M, up to 0.9 M, up to 1 M, up to 2 M, up to 3 M, or up to 4 M salt.
13. The hybridization buffer of any one of Hybridization Buffer Embodiments 5 to 11, wherein the salt comprises NaCl.
14. The hybridization buffer of any one of the preceding Hybridization Buffer Embodiments, wherein the hybridization buffer comprises a phosphate.
15. The hybridization buffer of Hybridization Buffer Embodiment 14, wherein the hybridization buffer comprises at least 40 mM, at least 50 mM, at least 55 mM, at least 60 mM, at least 65 mM, or at least 70 mM phosphate.

16. The hybridization buffer of Hybridization Buffer Embodiments 14 of 15, wherein the hybridization buffer comprises up to 50 mM, up to 55 mM, up to 60 mM, up to 65 mM, up to 70 mM, up to 75 mM, or up to 80 mM phosphate.
17. The hybridization buffer of any one of Hybridization Buffer Embodiments 14 to 16, wherein the phosphate comprises $KH_2PO_4$—$K_2HPO_4$.
18. The hybridization buffer of any one of the preceding Hybridization Buffer Embodiments, wherein the hybridization buffer comprises a detergent.
19. The hybridization buffer of Hybridization Buffer Embodiment 18, wherein the hybridization buffer comprises at least 0.001% (v/v), at least 0.01% (v/v), at least 0.05% (v/v), at least 0.1% (v/v), at least 1% (v/v), or at least 5% (v/v) detergent.
20. The hybridization buffer of Hybridization Buffer Embodiment 18 or 19, wherein the hybridization buffer comprises up to 0.01% (v/v), up to 0.05% (v/v), up to 0.1% (v/v), up to 1% (v/v), up to 5% (v/v), or up to 10% (v/v) detergent.
21. The hybridization buffer of any one of Hybridization Buffer Embodiments 18 to 20, wherein the detergent comprises TWEEN 20.
22. The hybridization buffer of any one of the preceding Hybridization Buffer Embodiments, wherein the hybridization buffer comprises 0.5% to 10% dextran sulfate, 0.05 mg/mL to 0.5 mg/mL human Cot-1 DNA, 1% to 15% (v/v) formamide, 40 mM to 80 mM $KH_2PO_4$—$K_2HPO_4$, 0.1 M to 4 M NaCl, and 0.001% to 10% (v/v) Tween 20.

23. The hybridization buffer of any one of the preceding Hybridization Buffer Embodiments, wherein the hybridization buffer comprises 1.5% Dextran Sulfate, 0.2 mg/mL human Cot-1 DNA, 10% (v/v) formamide, 66.6 mM $KH_2PO_4$—$K_2HPO_4$, 0.2 mM Enhanced adaptor blockers, (0.1 mM for each adaptor)

0.8 M NaCl, and 0.04% (v/v) Tween 20.

24. The hybridization buffer of any one of the preceding Hybridization Buffer Embodiments, wherein the hybridization buffer comprises a blocker.
25. The hybridization buffer of Hybridization Buffer Embodiment 24, wherein the blocker comprises a $T_m$-enhanced oligonucleotide.
26. The hybridization buffer of Hybridization Buffer Embodiment 24 or 25, wherein the blocker comprises a plurality of $T_m$-enhancing modifications.
27. The hybridization buffer of Hybridization Buffer Embodiment 26, wherein the plurality of modifications that increase the $T_m$ of the blocker comprise at least one of a crosslinked oligonucleotide; a modified 5-methyl deoxycytidine (5-methyl-dc); 2,6-diaminopurine; a locked nucleic acid (LNA); a bridged nucleic acid (BNA); a tricyclic nucleic acid; a peptide nucleic acid (PNA); a C5-modified pyrimidine base; a propynyl pyrimidine; a morpholino; a phosphoramidite; and a 5'-Pyrene cap.

28. The hybridization buffer of any one of the preceding Hybridization Buffer Embodiments, wherein the hybridization buffer comprises a blocker,
wherein the blocker comprises an oligonucleotide;
wherein the blocker is capable of binding to an adaptor, wherein the adaptor comprises a universal primer sequence and at least one of an index region or a unique molecular identifier (UMI);
and wherein the region of the blocker capable of binding to the index region and/or UMI of the adaptor comprises:
at least three thymine bases, at least four thymine bases, at least five thymine bases, at least six thymine bases, at least seven thymine bases, at least eight thymine bases, at least nine thymine bases, or at least ten thymine bases; or
universal bases and at least one non-universal base.

29. The hybridization buffer of any one of the preceding Hybridization Buffer Embodiments, wherein the hybridization buffer comprises a blocker,
wherein the blocker comprises two non-connected oligonucleotides;
wherein the blocker is capable of binding to at least a portion of an adaptor, wherein the adaptor comprises a universal primer sequence and at least one of an index region or a unique molecular identifier (UMI);
and wherein the non-connected oligonucleotides comprise bases that do not correspond to the index region of the adaptor and/or the UMI of the adaptor.

30. The hybridization buffer of Hybridization Buffer Embodiments 28 or 29, wherein the blocker comprises a plurality of $T_m$-enhancing modifications.

31. A kit comprising the hybridization buffer of any one of the preceding Hybridization Buffer Embodiments.

Exemplary Methods of Using a Hybridization Buffer (Buffer Method Embodiments)

1. A method comprising using a hybridization buffer comprising a crowding agent for hybrid capture.

2. The method of Buffer Method Embodiment 1, wherein the crowding agent comprises at least one of dextran, dextran sulfate, polyethylene glycol (PEG), Ficoll, glycerol, and betaine.

3. The method of any one of the preceding Buffer Method Embodiments, wherein the crowding agent is included in the hybridization buffer in an amount of at least 0.5% (w/v), at least 1% (w/v), at least 1.5% (w/v), at least 2% (w/v), at least 3% (w/v), or at least 4% (w/v).

4. The method of any one of the preceding Buffer Method Embodiments, wherein the crowding agent is included in the hybridization buffer in an amount of up to 1% (w/v), up to 1.5% (w/v), up to 2% (w/v), up to 3% (w/v), up to 4% (w/v), up to 5% (w/v), up to 6% (w/v), up to 8% (w/v), or up to 10% (w/v).

5. The method of any one of the preceding Buffer Method Embodiments, wherein the hybridization buffer comprises at least one of human Cot-1 DNA, a destabilizing agent, and salt.

6. The method of Buffer Method Embodiment 5, wherein the hybridization buffer comprises human Cot-1 DNA in an amount of at least 0.05 mg/mL, at least 0.1 mg/mL, at least 0.2 mg/mL, or at least 0.3 mg/mL.

7. The method of Buffer Method Embodiment 5 or 6, wherein the hybridization buffer comprises human Cot-1 DNA in an amount of up to 0.1 mg/mL, up to 0.2 mg/mL, up to 0.3 mg/mL, or up to 0.5 mg/mL.

8. The method of any one of Buffer Method Embodiments 5 to 7, wherein the destabilizing agent comprises at least 1% (v/v), at least 5% (v/v), or at least 10% (v/v) of the hybridization buffer.

9. The method of any one of Buffer Method Embodiments 5 to 8, wherein the destabilizing agent comprises up to 5% (v/v), up to 10% (v/v), or up to 15% (v/v) of the hybridization buffer.

10. The method of any one of Buffer Method Embodiments 5 to 9, wherein the destabilizing agent comprises formamide.

11. The method of any one of Buffer Method Embodiments 5 to 10, wherein the hybridization buffer comprises at least 0.1 M, at least 0.2 M, at least 0.3 M, at least 0.4 M, at least 0.5 M, at least 0.6 M, at least 0.7 M, at least 0.8 M, at least 0.9 M, or at least 1 M salt.

12. The method of any one of Buffer Method Embodiments 5 to 11, wherein the hybridization buffer comprises up to 0.2 M, up to 0.3 M, up to 0.4 M, up to 0.5 M, up to 0.6 M, up to 0.7 M, up to 0.8 M, up to 0.9 M, up to 1 M, up to 2 M, up to 3 M, or up to 4 M salt.

13. The method of any one of Buffer Method Embodiments 5 to 12, wherein the salt comprises NaCl.

14. The method of any one of the preceding Buffer Method Embodiments,
wherein the hybridization buffer comprises a phosphate.

15. The method of Buffer Method Embodiment 14, wherein the hybridization buffer comprises at least 40 mM, at least 50 mM, at least 55 mM, at least 60 mM, at least 65 mM, or at least 70 mM phosphate.

16. The method of Buffer Method Embodiments 14 or 15, wherein the hybridization buffer comprises up to 50 mM, up to 55 mM, up to 60 mM, up to 65 mM, up to 70 mM, up to 75 mM, or up to 80 mM phosphate.

17. The method of any one of Buffer Method Embodiments 14 to 16, wherein the phosphate comprises $KH_2PO_4$—$K_2HPO_4$.

18. The method of any one of the preceding Buffer Method Embodiments,
wherein the hybridization buffer comprises a detergent.

19. The method of Buffer Method Embodiment 17, wherein the hybridization buffer comprises at least 0.001% (v/v), at least 0.01% (v/v), at least 0.05% (v/v), at least 0.1% (v/v), at least 1% (v/v), or at least 5% (v/v) detergent.

20. The method of Buffer Method Embodiment 18 or 19, wherein the hybridization buffer comprises up to 0.01% (v/v), up to 0.05% (v/v), up to 0.1% (v/v), up to 1% (v/v), up to 5% (v/v), or up to 10% (v/v) detergent.

21. The method of any one of Buffer Method Embodiments 18 to 20, wherein the hybridization buffer comprises TWEEN 20.

22. The method of any one of the preceding Buffer Method Embodiments,
wherein the hybridization buffer comprises:
0.5% to 10% dextran sulfate,
0.05 mg/mL to 0.5 mg/mL Cot-1,
1% to 15% (v/v) formamide,
40 mM to 80 mM $KH_2PO_4$—$K_2HPO_4$,
0.1 M to 4 M NaCl, and
0.001% to 10% (v/v) TWEEN 20.

23. The method of any one of the preceding Buffer Method Embodiments,
wherein the hybridization buffer comprises:
1.5% dextran sulfate,
0.2 mg/mL Cot-1, 10% (v/v) formamide,
66.6 mM $KH_2PO_4$—$K_2HPO_4$,
0.8 M NaCl, and
0.04% (v/v) TWEEN 20.

24. The method of any one of the preceding Buffer Method Embodiments,
wherein the hybridization buffer comprises a blocker.

25. The method of Buffer Method Embodiment 24, wherein the blocker is present at a concentration of at least 0.001 mM, at least 0.005 mM, at least 0.01 mM, at least 0.05 mM, or at least 0.1 mM.

26. The method of Buffer Method Embodiment 24 or 25, wherein the blocker is present at a concentration of up to 0.01 mM, up to 0.05 mM, up to 0.1 mM, up to 0.2 mM, or up to 0.5 mM.

27. The method of any one of the preceding Buffer Method Embodiments,
wherein the method comprises forming the hybridization buffer from a first composition comprising human Cot-1 DNA and a blocker and a second composition comprising formamide and dextran sulfate.

28. The method of any one of the preceding Buffer Method Embodiments,
wherein the method comprises contacting a library with the hybridization buffer, wherein the hybridization buffer comprises a blocker.

29. The method of Buffer Method Embodiment 28, wherein the method comprises combining samples from at least two library preparations prior to contacting the library with the blocker in the presence of the hybridization buffer.

30. The method of Buffer Method Embodiment 29, wherein at least 1 at least at least 3 at least 5 at least 10 at least 15 or at least 20 µL of a sample resulting from each library preparation are combined.

31. The method of Buffer Method Embodiment 29 or 30, wherein up to 2 up to 3 up to 5 up to 10 up to 15 up to 20 up to 25 µL, up to 30 up to or up to 50 µL of a sample resulting from each library preparation are combined.

32. The method of any one of Buffer Method Embodiments 29 to 31, wherein at least 10 ng, at least 15 ng, at least 25 ng, at least 50 ng, at least 100 ng, at least 200 ng, at least 500 ng, at least 1,000 ng, or at least 5,000 ng of DNA from each library preparation are combined.

33. The method of any one of Buffer Method Embodiments 29 to 32, wherein up to 15 ng, up to 25 ng, up to 50 ng, up to 100 ng, up to 200 ng, up to 500 ng, up to 1,000 ng, up to 5,000 ng, up to 10,000 ng, or up to 12,000 ng of DNA from each library preparation are combined.

34. The method of any one of Buffer Method Embodiments 29 to 33, wherein the DNA concentration of each sample resulting from a library preparation being combined is at least 0.1 ng/µL, at least 0.3 ng/µL, at least 0.4 ng/µL, at least 0.5 ng/µL, at least 1 ng/µL, at least 2 ng/µL, at least 4 ng/µL, at least 6 ng/µL, at least 8 ng/µL, at least 10 ng/µL, at least 12 ng/µL, at least 20 ng/µL, at least 50 ng/µL, at least 60 ng/µL, at least 100 ng/µL, or at least 200 ng/µL.

35. The method of any one of Buffer Method Embodiments 29 to 34, wherein the DNA concentration of each sample resulting from a library preparation being combined is up to 0.4 ng/µL, up to 0.5 ng/µL, up to 1 ng/µL, up to 2 ng/µL, up to 4 ng/µL, up to 6 ng/µL, up to 8 ng/µL, up to 10 ng/µL, up to 12 ng/µL, up to 15 ng/µL, up to 20 ng/µL, up to 50 ng/µL, up to 100 ng/µL, up to 120 ng/µL, up to 200 ng/µL, up to 300 ng/µL, or up to 400 ng/µL.

36. The method of any one of Buffer Method Embodiments 29 to 35, wherein the DNA concentration after the library preparations are combined is in a range of 0.3 ng/µL to 400 ng/µL.

37. The method of any one of Buffer Method Embodiments 29 to 36, wherein the method further comprises contacting library members with a probe, wherein the probe hybridizes to a region of interest within a library member, and wherein the probe comprises a ligand.

38. The method of Buffer Method Embodiment 37, wherein the ligand comprises a biotin group.

39. The method of any one Buffer Method Embodiments 29 to 38, wherein the method comprises forming a hybridization mixture comprising library members, the hybridization buffer (wherein the hybridization buffer comprises a blocker), and a probe.

40. The method of Buffer Method Embodiment 39, wherein the hybridization mixture further comprises human Cot-1 DNA.

42. The method of Buffer Method Embodiment 39 or 40, wherein the method comprises using a volume of hybridization mixture of up to 150 µL, up to 140 µL, up to 130 µL, up to 120 µL, up to 110 µL, up to 100 µL, up to 90 µL, up to 80 µL, up to 70 µL, up to 60 µL or up to 50 µL.

42. The method of any one of Buffer Method Embodiments 39 to 41, wherein the method comprises using a volume of hybridization mixture of at least 10 µL, at least 20 µL, at least 30 µL, at least 40 µL, at least 50 µL, at least 60 µL, or at least 70 µL.

43. The method of any one of Buffer Method Embodiments 39 to 42, wherein the DNA concentration in the hybridization mixture is at least at least 0.1 ng/µL, at least 0.3 ng/µL, at least 0.4 ng/µL, at least 0.5 ng/µL, at least 1 ng/µL, at least 2 ng/µL, at least 4 ng/µL, at least 6 ng/µL, at least 8 ng/µL, at least 10 ng/µL, at least 12 ng/µL, at least 15 ng/µL, at least 20 ng/µL, at least 50 ng/µL, at least 75 ng/µL, at least 100 ng/µL, at least 120 ng/µL, at least 150 ng/µL, at least 200 ng/µL.

44. The method of any one of Buffer Method Embodiments 39 to 43, wherein the DNA concentration in the hybridization mixture is up to 0.3 ng/µL, up to 0.4 ng/µL, up to 0.5 ng/µL, up to 1 ng/µL, up to 2 ng/µL, up to 4 ng/µL, up to 6 ng/µL, up to 8 ng/µL, up to 10 ng/µL, up to 12 ng/µL, up to 15 ng/µL, up to 20 ng/µL, up to 50 ng/µL, up to 75 ng/µL, up to 100 ng/µL, up to 120 ng/µL, up to 150 ng/µL, up to 200 ng/µL, or up to 500 ng/µL.

45. The method of any one of Buffer Method Embodiments 37 to 44, wherein the library is in contact with the probe for up to 3 days, up to 2 days, up to 24 hours, up to 20 hours, up to 16 hours, up to 12 hours, up to 6 hours, up to 3 hours, up to 2 hours, up to 90 minutes, up to 1 hour, or up to 30 minutes.

46. The method of any one of Buffer Method Embodiments 37 to 45, wherein the library is in contact with the probe for at least 30 minutes, at least 45 minutes, at least 1 hour, at least 90 minutes, at least 2 hours, at least 3 hours, at least 6 hours, at least 12 hours, at least 16 hours, at least 20 hours, or at least 24 hours.

47. The method of any one of Buffer Method Embodiments 39 to 46, wherein method comprises maintaining the hybridization mixture at a hybridization temperature and wherein the hybridization temperature is at least 50° C., at least 55° C., at least 56° C., at least 57° C., at least 58° C., at least 59° C., at least 60° C., at least 61° C., at least 62° C., at least 63° C., at least 64° C., at least 65° C., or at least 70° C.

48. The method of any one of Buffer Method Embodiments 39 to 47, wherein method comprises maintaining the hybridization mixture at a hybridization temperature and wherein the hybridization temperature is up to 56° C., up to 58° C., up to 60° C., up to 61° C., up to 62° C., up to 63° C., up to 64° C., up to 65° C., or up to 70° C.

49. The method of any one of Buffer Method Embodiments 39 to 48, wherein the method comprises maintaining the hybridization mixture at a hybridization temperature for up to 3 days, up to 2 days, up to 24 hours, up to 20 hours, up to 16 hours, up to 12 hours, up to 6 hours, up to 3 hours, up to 2 hours, up to 90 minutes, up to 1 hour, or up to 30 minutes.

50. The method of any one of Buffer Method Embodiments 39 to 49, wherein the method comprises maintaining the hybridization mixture at a hybridization temperature for at least 30 minutes, at least 45 minutes, at least 1 hour, at least 90 minutes, at least 2 hours, at least 3 hours, at least 6 hours, at least 12 hours, at least 16 hours, at least 20 hours, or at least 24 hours.

51. The method of any one of Buffer Method Embodiments 37 to 50, wherein the method further comprises capturing the probe after it has hybridized using a capture means.

52. The method of Buffer Method Embodiment 51, wherein capturing the probe comprises using a streptavidin bead.

53. The method of any one of Buffer Method Embodiments 37 to 52, wherein the method comprises forming a capture mixture including the probe and a capture means.

54. The method of Buffer Method Embodiment 53, wherein the method comprising maintaining the capture mixture at a capture temperature of at least 50° C., at least 55° C., at least 56° C., at least 57° C., at least 58° C., at least 59° C., at least 60° C., at least 61° C., at least 62° C., at least 63° C., at least 64° C., at least 65° C., or at least 70° C.

55. The method of Buffer Method Embodiment 53 or 54, wherein the method comprising maintaining the capture mixture at a capture temperature of up to 56° C., up to 58° C., up to 60° C., up to 61° C., up to 62° C., up to 63° C., up to 64° C., up to 65° C., or up to 70° C.

56. The method of any one of Buffer Method Embodiments 53 to 55, wherein the method comprises maintaining the capture mixture at a capture temperature for at least 2 minutes, at least 5 minutes, at least 10 minutes, or at least 15 minutes.

57. The method of any one of Buffer Method Embodiments 53 to 56, wherein the method comprises maintaining the capture mixture at a capture temperature for up to 5 minutes, up to 10 minutes, up to 15 minutes, up to 20 minutes, up to 30 minutes, or up to 45 minutes.

58. The method of any one of Buffer Method Embodiments 53 to 57, wherein the method comprises washing the captured probe.

59. The method of any one of Buffer Method Embodiments 53 to 58, wherein the method further comprises eluting the captured library members from the capture means into an eluant.

60. The method of any one of Buffer Method Embodiments 53 to 59, wherein the method further comprises eluting the captured library members from the probe into an eluant.

61. The method of Buffer Method Embodiment 60, wherein at least 60 femtomoles, at least 80 femtomoles, at least 90 femtomoles, at least 100 femtomoles, or at least 150 femtomoles of DNA is eluted.

62. The method of Buffer Method Embodiment 60 or 61, wherein up to 150 femtomoles, up to 500 femtomoles, up to 1 picomole, up to 2 picomoles, or up to 3 picomoles of DNA is eluted.

63. The method of any one of Buffer Method Embodiments 60 to 62, wherein the DNA concentration of the eluant is at least 1.1 pM, at least 1.2 pM, at least 1.3 pM, at least 10 pM, or at least 100 pM.

64. The method of any one of Buffer Method Embodiments 60 to 63, wherein the DNA concentration of the eluant is up to 100 pM, up to 200 pM, up to 250 pM, or up to 300 pM.

65. The method of any one of Buffer Method Embodiments 60 to 64, wherein the DNA concentration of the eluant is in the range of 1.3 pM to 250 pM.

66. The method of any one of Buffer Method Embodiments 37 to 65, wherein the method further comprises sequencing the library members.

67. The method of Buffer Method Embodiment 66, wherein the method comprises amplifying the library members prior to sequencing the library members.

68. The method of Buffer Method Embodiment 66, wherein the method does not comprise amplifying the library members prior to sequencing the library members.

69. The method of any of Buffer Method Embodiments 24 to 68, wherein the blocker comprises a $T_m$-enhanced oligonucleotide.

70. The method of any of Buffer Method Embodiments 24 to 69, wherein the blocker comprises a plurality of $T_m$-enhancing modifications.

71. The method of Buffer Method Embodiment 70, wherein the plurality of modifications that increase the $T_m$ of the blocker comprise at least one of a crosslinked oligonucleotide; a modified 5-methyl deoxycytidine (5-methyl-dc); 2,6-diaminopurine; a locked nucleic acid (LNA); a bridged nucleic acid (BNA); a tricyclic nucleic acid; a peptide nucleic acid (PNA); a C5-modified pyrimidine base; a propynyl pyrimidine; a morpholino; a phosphoramidite; and a 5'-Pyrene cap.

72. The method of any of Buffer Method Embodiments 24 to 71, wherein the blocker comprises an oligonucleotide;
wherein the blocker is capable of binding to an adaptor, wherein the adaptor comprises a universal primer sequence and at least one of an index region or a unique molecular identifier (UMI);
and wherein the region of the blocker capable of binding to the index region and/or UMI of the adaptor comprises:
at least three thymine bases, at least four thymine bases, at least five thymine bases, at least six thymine bases, at least seven thymine bases, at least eight thymine bases, at least nine thymine bases, or at least ten thymine bases; or
universal bases and at least one non-universal base.

73. The method of any of Buffer Method Embodiments 24 to 72, wherein the blocker comprises two non-connected oligonucleotides;
wherein the blocker is capable of binding to at least a portion of an adaptor, wherein the adaptor comprises a universal primer sequence and at least one of an index region or a unique molecular identifier (UMI);
and wherein the non-connected oligonucleotides comprise bases that do not correspond to the index region of the adaptor and/or the UMI of the adaptor.

Exemplary Methods of PCR-Free Hybrid Capture
(Capture Method Embodiments)

1. A method comprising
contacting a library with a blocker in the presence of a hybridization buffer;
and contacting the library with a probe, wherein the probe hybridizes to a region of interest within a library member;
wherein the method does not comprise amplifying the library members using PCR prior to sequencing the library members.

2. The method of Capture Method Embodiment 1, wherein the probe further comprises a ligand, and wherein the library members are eluted from the ligand prior to sequencing the library members.

3. The method Capture Method Embodiment 2 wherein the ligand comprises biotin.

4. The method of either of Capture Method Embodiments 2 or 3, the method comprising loading the library members onto a flow cell after elution from the ligand.

5. The method of any one of Capture Method Embodiments 1 to 4, wherein the method further comprises capturing the probe after it has hybridized using a capture means.

6. The method of Capture Method Embodiment 5, wherein the capture means comprises streptavidin.

7. The method of either of Capture Method Embodiments 5 or 6, the method comprising loading the library members onto a flow cell after elution from the capture means.

8. The method of Capture Method Embodiment 4 or 7, the method comprising loading the library members onto a flow cell in a volume of less than 100 µL, a volume of less than 90 µL, a volume of less than 80 µL, a volume of less than 70 µL, or a volume of less than 60 µL.

9. The method of Capture Method Embodiment 4 or 7, the method comprising loading the library members onto a flow cell at a concentration of at least 1.1 pM, at least 1.2 pM, at least 1.3 pM, at least 10 pM, or at least 100 pM.

10. The method of Capture Method Embodiment 4, 7, or 9, the method comprising loading the library members onto a flow cell at a concentration of up to 100 pM, up to 200 pM, up to 250 pM, or up to 300 pM.

11. The method of any one of Capture Method Embodiments 4, or 7-10, the method comprising loading the library members onto a flow cell using a direct flow cell loading jig.

12. The method of any one of the preceding Capture Method Embodiments,
wherein the hybridization buffer comprises a crowding agent.

13. The method of Capture Method Embodiment 12, wherein the hybridization buffer comprises
0.5% to 10% dextran sulfate,
0.05 mg/mL to 0.5 mg/mL human Cot-1 DNA,
1% to 15% (v/v) formamide,
40 mM to 80 mM $KH_2PO_4$—$K_2HPO_4$,
0.1 M to 4 M NaCl, and
0.001% to 10% (v/v) Tween 20.

14. The method of any one of the preceding Capture Method Embodiments,
wherein the blocker comprises a $T_m$-enhanced oligonucleotide.

15. The method of any one of the preceding Capture Method Embodiments,
wherein the blocker comprises a plurality of $T_m$-enhancing modifications.

16. The method of Capture Method Embodiment 15, wherein the plurality of modifications that increase the $T_m$ of the blocker comprise at least one of a crosslinked oligonucleotide; a modified 5-methyl deoxycytidine (5-methyl-dc); 2,6-diaminopurine; a locked nucleic acid (LNA); a bridged nucleic acid (BNA); a tricyclic nucleic acid; a peptide nucleic acid (PNA); a C5-modified pyrimidine base; a propynyl pyrimidine; a morpholino; a phosphoramidite; and a 5'-Pyrene cap.

17. The method of any one of the preceding Capture Method Embodiments,
wherein the blocker comprises an oligonucleotide;
wherein the blocker is capable of binding to an adaptor, wherein the adaptor comprises a universal primer sequence and at least one of an index region or a unique molecular identifier (UMI);
and wherein the region of the blocker capable of binding to the index region and/or UMI of the adaptor comprises:
at least three thymine bases, at least four thymine bases, at least five thymine bases, at least six thymine bases, at least seven thymine bases, at least eight thymine bases, at least nine thymine bases, or at least ten thymine bases; or
universal bases and at least one non-universal base.

18. The method of any one of the preceding Capture Method Embodiments,
wherein the blocker comprises two non-connected oligonucleotides;
wherein the blocker is capable of binding to at least a portion of an adaptor, wherein the adaptor comprises a universal primer sequence and at least one of an index region or a unique molecular identifier (UMI);
and wherein the non-connected oligonucleotides comprise bases that do not correspond to the index region of the adaptor and/or the UMI of the adaptor.

The present invention is illustrated by the following examples. It is to be understood that the particular examples, materials, amounts, and procedures are to be interpreted broadly in accordance with the scope and spirit of the invention as set forth herein.

Embodiments

The following numbered items provide embodiments as described herein, though the embodiments recited here are not limiting.

Item 1. A hybridization buffer comprising a crowding agent and at least one of human Cot-1 DNA, a destabilizing agent, salt, and a blocker.

Item 2. The hybridization buffer of Item 1, wherein the crowding agent comprises at least one of dextran, dextran sulfate, polyethylene glycol (PEG), Ficoll, glycerol, and betaine.

Item 3. The hybridization buffer of any one of the preceding Items, wherein the hybridization buffer comprises: 0.5% to 10% dextran sulfate, 0.05 mg/mL to 0.5 mg/mL Cot-1, 1% to 15% (v/v) formamide, 40 mM to 80 mM $KH_2PO_4$—$K_2HPO_4$, 0.1 M to 4 M NaCl, and 0.001% to 10% (v/v) TWEEN 20.

Item 4. The hybridization buffer of any one of the preceding Items, wherein the blocker comprises a plurality of $T_m$-enhancing modifications.

Item 5. A method comprising using the hybridization buffer of any one of the preceding Items.

Item 6. The method of Item 5, the method comprising forming a hybridization mixture comprising library members, the hybridization buffer, human Cot-1 DNA, a blocker, and a probe.

Item 7. The method of Item 6, wherein the hybridization mixture comprises samples from at least two library preparations, wherein at least 10 ng, at least 25 ng, at least 50 ng, at least 100 ng, at least 200 ng, or at least 500 ng of DNA from each library preparation are combined.

Item 8. The method of Item 6 or Item 7, wherein the DNA concentration of the hybridization mixture is in a range of 0.1 ng/μL to 120 ng/μL.

Item 9. The method of any one of Items 6 to 8, wherein the method comprises: contacting the library members with the probe, wherein the probe hybridizes to a region of interest within a library member, and wherein the probe comprises a ligand, capturing the probe after it has hybridized using a capture means, and eluting the captured library members from the capture means into an eluant, wherein the DNA concentration of the eluant is in the range of 1.3 pM to 250 pM.

Item 10. The method of any one of Items 6 to 9, wherein the method further comprises sequencing the library members and wherein the method does not comprise amplifying the library members prior to sequencing the library members.

Item 11. The method of Item 10, wherein the method comprises loading the library members onto a flow cell using a direct flow cell loading jig.

Item 12. A blocker comprising an oligonucleotide; wherein the blocker is capable of binding to an adaptor, wherein the adaptor comprises a universal primer sequence and at least one of an index region or a unique molecular identifier (UMI); and wherein the region of the blocker capable of binding to the index region and/or UMI of the adaptor comprises: at least three thymine bases, at least four thymine bases, at least five thymine bases, at least six thymine bases, at least seven thymine bases, at least eight thymine bases, at least nine thymine bases, or at least ten thymine bases; or universal bases and at least one non-universal base.

Item 13. A blocker comprising two non-connected oligonucleotides; wherein the blocker is capable of binding to at least a portion of an adaptor, wherein the adaptor comprises a universal primer sequence and at least one of an index region or a unique molecular identifier (UMI); and wherein the non-connected oligonucleotides comprise bases that do not correspond to the index region and/or the UMI of the adaptor.

Item 14. The blocker of Item 12 or 13, wherein the universal primer sequence comprises at least one of P5, P7, P5', P7', V2.A14.METS, V2.B15.METS, the complement of V2.A14.METS, and the complement of V2.B15.METS.

Item 15. The blocker of any one of Items 12 to 14, wherein the blocker comprises a modification that increases the $T_m$ of the blocker relative to the same blocker that does not include the modification.

Item 16. The blocker of any one of Items 12 to 15, wherein the blocker comprises at least one of a DNA or RNA oligonucleotide modified to capture low GC regions; a crosslinked oligonucleotide; a modified 5-methyl deoxycytidine (5-methyl-dc); 2,6-diaminopurine; a locked nucleic acid (LNA); a bridged nucleic acid (BNA); a tricyclic nucleic acid; a peptide nucleic acid (PNA); a C5-modified pyrimidine base; a propynyl pyrimidine; a morpholino; a phosphoramidite; and a 5'-Pyrene cap.

Item 17. A method comprising contacting a library with a blocker in the presence of a hybridization buffer; and contacting the library with a probe, wherein the probe hybridizes to a region of interest within a library member; wherein the method does not comprise amplifying the library members using PCR prior to sequencing the library members.

Item 18. The method of Item 17, wherein the method comprises loading the library members onto a flow cell at a concentration of at least 1.1 pM, at least 1.2 pM, at least 1.3 pM, at least 10 pM, or at least 100 pM and at a concentration of up to 100 pM, up to 200 pM, up to 250 pM, or up to 300 pM.

Item 19. The method of Item 17 or 18, wherein the blocker comprises a plurality of $T_m$-enhancing modifications.

Item 20. The method of any one of Items 17 to 19, wherein the hybridization buffer comprises a crowding agent.

Item 21. The method of any one of Items 17 to 20, wherein the hybridization buffer comprises 0.5% to 10% dextran sulfate, 0.05 mg/mL to 0.5 mg/mL human Cot-1 DNA, 1% to 15% (v/v) formamide, 40 mM to 80 mM $KH_2PO_4$—$K_2HPO_4$, 0.1 M to 4 M NaCl, and 0.001% to 10% (v/v) Tween 20.

Item 22. The method of any one of Items 17 to 21, the method comprising loading the library members onto a flow cell using a direct flow cell loading jig.

Item 23. A kit comprising the hybridization buffer of any one of Items 1 to 4.

Item 24. A kit comprising the blocker of any one of Items 12 to 16.

EXAMPLES

Example 1—Hybridization and Capture

Hybridization

A non-enhanced hybridization buffer includes the following components/final concentrations in a 100 μL hybridization reaction: human Cot-1 0.2 mg/ml, formamide 10% (v/v), $KH_2PO_4$—$K_2HPO_4$ 66.6 mM, NaCl 0.8 M, TWEEN 20 0.04% (v/v).

An enhanced hybridization buffer includes the following components/final concentrations in a 100 μL hybridization reaction: dextran sulfate 1.5% (w/v), human Cot-1 0.2 mg/ml, formamide 10% (v/v), $KH_2PO_4$—$K_2HPO_4$ 66.6 mM, NaCl 0.8 M, TWEEN 20 0.04% (v/v).

In each case, the 100 μL final reaction also contains: probes (with at least 500 probes and up to 500,000 probes) at concentration 125 pM per probe (with total probe concentration of at least 30 nM), and DNA samples of up to 30 μL (50 ng ~6 μg). If included, blockers are present at 0.2 mM.

The hybridization reaction is performed in a thermocycler or HYBEX system with accurate temperature control. After denaturing at 95° C. for 5 minutes, the hybridization reaction is incubated at 58° C. or 62° C. for 90 minutes (total hybridization time approximately (~) 100 minutes) or up to 24 hours. Ramping at 2° C. per minute starting from 95° C. to 58° C. or 62° C. (additional 20 minutes), can be followed by an incubation at 58° C. or 62° C., depending on probe design. (For the experiments described herein the samples are incubated at 62° C.).

Capture

Targeted DNA is captured using 250 μL of streptavidin beads SMB (Streptavidin Magnetic Beads, Illumina, Inc., San Diego, CA) for each 100 μL hybridization reaction at hybridization incubation temperature (e.g., 62° C. if hybridization reaction is incubated at 62° C. for 90 minutes) for 15 minutes. Targeted DNA is then washed at the same temperature (e.g., 62° C.) for 5 minutes for total 4 times using wash buffer EEW (Enhanced Enrichment Wash buffer, Illumina, Inc., San Diego, CA (Tris-HCL, Deferoxamine mesylate (DFO), betaine, and TWEEN 20)). Targeted DNA is eluted using fresh denaturation solution (0.1% (v/v) TWEEN 20 (EE1) and 2 N NaOH (HP3)), neutralized with ET2 (Elution Target Buffer 2, Illumina, Inc., San Diego, CA (Tris base, Tris Acetate)), and further amplified with a primer cocktail (PPC; sequencing adaptor primer set including 5 µM P5 and P7 primers, Illumina, Inc.) and Enhanced PCR Mix (EPM) (Illumina, Inc., San Diego, CA) and is cleaned up using 0.9× Solid Phase Reversible Immobilization (SPRI) beads.

Example 2—Blockers Including Thymine

This Example describes blockers that include thymine in the region of the blocker that corresponds to the index and/or UMI (see FIG. 3D).

Using the blockers of Table 3, Hybridization and Capture are performed as described in Example 1 using enhanced hybridization buffer and 0.2 mM blocker. The resulting captured DNA is sequenced and Padded Read Enrichment is calculated using the Enrichment v3.0 BASESPACE App (Illumina, Inc., San Diego, CA).

Blockers that include a stretch of T at the index sequence positions require at least 8 or 10 modified nucleotides in the region of the blocker that does not correspond to the index to achieve high capture of on-target DNA (as measured by Padded Read Enrichment).

Figure 4:
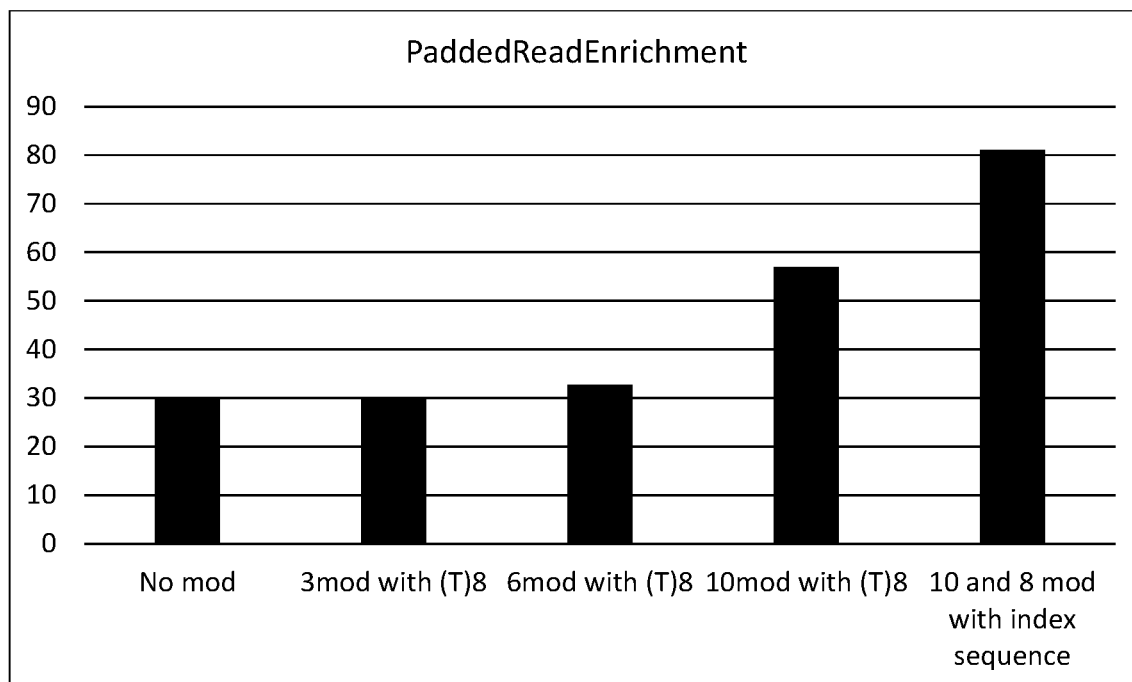
FIG. 4 is a graph of the Padded Read Enrichment results (a measure of the amount of on-target DNA captured) obtained using blockers as described in Example 2.

Oligos with a sequence complementary to the index region require fewer modified nucleotides (8 nucleotides and 10 nucleotides were tested) and showed higher Padded Read Enrichment. Results are shown in FIG. 4. With the same number of modification (8 or 10 nucleotides) in the blockers, blockers with sequence complementary to index region (the last bar) showed higher Padded Read Enrichment than the blockers with a stretch of T in the index region (labeled as "10 mod with (T)8" in FIG. 4).

TABLE 3

| SEQ ID NO | Name | Description | Sequences | Modification |
|---|---|---|---|---|
| 104 | NEXTERA Blocker1 (15016424) i5 | Illumina NEXTERA i5 blocker | 5'-AATGATACGGCGACCACCGAGATCTACACTTTTTTTTCGTCGGCAGCGTCAGATGTGTATAAGAGACAG/3ddC/ | no mod |
| 105 | NEXTERA Blocker2 (15016425) i7 | Illumina NEXTERA i7 blocker | 5'-CAAGCAGAAGACGGCATACGAGATTTTTTTTGTCTCGTGGGCTCGGAGATGTGTATAAGAGACAG/3ddC/ | no mod |
| 106 | TiBNA1 | NEXTERA Blocker1_3XCG | 5'-AATGATACGGCGACCACCGAGAT+CTACACTTTTTTTTT+CGTCGGCAGCGTCAGATGTGTATAAGAGA+CAG/3ddC/ | 3 mod |
| 107 | TiBNA2 | NEXTERA Blocker2_3XCG | 5'-CAAGCAGAAGACGGCATACGAGATTTTTTTTTGT+CTCGTGGGCT+CGGAGATGTGTATAAGAGA+CAG/3ddC/ | 3 mod |
| 108 | TiBNA3 | NEXTERA Blocker1_6XCG | 5'-AATGATACGGCGACCACCGAGA+TCTACACTTTTTTTTTCG+TCGG+CAGCG+TCAGATG+TGTATAA+G AGACAG/3ddC/-3' | 6 mod |
| 109 | TiBNA4 | NEXTERA Blocker2_6XCG | 5'-CAAGCAGAAGACGGCA+TACGAGATTTTTTTTTG+TCT+CGTGGGC+TCGGAGATG+TGTATAA+G AGACAG/3ddC/-3' | 6 mod |
| 110 | TiBNA5 | NEXTERA Blocker1_10XCG | 5'-AATGATA+CGGCGA+CCAC+CGAGA+TCTA+CACTTTTTTTTTCG+TCGG+CAGCG+TCAGATG+TGTATA A+GAGACAG-Spacer C3-3' | 10 mod |
| 111 | TiBNA6 | NEXTERA Blocker2_10XCG | 5'-CAAG+CAGAAGA+CGGCA+TACGA+GATTTTTTTTTG+TCT+CGTGGGC+TCGG+AGATG+TGTATAA+G AGACAG-Spacer C3-3' | 10 mod |
| 112 | TiS517 | sSpecificBlocker 517 | 5'-AATGATACGGCGACCAC+CGAGA+TCTA+CACG+CGTA+AGATCG+TCGG+CAGCG+TCAGATG+T GTATAA+GAGACAG-Spacer C3-3' | 10 mod |
| 113 | TiS701 | sSpecificBlocker 701 | 5'-CAAGCAGAAGA+CGGCA+TACGAGATT+CGCCtTAG+TCT+CGTGGGC+TCGGAGA+TGTGTATAA+G AGACAG-Spacer C3-3' | 8 mod |

TABLE 4

| SEQ ID NO | Name | Description | Sequences | Modification |
|---|---|---|---|---|
| 114 | BL007 | TSHTLNA15G | 5'-AATGATACGGCGACCAC+CGA+GAT+CTA+CAC/ideoxyl//ideoxyl//ideoxyl/+G/ideoxyl//ideoxyl/ACAC+TCT+TTC+CCT+ACA+CGA+CGC+TCT+TCC+GAT+C/3ddC/ | G mod in Index |
| 115 | BL008 | TSHTLNA16G | 5'-CAAGCAGAAGACGG+CAT+ACG+AGA+T/ideoxyl//ideoxyl//ideoxyl/+G/ideoxyl//ideoxyl/+GTG+ACT+GGA+GTT+CAG+ACG+TGTGCT+CTT+CCG+ATC/3ddC/ | G mod in Index |
| 116 | BL009 | TSHTLNA15N | 5'-AATGATACGGCGACCAC+CGA+GAT+CTA+CAC/ideoxyl//ideoxyl//ideoxyl/N/ideoxyl//ideoxyl/ACAC+TCT+TTC+CCT+ACA+CGA+CGC+TCT+TCC+GAT+C/3ddC/ | N in Index |
| 117 | BL010 | TSHTLNA16N | 5'-CAAGCAGAAGACGG+CAT+ACG+AGA+/ideoxyl//ideoxyl//ideoxyl/N/ideoxyl//ideoxyl/+GTG+ACT+GGA+GTT+CAG+ACG+TGTGCT+CTT+CCG+ATC/3ddC/ | N in Index |

TABLE 5

| SEQ ID NO | Name | Description | Sequences | Modification |
|---|---|---|---|---|
| 118 | BN023 | P5LNA | 5'-AATGA+TAC+GGC+GAC+CAC+CGA+GAT+CTA+CAC/3SpC3/ | 8 mod |
| 119 | BN024 | P7LNA | 5'-CAAGC+AGA+AGA+CGG+CAT+ACG+A+GA+T/3SpC3/ | 8 mod |
| 120 | BN025 | TiLNAS1 | 5'-TCGTC+GGC+AGC+GTC+AGA+TGT+GTA+TAA+GAG+ACA+G/3SpC3/ | 10 mod |
| 121 | BN026 | TiLNAS2 | 5'-GTCT+CGT+GGGC+TCG+GAG+ATG+TGT+ATAA+GAG+ACA+G/3SpC3/ | 10 mod |
| 122 | BN027 | TiLNA17 | 5'-GGCGAC+CAC+CGAGA+TCT+ACA+C/ideoxyl//ideoxyl//ideoxyl//ideoxyl//ideoxyl/ ideoxyl//ideoxyl/ | |
| 123 | BN028 | TiLNA18 | 5'-GGCA+TAC+GAGA+T/ideoxyl//ideoxyl//ideoxyl//ideoxyl//ideoxyl//ideoxyl/ +GTC+TCG+TGG+GC+TCGG+AGA+TGTG+TATAA+GAG/3SpC3/ | |

Example 3—Blockers Including Universal Bases and Modified Bases

Using 0.2 mM of the blockers of Table 4 in enhanced hybridization buffer, Hybridization and Capture is performed as described in Example 1. As shown in Table 4, the region of the blocker corresponding to the index region includes universal bases (deoxyinosine) and an LNA-modified guanine or a random nucleotide.

Figure 5:
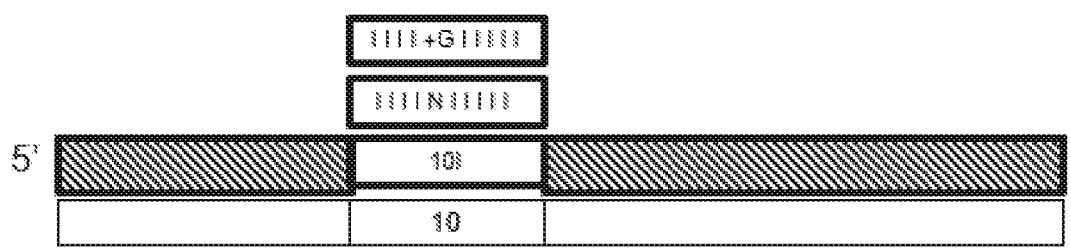
FIG. 5 shows a diagram of blockers including a modified G (+G) or a random (A, T, G, or C) (N) nucleotide at the fifth position of the portion of the blocker sequence that corresponds to the index sequence, as described in Example 3.

Without wishing to be bound by theory, it is believed that including a modified G or random nucleotide at every third base of the blocker sequence corresponding to the index region (for example at the third and/or the fifth positions (from 5' end) of the blocker sequence corresponding to the index region, as shown in one embodiment in FIG. 5, or at the second and/or the fourth positions of the blocker sequence corresponding to the index region) improves affinity of the blocker for a library member.

Example 4—Split Blockers

This Example shows split LNA blockers work well with a library that included an 8-nucleotide index.

Using the blockers of Table 5, Hybridization and Capture are performed as described in Example 1 using enhanced hybridization buffer. As shown in Table 5, the blockers TiLNAS1 (BN025), TiLNAS2 (BN026), P5LNA (BN023), and P7LNA (BN024) do not include a region corresponding to the index region. P5LNA (BN023), and P7LNA (BN024) each include 8 LNA-modified bases. TiLNAS1 (BN025) and TiLNAS2 (BN026) each include 10 LNA-modified bases. TiLNA17 (BN027) and TiLNA18 (BN028) include universal bases (deoxyinosine) in the region of the blocker corresponding to the index region but include shortened regions of the blocker corresponding to the other regions of the adaptor.

Figure 6A:
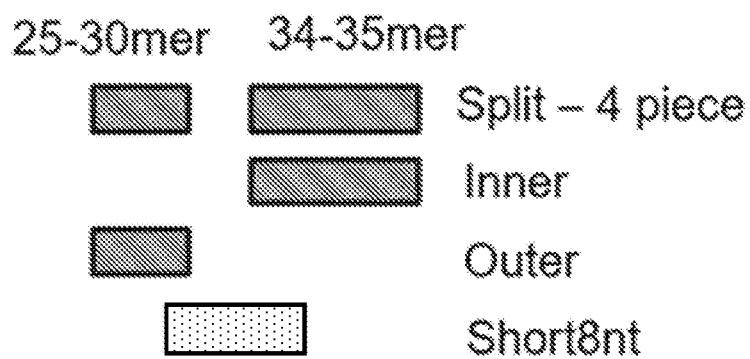
FIG. 6A-FIG. 6B show blocker constructs and results as described in Example 4.
Figure 6B:
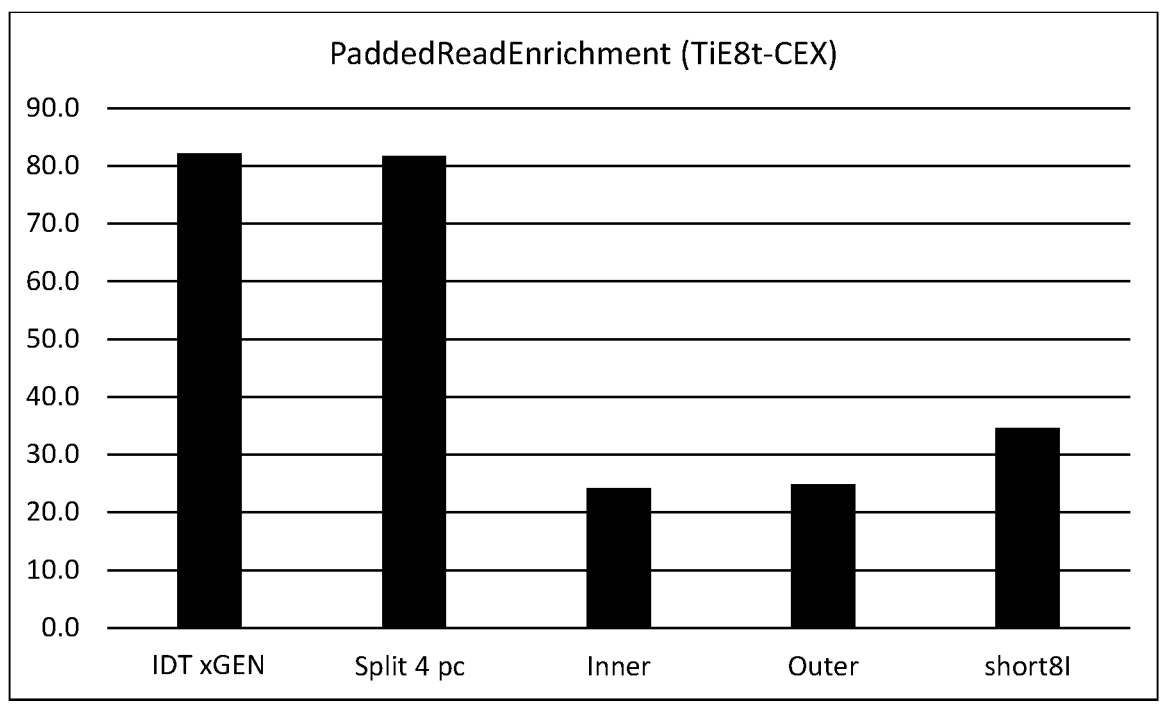

The resulting captured DNA is sequenced and Padded Read Enrichment is calculated using the Enrichment v3.0 BASESPACE App (Illumina, Inc., San Diego, CA). A diagram of the blockers is in shown in FIG. 6A & FIG. 3E-FIG. 3I; results are shown in FIG. 6B. Sample "Split 4 pc" contains TiLNAS1 (BN025), TiLNAS2 (BN026), P5LNA (BN023), and P7LNA (BN024) of Table 5; sample "Inner" contains TiLNAS1 (BN025) and TiLNAS2 (BN026) in Table 5; sample "Outer" contains P5LNA (BN023 and P7LNA (BN024) in Table 5; sample Short8nt includes TiLNA17 (BN027) and TiLNA18 (BN028) in Table 5. Two two-piece blockers ("split blockers") including BN023, BN024, BN025, and BN026 work as well as xGEN Blocking Oligos (Integrated DNA Technologies, Coralville, IA), as measured by Padded Read Enrichment; experiments using a blocker that blocked only part of the adaptor do not work as well.

Example 5—Hybridization Buffer

This Example shows comparisons of on-target capture using non-enhanced hybridization buffer and enhanced hybridization buffer.

Figure 7A:
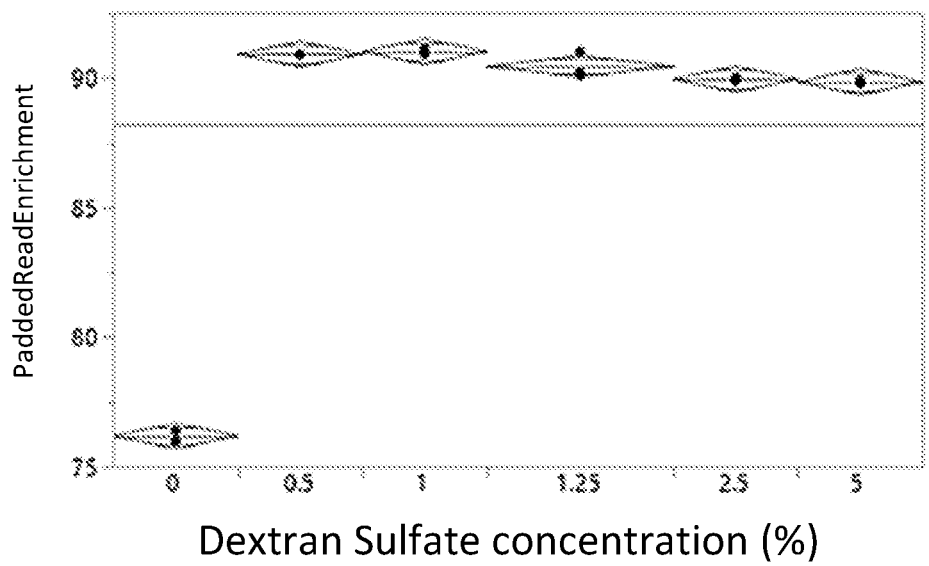
FIG. 7A-FIG. 7F show results using an enhanced hybridization buffer including dextran sulfate, as described in Example 5.

Hybridization and Capture are performed as described in Example 1 using xGEN Blocking Oligos (Integrated DNA Technologies, Coralville, IA) and enhanced hybridization buffer including the dextran sulfate concentrations indicated in FIG. 7A. The resulting captured DNA is sequenced and Padded Read Enrichment is calculated using the Enrichment v3.0 BASESPACE App (Illumina, Inc., San Diego, CA). Results are shown in FIG. 7A. Inclusion of dextran sulfate allows for fast hybridization (60 minutes to 90 minutes) in a large volume (100 µL) of hybridization buffer.

Figure 7B:
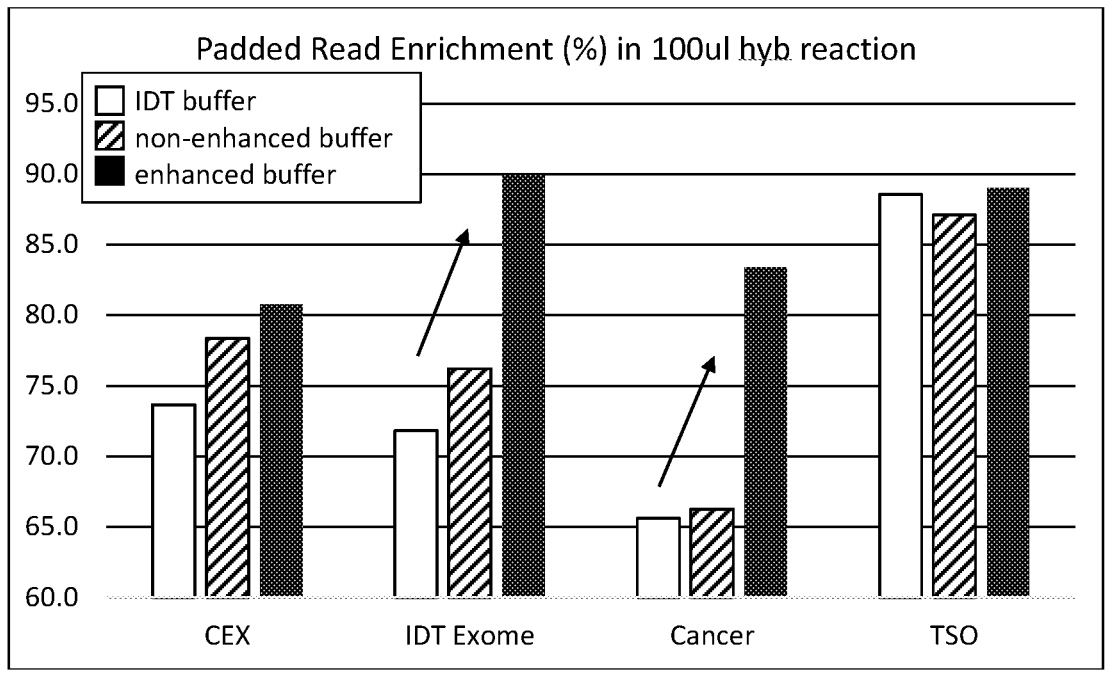

Enrichment using 100 µL hybridization buffer volume is evaluated using four different probe panels: Coding Exome Oligos (CEX) (Illumina, Inc., San Diego, CA), IDT Exome Research Panel (IDT Exome) (Integrated DNA Technologies, Coralville, IA), TRUSIGHT Cancer Panel (Cancer) (Illumina, Inc., San Diego, CA), and TRUSIGHT One Sequencing Panel (TSO) (Illumina, Inc., San Diego, CA). Hybridization in three hybridization buffers is tested: the IDT buffer from the xGEN LOCKDOWN kit (Integrated DNA Technologies, Coralville, IA), and hybridization buffer with and without dextran sulfate, as described in Example 1. Results are shown in FIG. 7B. Enhanced hybridization buffer provides similar or higher on-target results as compared to the IDT buffer for all four probe panels (ranging from 4,000 to 450,000 probes).

Figure 7C:
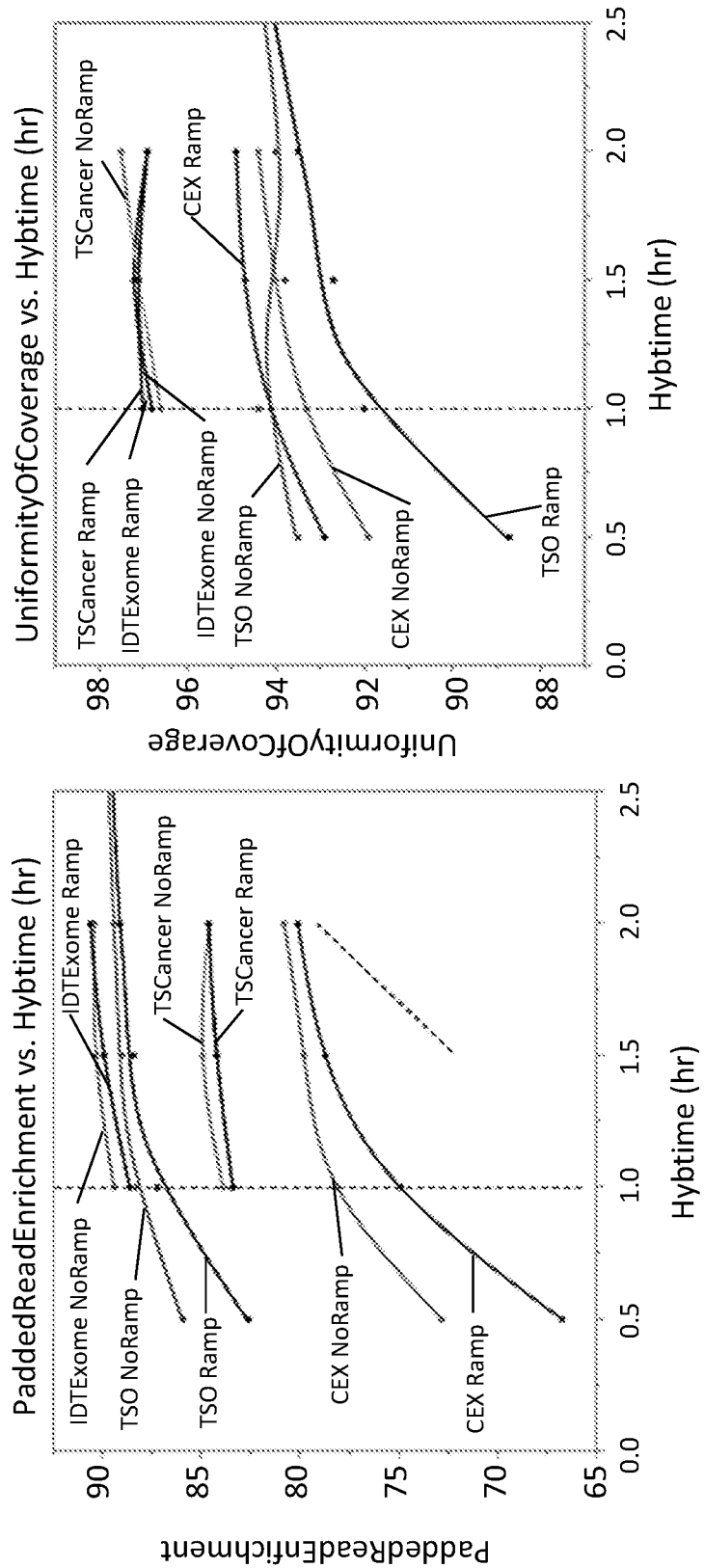

Two key enrichment metrics (Padded Read Enrichment and Uniformity of Coverage) for the four panels (CEX, IDT Exome, Cancer, and TSO) are obtained at different hybridization incubation times and with and without an additional temperature ramping step using Illumina enhanced hybridization buffer with IDT xGEN blockers. Results are shown in FIG. 7C. The dotted black line in the left panel indicates the result of hybridization in buffer without dextran sulfate.

Figure 7D:
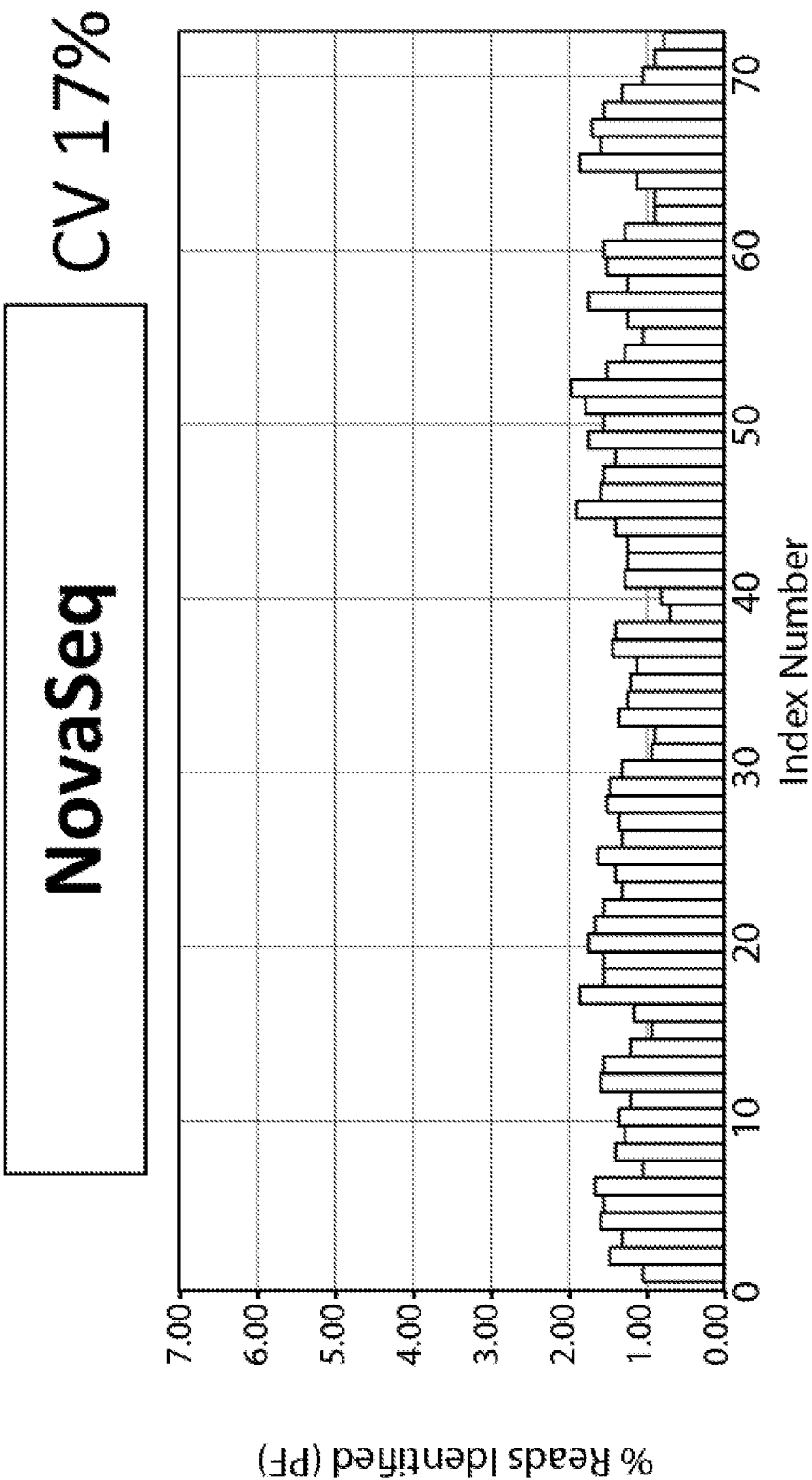
Figure 7E:
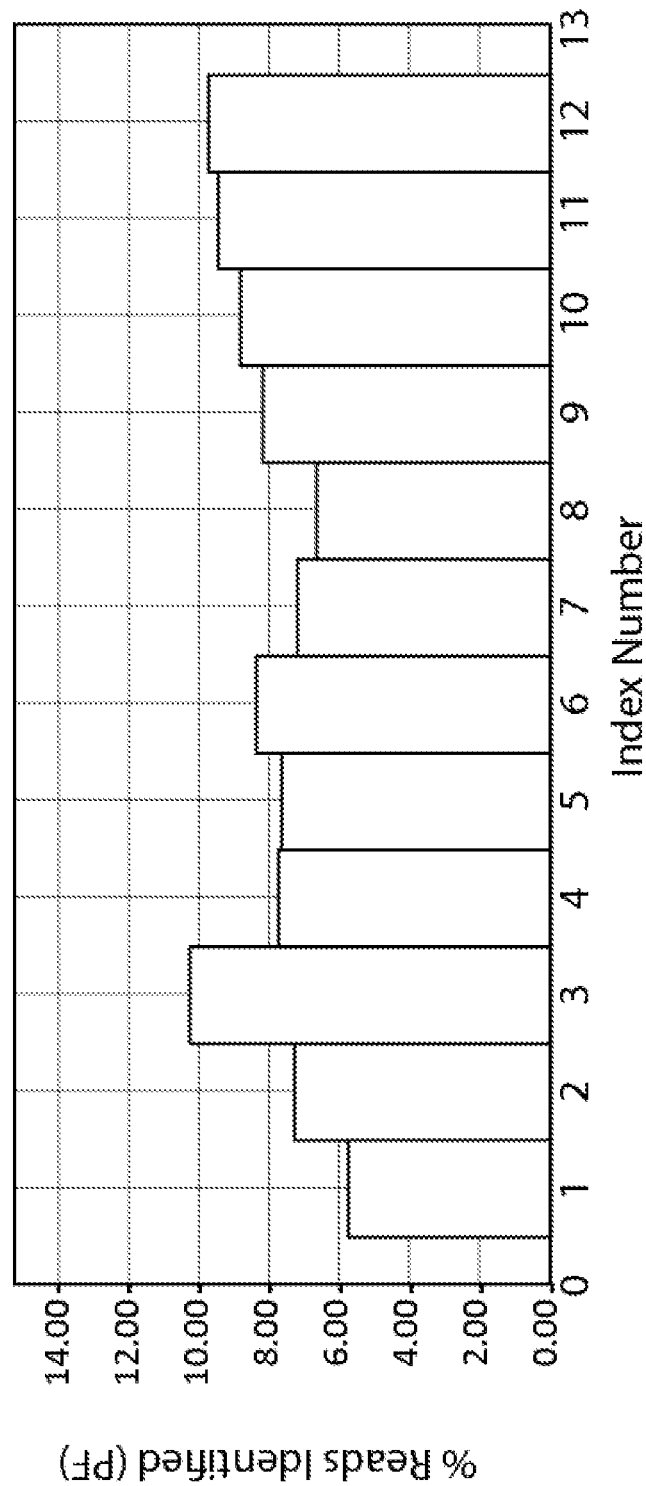
Figure 7F:
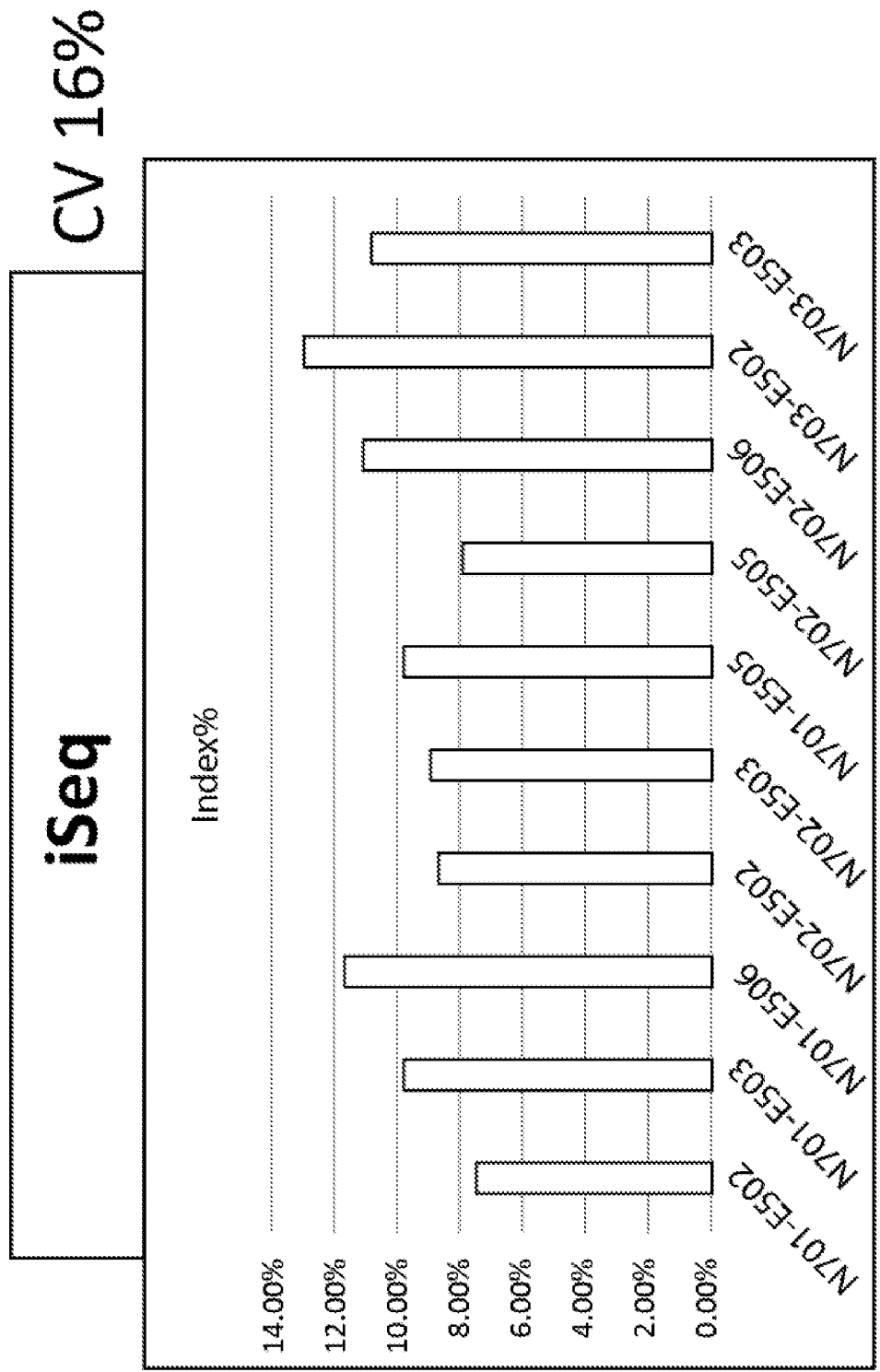

Three runs of 12plex library input are pooled by volume to a total of 30 µL and are enriched using Illumina enhanced hybridization buffer with IDT xGEN blockers. Samples are run on various Illumina, Inc., sequencers (NOVASEQ, NEXTSEQ, and ISEQ). No sample concentration step is required. Results are shown in FIGS. 7D-7F. The results show that when using an enhanced hybridization buffer including dextran sulfate, up to 30 µL of samples can be accommodated in a hybridization reaction (e.g., single 15 µL sample or a 12-plex run at 2.5 µL each). The use of an enhanced hybridization buffer allows up to 12 samples to be enriched in one reaction without using a speed vacuum, centrifugation column, or SPRI beads to further reduce pool volume.

Example 6—Improved Adaptors+Enhanced Hybridization Buffer

Figure 8A:
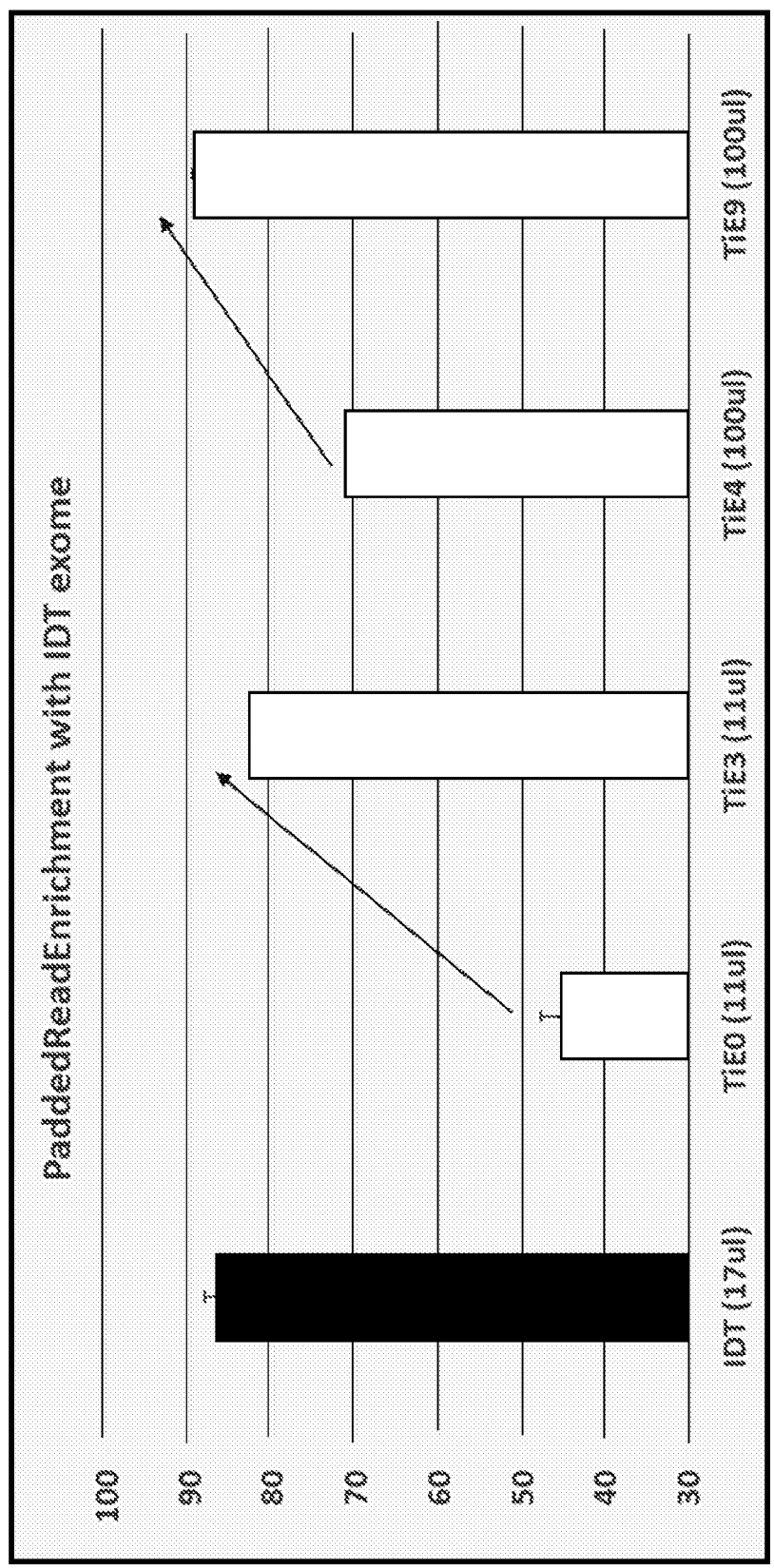
FIG. 8A-FIG. 8C show the results of hybridization assays described in Example 6.

Enrichment performance of an IDT exome panel (Cat #1056114, Integrated DNA Technologies, Coralville, IA) is tested using: (1) IDT buffer (17 µL) from the xGEN LOCKDOWN kit (Integrated DNA Technologies, Coralville, IA); (2) non-enhanced hybridization buffer with non-enhanced adaptor blockers (NEXTERA Blocker1 i5 (BN001) and NEXTERA Blocker2 i7 (BN002) in Table 2) in a small (11 µL) reaction volume (TiE0); (3) non-enhanced hybridization buffer with enhanced adaptor blockers (xGEN blockers) in a small (11 µL) reaction volume (TiE3); (4) non-enhanced hybridization buffer with enhanced adaptor blockers (xGEN blockers) in a large (100 µL) reaction volume (TiE4); and (5) enhanced hybridization buffer with enhanced adaptor blockers (xGEN blockers) in a large (100 µL) reaction volume (TiE9). Results are shown in FIG. 8A and demonstrate that enrichment performance is improved when using modified blockers, a wash temperature increase, and/or a crowding agent (dextran sulfate) in the hybridization buffer.

Figure 8B:
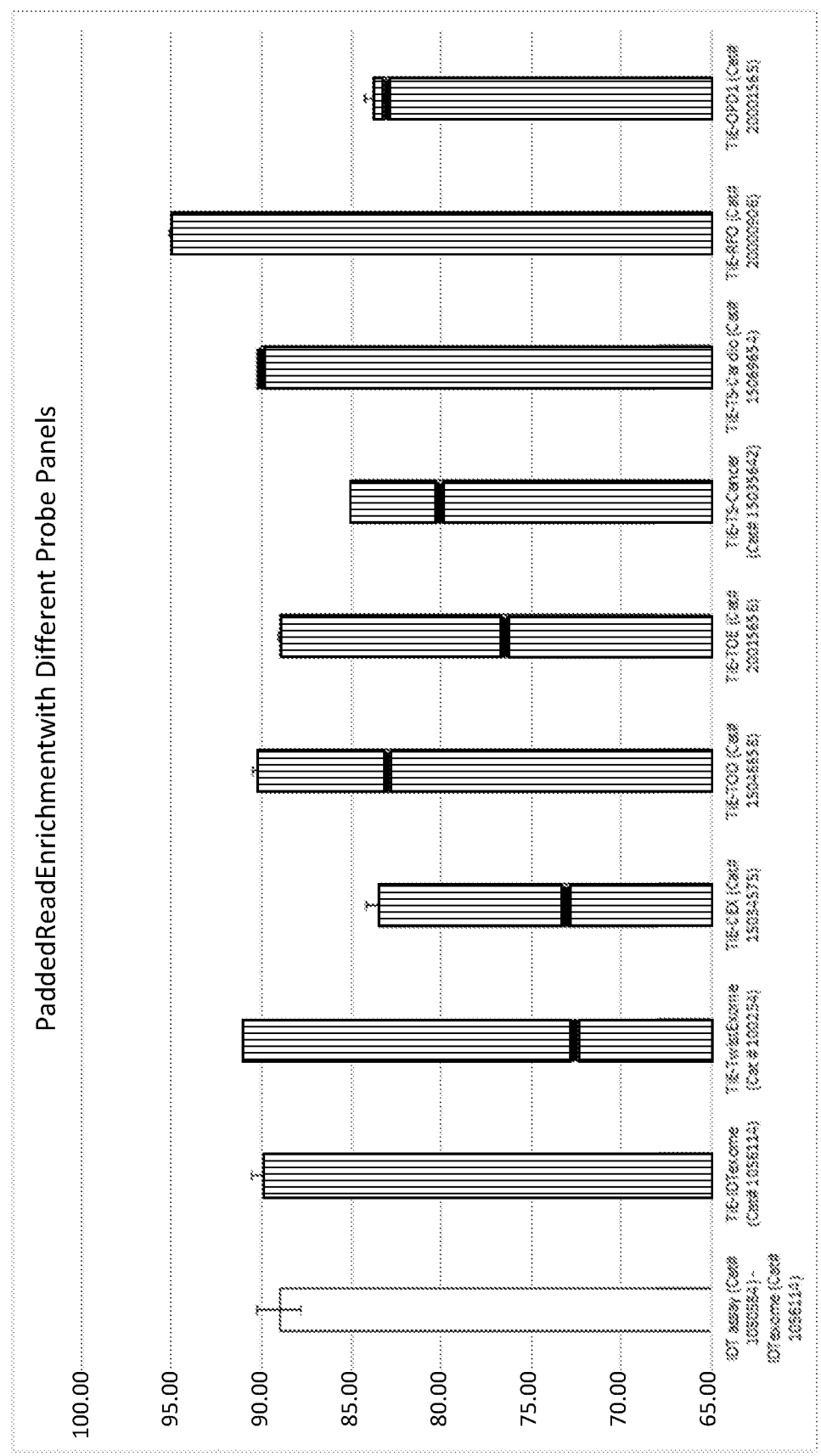

Enrichment performance (as measured using Padded Read Enrichment) is evaluated in nine probe panels using an IDT enrichment assay (Catalog No. 1080584, Integrated DNA Technologies, Coralville, IA), and in an Illumina enrichment assay with enhanced hybridization buffer. High Padded Read Enrichment is achieved in 100 reaction volume with various probe panels (from 500-450,000 probes). Probe panels include: (1) xGEN Exome Research Panel (IDT Exome) (Catalog No. 1056114, Integrated DNA Technologies, Coralville, IA); (2) Twist Human Core Exome (Twist Bioscience, Inc., Catalog No. 100254); (3) Coding Exome Oligos (CEX) (Catalog No. 15034575, Illumina, Inc., San Diego, CA); (4) TruSight One (Illumina Inc, San Diego, CA, Catalog No. FC-141-1007; Probe Catalog No. 15046658); (5) TruSight One Expanded (Illumina, Inc San Diego, Catalog No. FC-141-2007; Probe Catalog No. 20015656); (6) TruSight Cancer (Illumina, Inc., San Diego, CA, Catalog No. FC-121-0202; Probe Catalog No. 15035642); (7) TruSight Cardio (Illumina, Inc., San Diego, CA, Catalog No. FC-141-1010; Probe Catalog No. 15069654); (8) TruSight RNA Fusion Panel (Illumina Inc, San Diego, CA, Catalog No. 20000906); (9) Oncology DNA Probes Master Pool (OPD1) (Illumina, Inc., Catalog No. OP-101-1004; Probe Catalog No. 20001565). Results are shown in FIG. 8B. The white bar (column 1) shows the performance of IDT exome panel in IDT lockdown enrichment workflow with Nextera Rapid Capture library preparation (Illumina, Inc., San Diego, CA). Gray bars show the performance of the panels with the Illumina Enrichment Assay with enhanced hybridization buffer and IDT xGEN adaptor blockers. The black, horizontal lines show comparative results that are obtained with corresponding panels using a Twist enrichment assay (Twist Bioscience, Inc.) (column 3), Nextera Rapid Capture library preparation (columns 4-8), or the TruSight Tumor 170 workflow with the OPD1 panel (column 10). Performance of each panel in the Illumina Enrichment Assay with enhanced hybridization buffer is evaluated in at least three independent experiments; the error bars indicate standard deviation.

Figure 8C:
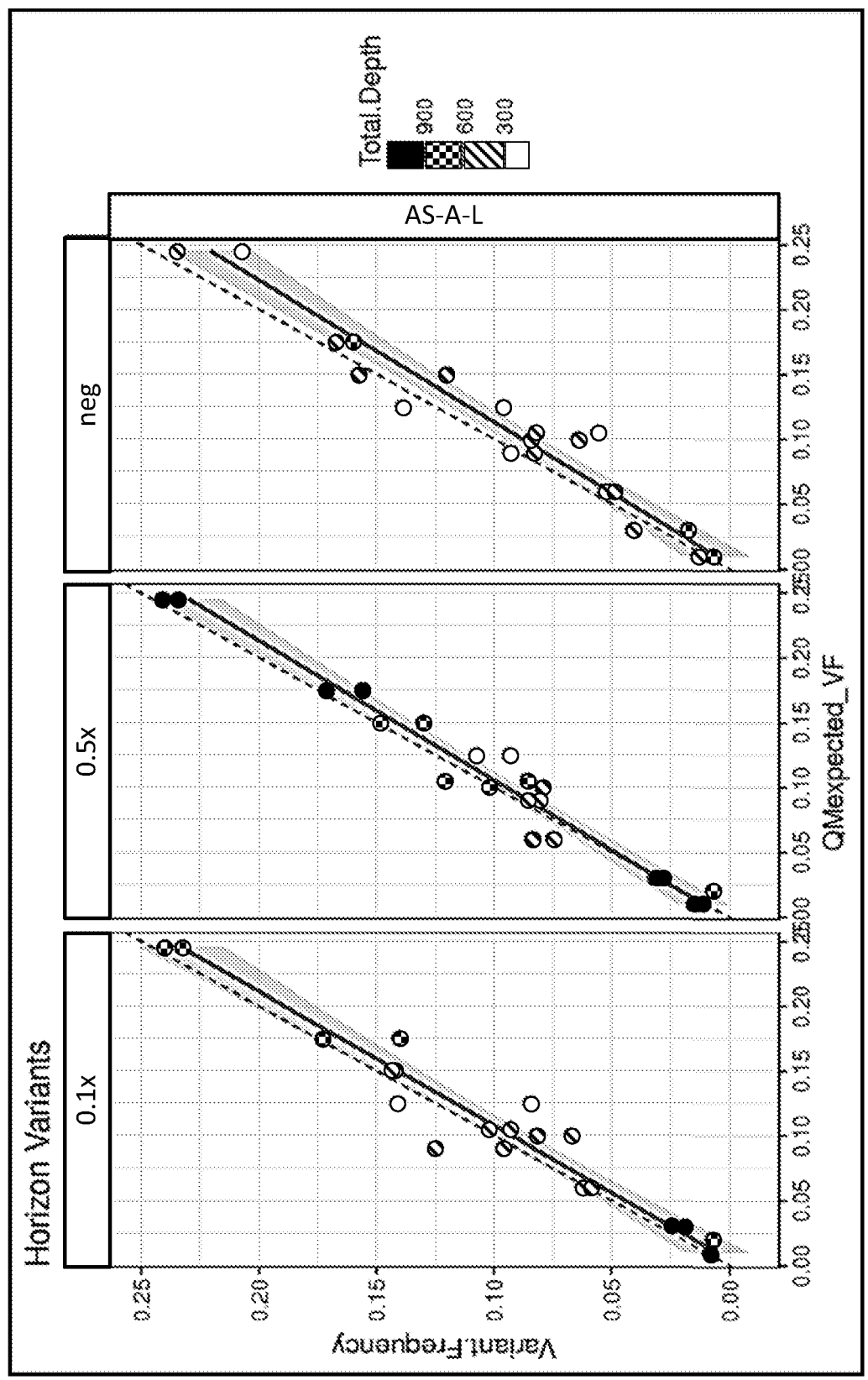

Somatic variants are detected by a single-hybridization enrichment protocol using enhanced hybridization buffer and xGEN blockers for a 12-gene, 535-probe panel to enrich libraries generated from the Horizon Discover HD701 quantitative multiplex (QM) DNA standard. Data presented in FIG. 8C shows the expected variant frequency (x-axis) versus called variant frequency (y-axis). Each panel in FIG. 8C represents different concentrations of high affinity adaptor blockers (IDT xGEN adaptor blockers, 0.1× (0.02 mM) and 0.5× (0.1 mM) and a negative control (no high affinity adaptor blockers). Each point represents a somatic variant call, colored by read depth. The dashed red line represents a predicted perfect correlation between known variant frequencies and called variant frequencies. The blue and gray shading represent the best fit line and 95% confidence interval, respectively, for called variant frequencies compared to known variant frequencies. The expected variant frequency (x-axis) correlates with the known (called) variant frequency (y-axis) for the IDT xGEN adaptor blockers (0.1× (0.02 mM), 0.5× (0.1 mM)) but does not correlate for a negative control (no high affinity adaptor blockers)).

Example 7A—PCR-Free Hybrid Capture Using TRUSEQ Adaptor Ligated Libraries

This Example shows PCR-free Hybrid Capture.

Hybridization is performed using the xGEN LOCKDOWN reagents (Integrated DNA Technologies, Coralville, IA), according to package instructions, with the following modifications. Targeted DNA is made using a TRUSEQ adaptor ligation approach and is captured using 100 µL DYNABEADS M-270 Streptavidin (Integrated DNA Technologies, Coralville, IA). The hybridization is only incubated for 30 minutes instead of the recommended 4 hours. The following protocol is then followed:

1. Incubate the beads with 10 µL of 0.1 N NaOH, denaturing the captured library from the probes and releasing it into solution.
2. Remove the captured library solution from the beads (using a magnet) and neutralize with 10 µL of 200 mM Tris.HCl pH 7.0.
3. (optionally) Add denatured PhiX Control v3 (Illumina, Inc., San Diego, CA) to sample, up to 7.5 µL of resuspension buffer (RSB) (Illumina, Inc., San Diego, CA).
4. Add 27.5 uL 2×HT1 (Hybridization buffer, Illumina, Inc., San Diego, CA)

The resulting sample (in 55 µL 1×HT1 buffer) is loaded directly onto a flow cell using a pipette or using a flow cell loading jig as described, for example, in U.S. Provisional Pat. Application No. 62/564,466, filed on Sep. 28, 2017. Results are shown in Table 6A. The control (column 1) is run using the same conditions as the PCR free methods except that PCR is performed after the capture. Initial attempts at running a PCR-free enrichment are shown in column 2 and show that too few reads resulted in failure to reach an acceptable level of coverage for an exome. Only ~18× mean target coverage was achieved whereas the goal is to exceed ~50×. For the second attempt (column 3), a direct flow cell loading jig was used, and shows increased DNA input into the hybridization improved the sequenced yield of the PCR-free enrichment method to ~140×, far greater than the ~40× goal. Down sampling the PCR-free data to 70 million reads (column 4) results in metrics that are similar (or even superior) to the control.

Figures 9A, 9B:
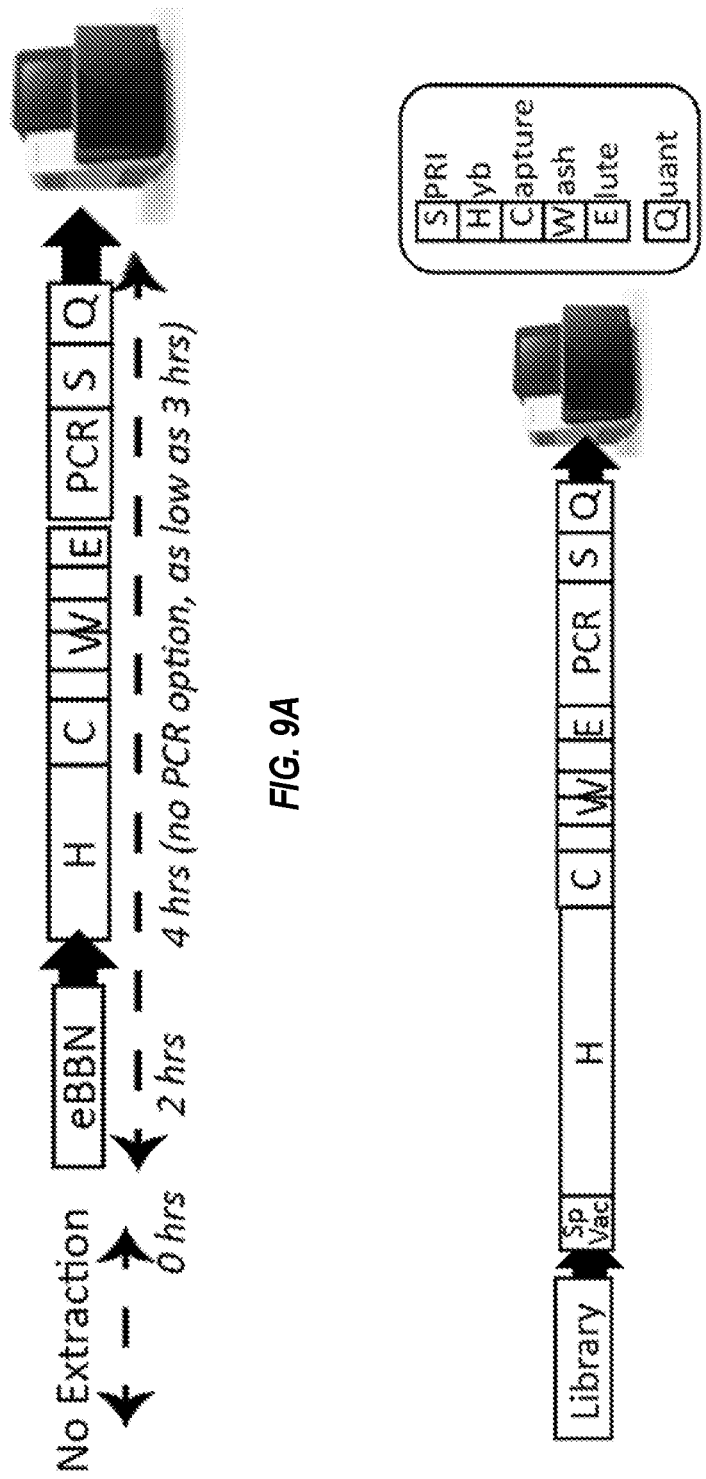
FIG. 9A-FIG. 9D show schematics of exemplary workflows. eBBN indicates bead-based tagmentation using bead-bound transposome complexes; H indicates hybridization; C indicates capture; W indicates wash; E indicates elution; PCR indicates PCR amplification; S indicates sequencing; Q indicates quantification; SpVac indicates Speed Vacuum concentration.
Figure 9C:
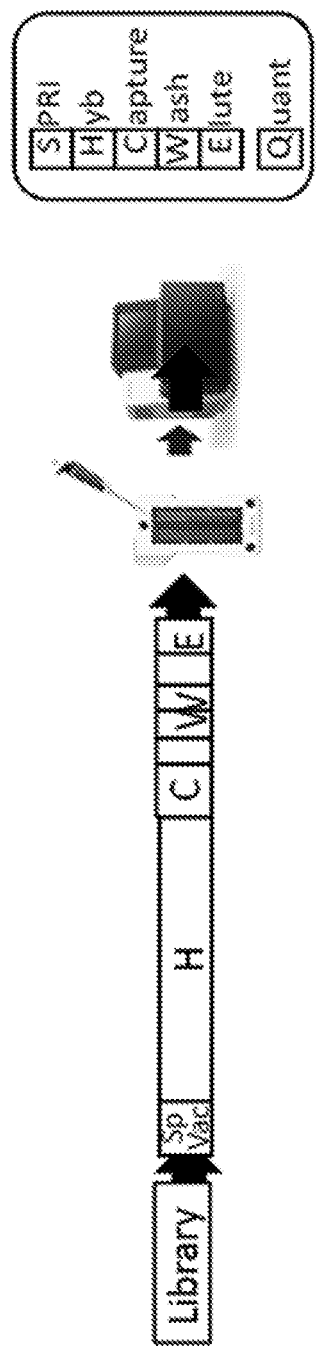
Figure 9D:
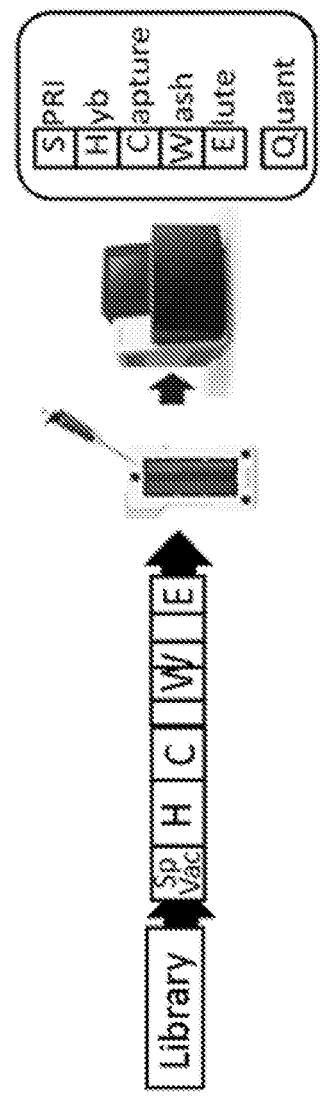

Example 7B—PCR Free Hybrid Capture Using Bead-Based NEXTERA Libraries Improves Exome Quality from Short Hybridization Times A controlled experiment is performed using similar conditions as in Example 7A, but using libraries that are generated using a bead-based tagmentation library preparation method, and using corresponding blocking oligonucleotides. In this experiment, both hybridization duration and PCR amplification are variables. The recommended 4 hours hybridization reaction protocol with PCR post capture (in total ~7.5 hours, see IDT xGEN protocol) with sequencing using a NEXTSEQ instrument without direct flow cell loading is used as a control (a schematic of this workflow is shown in FIG. 9B), and is compared to two conditions using only 30-minute hybridizations (with and without PCR post capture) and with direct flow cell loading (FIG. 9C). Shortening the hybridization duration and removing PCR enable an enrichment protocol to be carried out in only ~2 hrs. A schematic of this workflow with the shortened hybridization time and without PCR is shown in FIG. 9D.

The results are shown in Table 6B. All data is downsampled to ~23 million clusters. In the first column (control), data indicates a good quality Exome but with long ~7.5 hr workflow. When the hybridization is shortened to 30 minutes, the protocol duration is reduced in total to ~4 hrs (column 2); however, the number of PCR duplicates increases in comparison to the control. Increased PCR duplicates also reduces the diversity of the library and corresponding coverage at ~20×. When PCR is removed from the 30 minute workflow (column 3), the PCR duplicates are reduced considerably and the diversity increases to a level above that of the control, with a far shorter workflow (2 hours vs. 7.5 hours). This example highlights that the removal of the PCR can improve the quality of hybridization capture reactions by minimizing the duplication of templates during the PCR.

TABLE 6A

|  | Control | PCR free | PCR free + direct load | PCR free + direct load |
|---|---|---|---|---|
| Turnaround time | 4 hrs | 2 hrs 17 m | 2 hrs 17 m | 2 hrs 17m |
| Reads | 70,000,000 | 17,090,392 | 132,402,247 | 70,026,594 |
| Downsampled | yes | no | no | yes |
| Padded Read Enrichment | 88% | 85% | 86% | 86% |
| Uniformity of coverage (Pct > 0.2*mean) | 99% | 98% | 99% | 99% |
| Mean Target Coverage | 76.6 | 17.9 | 140.3 | 81.7 |
| Mean Target Coverage (deduped) | 60.9 | 15.8 | 98.3 | 64.1 |
| SNVs in target | 26,585 | 21,354 | 26,758 | 26,629 |
| Indels in target | 2,082 | 1,078 | 2,638 | 2,348 |

TABLE 6B

|  | 4 hr hyb | 30 min hyb | 30 min hyb (PCR free) |
|---|---|---|---|
| Hybridization duration | 4 hrs | 30 m | 30 m |
| PCR after enrichment | YES | YES | No |
| Total Enrichment TAT | 7.5 hrs | 4 hrs | 2 hrs |
| Padded Read Enrichment | 92.42 ± 1% | 87.03 ± 0.35% | 84.72 ± 0.76% |
| Uniformity | 98.76 ± 0.14% | 98.67 ± 0.04% | 98.44 ± 0.13% |
| % Duplicates | 9.015 ± 0.69% | 16.04 ± 0.52% | 6.02 ± 0.42% |
| HS library Size | 102,789,918 ± 11,527,76 8 | 50,909,151 ± 1,527,235 | 141,515,722 ± 7,601,326 |
| Mean Region Coverage Depth | 45.4 ± 1.13 | 39 ± 0.14 | 42.2 ± 0 |
| Target Coverage at 20x | 89.98 ± 0.91% | 85.04 ± 0.22% | 87.40 ± 0.77% |
| SNV recall | 95.91 ± 2.74% | 97.26 ± 0.0% | 97.59 ± 0.24% |
| SNV precision | 99.63 ± 0.05% | 99.4 ± 0.05% | 99.38 ± 0.01% |
| Indel Recall | 80.87 ± 5.82% | 82.91 ± 0.68% | 85.68 ± 0.08% |
| Indel Precision | 91.92% ± 0.94% | 91.01 ± 0.83% | 94.49 ± 0.01% |

Example 8—Blocker Comparisons

Using 0.2 mM of the blockers BN001 and BN002; BX003 and BX007; BN007 and BN008; BN005 and BN006; or BN023, BN024, BN025, and BN026 (as described in Table 2A) in enhanced hybridization buffer, Hybridization and Capture are performed as described in Example 1. "Non-modified" blockers BN001 and BN002 include thymines in the region of the blocker that corresponds with the index region of the adaptor and bases complementary to the adaptor in the regions of the blocker that correspond with the non-index region of the adaptor; blockers BN001 and BN002 include no modified bases and include a 3'-ddC terminal group. Blockers BX003 and BX007 are modified versions of BN001 and BN002 each having two AP-dC-CE phosphoramidite (G-Clamp) substitutions in the regions of the blocker that correspond with the non-index region of the adaptor. Blockers BN007 and BN008 are modified versions of BN001 and BN002 with universal bases (deoxyinosines) in the region of the blocker that corresponds with the index region of the adaptor and BNA-modified bases in the regions of the blocker that correspond with the non-index region of the adaptor. Blockers BN023 and BN025 are modified versions of the regions of BN001 that correspond with the non-index region of the adaptor and include LNA-modified bases; the blockers also include 3'-spacer C3 instead of 3'-ddC. Blockers BN024 and BN026 are modified versions of the regions of BN002 that correspond with the non-index region of the adaptor and include LNA-modified bases; the blockers also include 3'-spacer C3 instead of 3'-ddC.

Figure 10:
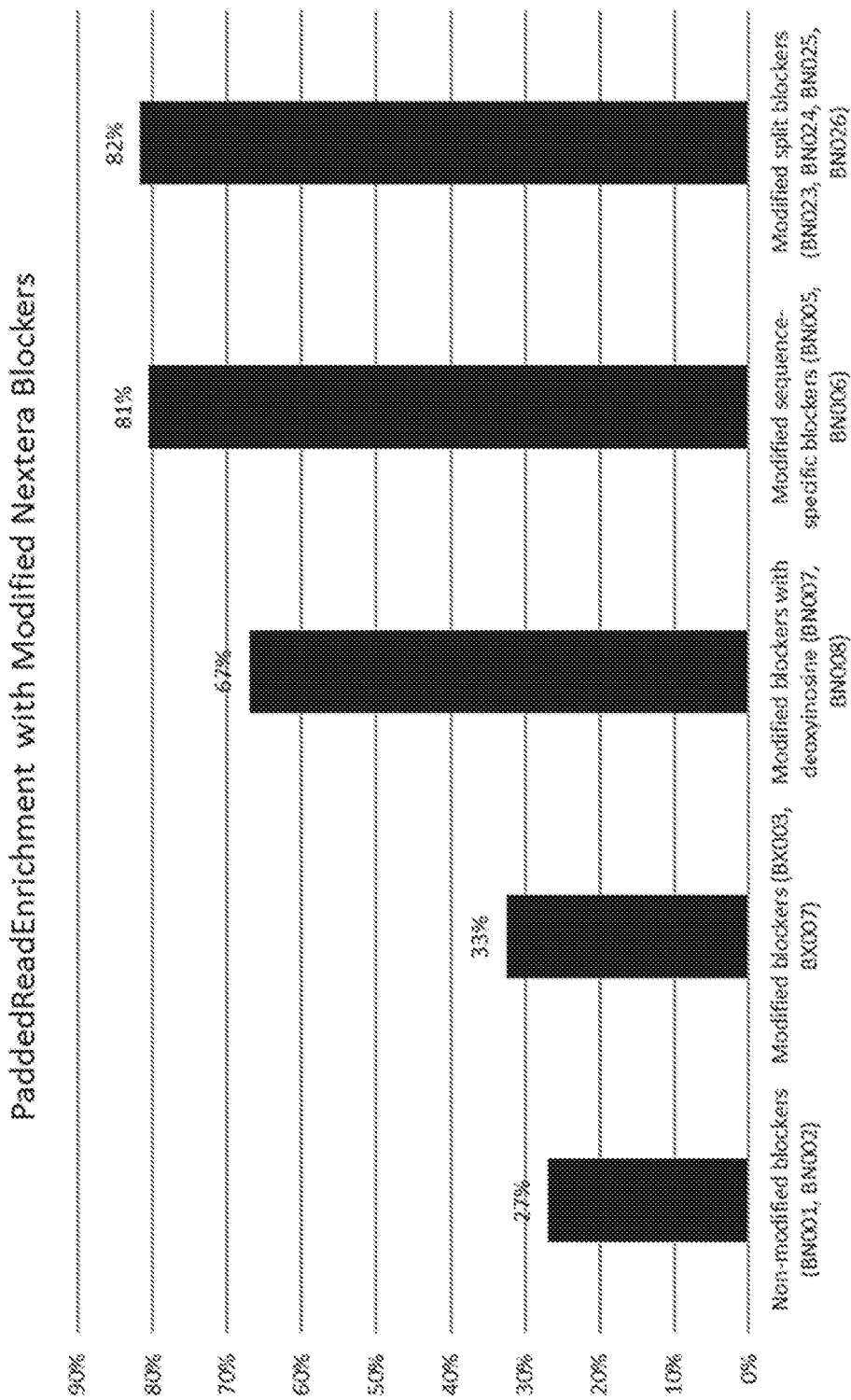
FIG. 10 shows Padded Read Enrichment results achieved using BN001 and BN002 (non-modified blockers); BX003 and BX007 (G-Clamp modified blockers); BN007 and BN008 (blockers modified with BNA and deoxyinosine); BN005 and BN006 (BNA and modified sequence-specific blockers); or BN023, BN024, BN025, and BN026 (split blockers modified with LNA) as described in Example 8.

The resulting captured DNA is sequenced and Padded Read Enrichment, a measure of the amount of on-target DNA captured, is calculated. Results are shown in FIG. 10 and indicate that various modifications of the "non-modified" blockers improve the Padded Read Enrichment in hybridization assays.

Example 9—Split Blocker Comparisons

Figure 11:
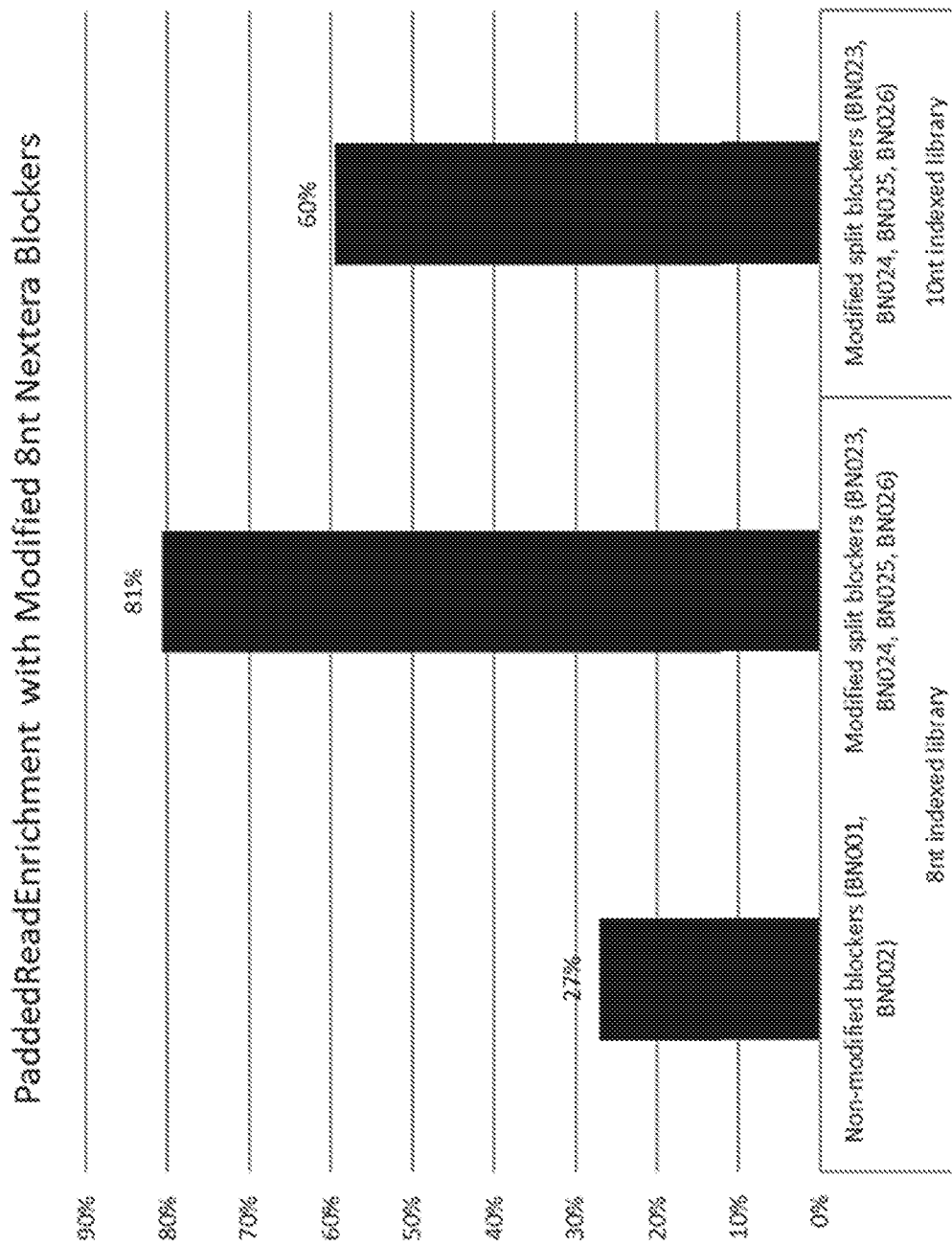
FIG. 11 shows Padded Read Enrichment results achieved using BN001 and BN002 (non-modified blockers) or BN023, BN024, BN025, and BN026 (LNA modified split blockers) when the corresponding adaptor includes an 8-nucleotide index or a 10-nucleotide index, as described in Example 9.

Using 0.2 mM BN001 and BN002; or BN023, BN024, BN025, and BN026 (as described in Table 2A) in enhanced hybridization buffer, Hybridization and Capture are performed as described in Example 1. The corresponding adaptor includes an 8-nucleotide index or a 10-nucleotide index. The resulting captured DNA is sequenced, and Padded Read Enrichment is calculated. Results are shown in FIG. 11 and indicate that using "split blockers" (that is, blockers that do not include bases that correspond with the index region of the adaptor) allow the same blockers to be used with adaptors having various index sequences and index lengths. These results indicate that split blockers may be used in situations where it would be disadvantageous to accommodate a change in index designs.

The complete disclosure of all patents, patent applications, and publications, and electronically available material (including, for instance, nucleotide sequence submissions in, e.g., GenBank and RefSeq, and amino acid sequence submissions in, e.g., SwissProt, PIR, PRF, PDB, and translations from annotated coding regions in GenBank and RefSeq) cited herein are incorporated by reference. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A hybridization buffer comprising: a crowding agent, and human Cot-1 DNA, a destabilizing agent, salt, and a blocker, wherein the blocker comprises at least one of:
   (a) an oligonucleotide and is capable of binding to an adaptor, wherein the adaptor comprises a universal primer sequence and at least one of an index region or a unique molecular identifier (UMI), wherein a first region of the blocker capable of binding to the index region and/or UMI of the adaptor comprises: at least three thymine bases, at least four thymine bases, at least five thymine bases, at least six thymine bases, at least seven thymine bases, at least eight thymine bases, at least nine thymine bases, or at least ten thymine bases, and wherein a second region of the blocker capable of binding to a non-index region of the adaptor comprises modified nucleotides; or
   (b) two non-connected oligonucleotides; wherein the blocker is capable of binding to at least a portion of an adaptor, wherein the adaptor comprises a universal primer sequence and at least one of an index region or a unique molecular identifier (UMI); and wherein the non-connected oligonucleotides comprise bases that do not correspond to the index region and/or the UMI of the adaptor.

2. The hybridization buffer of claim 1, wherein the crowding agent comprises at least one of dextran, dextran sulfate, polyethylene glycol (PEG), Ficoll, glycerol, and betaine.

3. The hybridization buffer of claim 1, comprising a crowding agent, human Cot-1 DNA, a blocker, a destabilizing agent, a buffer, salt, and a detergent.

4. The hybridization buffer of claim 1, wherein the hybridization buffer comprises a buffer and the buffer is a phosphate buffer.

5. The hybridization buffer of claim 1, wherein the hybridization buffer comprises salt and the salt is NaCl or sodium citrate.

6. The hybridization buffer of claim 1, wherein the hybridization buffer comprises a destabilizing agent and the destabilizing agent is formamide or urea or a mixture thereof.

7. The hybridization buffer of claim 1, wherein the hybridization buffer comprises a detergent and the detergent is TWEEN 20, TWEEN 80, or sodium dodecyl sulfate (SDS).

8. The hybridization buffer of claim 1, wherein the hybridization buffer comprises:
   0.5% to 10% dextran sulfate,
   0.05 mg/mL to 0.5 mg/mL human Cot-1 DNA,
   1% to 15% (v/v) formamide,
   40 mM to 80 mM $KH_2PO_4$—$K_2HPO_4$,
   0.1 M to 4 M NaCl, and
   0.001% to 10% (v/v) TWEEN 20.

9. A method of preparing an enriched library comprising forming a hybridization mixture comprising library members, a hybridization buffer of claim 1, and a probe to form a hybridization mixture, under conditions sufficient for the probe to hybridize to a region of interest within a library member, wherein the probe comprises a ligand.

10. The method of claim 9, comprising:
    capturing the probe after it has hybridized using a capture means, and
    eluting the captured library members from the capture means into an eluant comprising enriched library members, wherein the DNA concentration of the eluant is in the range of 1.3 pM to 250 pM.

11. The method of claim 9, wherein the hybridization mixture comprises samples from at least two library preparations, wherein at least 10 ng, at least 25 ng, at least 50 ng, at least 100 ng, at least 200 ng, or at least 500 ng of DNA from each library preparation are combined.

12. The method of claim 9, wherein the DNA concentration of the hybridization mixture is in a range of 0.1 ng/uL to 120 ng/uL.

13. The method of claim 10, comprising sequencing the enriched library members and wherein the method does not comprise amplifying the library members prior to capturing the library members.

14. The method of claim 13, wherein the sequencing occurs on a flow cell and the method comprises loading the enriched library members onto the flow cell at a concentration of at least 1.1 pM, at least 1.2 pM, at least 1.3 pM, at least 10 pM, or at least 100 pM and at a concentration of up to 100 pM, up to 200 pM, up to 250 pM, or up to 300 pM.

15. The method of claim 14, comprising loading the enriched library members onto a flow cell using a direct flow cell loading jig.

16. A kit comprising the hybridization buffer of claim 1 and instructions for use.

* * * * *

UNITED STATES PATENT AND TRADEMARK OFFICE
CERTIFICATE OF CORRECTION

PATENT NO. : 12,435,362 B2
APPLICATION NO. : 17/267107
DATED : October 7, 2025
INVENTOR(S) : Slatter et al.

Page 1 of 1

It is certified that error appears in the above-identified patent and that said Letters Patent is hereby corrected as shown below:

In the Specification

In Column 1, Line 11, delete "is are" and insert -- are --.

In Column 1, Line 12, delete "its their" and insert -- their --.

In the Claims

In Column 113, Lines 23-24, in Claim 1, delete "agent, and" and insert -- agent, --.

In Column 114, Line 49, in Claim 12, delete "ng/uL" and insert -- ng/µL --.

In Column 114, Line 50, in Claim 12, delete "ng/uL." and insert -- ng/µL. --.

Signed and Sealed this
Ninth Day of December, 2025

John A. Squires
*Director of the United States Patent and Trademark Office*